US012808389B2

(12) United States Patent
Guo et al.

(10) Patent No.: US 12,808,389 B2
(45) Date of Patent: Nov. 24, 2026

(54) AIRFLOW DEVICE

(71) Applicant: Nanjing Chervon Industry Co., Ltd., Nanjing (CN)

(72) Inventors: Jianpeng Guo, Nanjing (CN); Rui Zhang, Nanjing (CN); Jingwei Li, Nanjing (CN); Rui Zhan, Nanjing (CN); Wenhao Zhang, Nanjing (CN)

(73) Assignee: Nanjing Chevron Industry Co., Ltd., Nanjing (CN)

( * ) Notice: Subject to any disclaimer, the term of this patent is extended or adjusted under 35 U.S.C. 154(b) by 0 days.

(21) Appl. No.: 18/986,195

(22) Filed: Dec. 18, 2024

(65) Prior Publication Data

US 2025/0198424 A1 Jun. 19, 2025

Related U.S. Application Data

(63) Continuation of application No. PCT/CN2023/109482, filed on Jul. 27, 2023.

(30) Foreign Application Priority Data

Aug. 12, 2022 (CN) ......................... 202210967982.6
Apr. 24, 2023 (CN) ......................... 202320947789.6
Apr. 25, 2023 (CN) ......................... 202310456589.5

(51) Int. Cl.
*F04D 19/00* (2006.01)
*A01G 20/47* (2018.01)
(Continued)

(52) U.S. Cl.
CPC ........... *F04D 29/522* (2013.01); *A01G 20/47* (2018.02); *F04D 19/002* (2013.01); *F04D 25/06* (2013.01);
(Continued)

(58) Field of Classification Search
CPC ...... F04D 29/522; F04D 19/002; F04D 25/06; F04D 25/084; F04D 29/545;
(Continued)

(56) References Cited

U.S. PATENT DOCUMENTS 2,096,023 A 10/1937 Albertson
4,325,163 A 4/1982 Mattson
(Continued)

FOREIGN PATENT DOCUMENTS

CN 104074157 A 2/2016
CN 106714642 A 5/2017
(Continued)

OTHER PUBLICATIONS

Written Opinion of international application No. PCT/CN23/109482, dated Sep. 14, 2023, 4 pp.
(Continued)

*Primary Examiner* — Sabbir Hasan
(74) *Attorney, Agent, or Firm* — Greenberg Traurig, LLP

(57) ABSTRACT

An airflow device includes a grip for a user to hold; a pipe assembly for the air to pass through; fan blades rotatable about a fan axis; a motor for driving the fan assembly to rotate; and guide vanes for directing the airflow. The inner diameter of the pipe assembly is greater than or equal to 90 mm. The flow rate of the airflow device is greater than or equal to 1000 CFM. The maximum rotational speed of the motor is less than 35000 rpm.

17 Claims, 38 Drawing Sheets

(51) Int. Cl.

| | |
|---|---|
| ***F04D 25/06*** | (2006.01) |
| ***F04D 25/08*** | (2006.01) |
| ***F04D 29/52*** | (2006.01) |
| ***F04D 29/54*** | (2006.01) |
| *F04D 29/40* | (2006.01) |

(52) U.S. Cl.
CPC ......... *F04D 25/084* (2013.01); *F04D 29/545* (2013.01); *F04D 29/403* (2013.01)

(58) Field of Classification Search
CPC .. F04D 29/403; F04D 25/0673; F04D 29/325; F04D 29/544; F04D 29/682; F04D 29/684; A01G 20/47; E01H 1/0809; E01H 1/0863; F05D 2250/191
See application file for complete search history.

(56) References Cited

U.S. PATENT DOCUMENTS

| | | | | |
|---|---|---|---|---|
| 4,413,371 | A | 11/1983 | Tuggle | |
| 4,669,755 | A | 6/1987 | Harris | |
| 4,674,146 | A | 6/1987 | Tuggle | |
| 4,945,604 | A | 8/1990 | Miner | |
| 5,560,078 | A | 10/1996 | Toensing | |
| 6,158,082 | A | 12/2000 | Beckey | |
| 2014/0234130 | A1 | 8/2014 | Yamaoka | |
| 2016/0195097 | A1 | 7/2016 | Patrick | |
| 2016/0298635 | A1 | 10/2016 | Su | |
| 2016/0345714 | A1 | 12/2016 | Yamaoka | |
| 2018/0012616 | A1 | 1/2018 | Salishev | |
| 2018/0140146 | A1* | 5/2018 | Zhu | F04D 25/084 |
| 2022/0099096 | A1 | 3/2022 | Numata | |
| 2022/0412364 | A1* | 12/2022 | Takano | F04D 25/0673 |

FOREIGN PATENT DOCUMENTS

| | | | |
|---|---|---|---|
| CN | 110439832 | A | 11/2019 |
| CN | 111432053 | A | 7/2020 |
| CN | 215256988 | U | 12/2021 |
| CN | 113395925 | A | 4/2022 |
| CN | 114718908 | A | 7/2022 |
| CN | 115278447 | A | 11/2022 |
| CN | 113719478 | A | 8/2025 |
| EP | 3262922 | B1 | 4/2019 |
| EP | 4306807 | A1 | 1/2024 |
| JP | S6129778 | A | 7/1986 |
| WO | 2015139720 | A1 | 9/2015 |
| WO | 2016044268 | A1 | 3/2016 |
| WO | 2022048395 | A1 | 3/2022 |

OTHER PUBLICATIONS

Non-final Office Action from U.S. Appl. No. 19/019,277, dated Jun. 15, 2026, 17 pp.
International Search Report from application No. PCT/CN23/109482, dated May 30, 2024, 5 pp.
Extended Search Report from European application No. 23851597.7, dated Aug. 1, 2025, 9 pp.
Machine translation of CN104074157.
Machine translation of CN106714642.
Machine translation of CN113719478.
Machine translation of CN215256988.

* cited by examiner

AIRFLOW DEVICE

RELATED APPLICATION INFORMATION

This application is a continuation of International Application Number PCT/CN2023/109482, filed on Jul. 27, 2023, through which this application also claims the benefit under 35 U.S.C. § 119(a) of Chinese Patent Application No. CN 202210967982.6, filed on Aug. 12, 2022, Chinese Patent Application No. CN202320947789.6, filed on Apr. 24, 2023, and Chinese Patent Application No. CN 202310456589.5, filed on Apr. 25, 2023, which applications are incorporated by reference in their entireties.

BACKGROUND

By rotating fan blades, an airflow device drives gas to flow to do work, thereby implementing the main function of the airflow device. The airflow device may be a blower, a blow-suction machine, or the like. The blower is widely used in gardens, streets, homes, and other environments. The noise of the airflow device is affected by many factors, and the noise may further increase when the flow rate of the blown gas increases. Nowadays, users have higher requirements on the noise generated by the airflow device in operation.

The blowers usually include a handheld blower and a backpack blower. The backpack blower may be carried on the back of the user for use, so the power and air volume of the backpack blower are usually greater than those of the handheld blower, and the battery capacity of the backpack blower is also usually greater than that of the handheld blower.

SUMMARY

The present application adopts the technical solution below. An airflow device includes a grip for a user to hold; a pipe assembly for the air to pass through; fan blades rotatable about a fan axis; a motor for driving the fan assembly to rotate; and guide vanes for directing the airflow. The guide vane includes multiple through holes penetrating at least part of the guide vane.

In an example, at least one of the multiple through holes penetrates the guide vane along multiple through hole axes, where the multiple through hole axes are basically parallel to the fan axis of the fan assembly.

In an example, observing from the front side of the airflow device, at least one of the multiple through holes is basically circular, and the hole diameter D3 of the multiple through holes is greater than or equal to 2 mm and less than or equal to 5 mm.

In an example, the fan blade support portion 253 supports the fan blades 252, and the hub ratio is defined as the ratio of the maximum first diameter formed by the fan blade support portion to the second diameter formed by the outermost edges of the fan blades, where the hub ratio is greater than or equal to 0.4 and less than or equal to 0.5.

In an example, along the direction of the fan axis, the first distance L1 is formed between a guide vane root of the guide vane and the fan blade, where the first distance is greater than or equal to 5 mm and less than or equal to 30 mm.

In an example, a guide vane root of the guide vane intersects with a guide vane support portion, the fan assembly includes a fan front end located on the front side and a fan rear end located on the rear side, the guide vane support portion includes a first rear edge located on the rear side, and the second distance L2 is defined as the distance between the fan front end of the fan assembly and the first rear edge of the guide vane support portion, where the second distance is greater than or equal to 3 mm and less than or equal to 6 mm.

In an example, the radial thickness L3 of the guide vane is greater than or equal to 9 mm and less than or equal to 15 mm.

In an example, in the radial direction of a guide vane axis, an opening rate of the guide vane is defined as the ratio of the total opening area of the guide vane to the total radial area of the guide vane, where the opening rate is greater than or equal to 10% and less than or equal to 75%.

In an example, the ratio T/D of the average wall thickness T of the pipe assembly to the inner diameter D of the pipe assembly is greater than or equal to 1:50 and less than or equal to 1:15.

In an example, the airflow device is a blower, a blow-suction machine, or another device that performs work through the airflow.

The present application further adopts the technical solution below. An airflow device includes a grip for a user to hold; a pipe assembly for the air to pass through; a fan assembly including fan blades and a fan blade support portion supporting the fan blades, where the fan blades are rotatable about a fan axis, and the fan assembly is an axial flow fan; a motor for driving the fan assembly to rotate; and guide vanes for directing the airflow. The inner diameter of the pipe assembly is greater than or equal to 90 mm. The flow rate of the airflow device is greater than or equal to 1000 CFM. The maximum rotational speed of the motor is less than 35000 rpm.

In an example, along the direction of the fan axis, the first distance is formed between a guide vane root of the guide vane and the fan blade, where the first distance is greater than or equal to 5 mm and less than or equal to 30 mm.

In an example, along the direction of the fan axis, the first distance is formed between a guide vane root of the guide vane and the fan blade, where the first distance is greater than or equal to 5 mm and less than or equal to 20 mm.

In an example, the pipe assembly includes a first pipe and a second pipe, where the first pipe is located on the front side of the second pipe.

In an example, the average wall thickness of the pipe assembly is greater than or equal to 3 mm.

In an example, the hub ratio is defined as the ratio of the maximum first diameter formed by the fan blade support portion to the second diameter formed by the outermost edges of the fan blades, where the hub ratio is greater than or equal to 0.4 and less than or equal to 0.5.

In an example, a guide vane root of the guide vane intersects with a guide vane support portion, the fan assembly includes a fan front end located on the front side and a fan rear end located on the rear side, the guide vane support portion includes a first rear edge located on the rear side, and the second distance L2 is defined as the distance between the fan front end of the fan assembly and the first rear edge of the guide vane support portion, where the second distance is greater than or equal to 3 mm and less than or equal to 6 mm.

In an example, the airflow device includes a body, where the body includes the fan assembly, the motor, and a housing, and the housing is formed with the grip; the airflow device further includes a wind tube, the wind tube is detachably connected to the body, and the wind tube allows the air to pass through; the airflow device is provided with an ejection mechanism, and the ejection mechanism applies an ejection force so that the wind tube tends to be separated from the body.

In an example, the airflow device includes a battery pack coupling portion configured to mount a battery pack for supplying power to the airflow device.

In an example, the airflow device is a blower, a blow-suction machine, or another device that performs work through the airflow.

In an example, the airflow device further includes a handle used for the user to hold and located on the front side of the grip.

In an example, guide vanes for directing the airflow are further included, where the guide vane includes multiple through holes penetrating at least part of the guide vane.

In an example, the guide vane expands outward from a guide vane axis, and in the radial direction of the guide vane axis, an opening rate of the guide vane is defined as the ratio of the total opening area of the guide vane to the total radial area of the guide vane, where the opening rate is greater than or equal to 10% and less than or equal to 75%.

In an example, the ratio T/D of the average wall thickness T of the pipe assembly to the inner diameter D of the pipe assembly is greater than or equal to 1:50 and less than or equal to 1:15.

In an example, the airflow device is capable of being connected to a belt for use, a blower is provided with a belt coupling portion, the belt is provided with a belt mounting portion, and the belt coupling portion and the belt mounting portion are assembled so that the belt is mounted to the blower.

In an example, the airflow device further includes a display, where the display includes an electronic display screen.

In an example, the effective area S of the display is defined as the displayable area of the electronic display screen, where the effective area S is greater than or equal to 4 $cm^2$.

The present application further adopts the technical solution below. An airflow device includes a grip for a user to hold; a pipe assembly for the air to pass through; a fan assembly including fan blades and a fan blade support portion supporting the fan blades, where the fan blades are rotatable about a fan axis of the fan assembly, and the fan assembly is an axial flow fan; and a motor for driving the fan assembly to rotate. The airflow device further includes a handle used for the user to hold and located on the front side of the grip, the flow rate of the airflow device is greater than or equal to 1000 CFM, and the maximum rotational speed of the motor is less than 35000 rpm.

In an example, guide vanes for directing the airflow are further included, where along the direction of the fan axis, the first distance is formed between a guide vane root of the guide vane and the fan blade, where the first distance is greater than or equal to 5 mm and less than or equal to 20 mm.

In an example, the inner diameter of the pipe assembly is greater than or equal to 90 mm, and the average wall thickness of the pipe assembly is greater than or equal to 3 mm.

The present application further adopts the technical solution below. An airflow device includes a grip for a user to hold; a pipe assembly for the air to pass through; a fan assembly including fan blades and a fan blade support portion supporting the fan blades, where the fan blades are rotatable about a fan axis, and the fan assembly is an axial flow fan; a motor for driving the fan assembly to rotate; and guide vanes for directing the airflow. The hub ratio is defined as the ratio of the maximum first diameter D1 formed by the fan blade support portion to the second diameter D2 formed by the outermost edges of the fan blades, where the hub ratio is less than or equal to 0.5.

In an example, the hub ratio is greater than or equal to 0.4.

In an example, the maximum rotational speed of the motor is less than 30000 rpm.

In an example, the maximum rotational speed of the motor is less than or equal to 27500 rpm.

In an example, the inner diameter of the pipe assembly is greater than or equal to 90 mm.

In an example, the flow rate of the airflow device is greater than or equal to 1000 CFM.

In an example, a guide vane includes multiple through holes penetrating at least part of the guide vane.

In an example, along the direction of the fan axis, the first distance L1 is formed between a guide vane root of a guide vane and the fan blade, where the first distance is greater than or equal to 5 mm and less than or equal to 30 mm.

In an example, a guide vane root of a guide vane intersects with a guide vane support portion, the fan assembly includes a fan front end located on the front side and a fan rear end located on the rear side, the guide vane support portion includes a first rear edge located on the rear side, and the second distance L2 is defined as the distance between the fan front end of the fan assembly and the first rear edge of the guide vane support portion, where the second distance is greater than or equal to 3 mm and less than or equal to 6 mm.

In an example, the average wall thickness of the pipe assembly is greater than or equal to 3 mm.

The present application further adopts the technical solution below. An airflow device includes a grip for a user to hold; a pipe assembly for the air to pass through; fan blades rotatable about a fan axis; a motor for driving the fan assembly to rotate; and guide vanes for directing the airflow. The average wall thickness T of the pipe assembly is greater than 3 mm.

In an example, the product T*D of the average wall thickness T of the pipe assembly and the inner diameter D of the pipe assembly is greater than or equal to 2700 mm mm, and the ratio T/D of the average wall thickness T of the pipe assembly to the inner diameter D of the pipe assembly is greater than or equal to 1:50 and less than or equal to 1:15.

In an example, the flow rate of the airflow device is greater than or equal to 1000 CFM.

In an example, the inner diameter of the pipe assembly is greater than or equal to 90 mm.

In an example, the maximum rotational speed of the motor is less than 30000 rpm.

In an example, the average wall thickness T of the pipe assembly is greater than or equal to 3.5 mm.

In an example, a conical pipe is formed inside the pipe assembly, the conical pipe extends from a first end located on the front side of the pipe assembly, the conical pipe accommodates at least part of the motor, the distance by which the conical pipe extends from the first end is the fourth distance L4, the guide vane includes a third end facing the fan blade and a fourth end facing away from the fan blade, the distance from the fourth end to the first end is the fifth distance L5, and the ratio L4/L5 of the fifth distance to the fourth distance is greater than or equal to 0 and less than or equal to 0.1.

In an example, a conical pipe is formed inside the pipe assembly, the conical pipe extends from a first end located on the front side of the pipe assembly, the conical pipe accommodates at least part of the motor, the guide vane includes a third end facing the fan blade and a fourth end facing away from the fan blade, the distance from the fourth end to the first end is the fifth distance L5, and the fifth distance is approximately 0.

In an example, the airflow device includes a battery pack coupling portion configured to mount a battery pack for supplying power to the airflow device.

In an example, the airflow device is a blower, a blow-suction machine, or another device that performs work through the airflow.

The present application further adopts the technical solution below. An airflow device includes a grip for a user to hold; a pipe assembly for the air to pass through; a fan assembly including fan blades and a fan blade support portion supporting the fan blades, where the fan blades are rotatable about a fan axis of the fan assembly; and a motor for driving the fan assembly to rotate. The airflow device further includes a handle used for the user to hold and located on the front side of the grip, and the air volume of the airflow device is greater than 1000 CFM.

In an example, the handle is rotatable about a handle axis, the angle of rotation of the handle is a, and the angle of rotation a is greater than 10 degrees and less than or equal to 150 degrees.

In an example, the handle has at least one lockable position.

In an example, a housing is further included, where the pipe assembly is connected to the housing, and the handle is detachably connected to the housing.

In an example, a housing and a mounting assembly are further included, where the handle is mounted to the housing through the mounting assembly, and the mounting assembly enables the handle to rotate about a handle axis and enables the handle to be locked at any angle during a rotation process.

In an example, the mounting assembly includes a trigger, a rotary shaft, and a fastener, the rotary shaft passes through the housing and the handle, the fastener is detachably connected to an end of the rotary shaft, the trigger is hinged to the other end of the rotary shaft, and the trigger is rotatable relative to the rotary shaft so that the trigger has a locking position and an unlocking position, where when the trigger is at the locking position, the handle is clamped between the fastener and the trigger, and when the trigger is at the unlocking position, the handle is rotatable relative to the rotary shaft.

In an example, an illumination device disposed on the front side of the handle is further included.

In an example, the inner diameter of the pipe assembly is D, the width of the handle along the left and right direction is W, and W/D is greater than or equal to 1 and less than or equal to 2.5.

In an example, the handle is rotatable about a handle axis, the angle of rotation of the handle is a, and the angle of rotation is adjusted such that the maximum height of the airflow device supported on a plane is H, where H is greater than or equal to 200 mm and less than or equal to 450 mm.

In an example, the handle is rotatable about a handle axis, the angle of rotation of the handle is a, and the angle of rotation is adjusted such that the height of the airflow device placed on a plane is H, where the maximum diameter of the pipe assembly is D4, and H/D4 is greater than or equal to 1 and less than or equal to 4.

The present application further adopts the technical solution below. A handheld blower includes a grip for a user to hold; a pipe assembly for the air to pass through; a fan assembly including fan blades rotatable about a fan axis of the fan assembly; and a motor for driving the fan assembly to rotate. The handheld blower is capable of being connected to a belt for use, the handheld blower is provided with a belt coupling portion, the belt is provided with a belt mounting portion, and the belt coupling portion and the belt mounting portion are assembled so that the belt is mounted to the handheld blower.

In an example, the belt coupling portion is located behind the center of gravity G of the handheld blower.

In an example, a battery pack is further included, where the battery pack is used for supplying power to the handheld blower, the battery pack is mounted behind the pipe assembly, and the belt coupling portion is disposed between an air inlet end of the pipe assembly and the battery pack.

In an example, the belt coupling portion is disposed below the grip.

In an example, the belt includes a belt body, a coupling member, and a lifting strap, a penetration portion is provided on the coupling member, an end of the lifting strap is connected to the belt body, and the other end of the lifting strap is connected to the belt body after passing through the penetration portion.

In an example, two lifting straps are provided, an end of one of the two lifting straps and an end of the other one of the two lifting straps are connected to the belt body, and the other end of one of the two lifting straps and the other end of the other one of the two lifting straps pass through the penetration portion, intersect, and are connected to the belt body.

In an example, a belt body includes a looped portion, the looped portion is used for surrounding the waist of the user, a first mounting portion and a second mounting portion extend from two ends of the looped portion, and the first mounting portion and the second mounting portion are assembled so that the belt is capable of being locked to the waist of the user. In an example, the belt body further includes a shielding portion connected to the looped portion and extending downward from the looped portion.

In an example, the looped portion has a first height M1 along the up and down direction, and the shielding portion has a second height M2 along the up and down direction, where the second height M2 is greater than or equal to the first height M1.

In an example, the looped portion has a first height M1 along the up and down direction, and the shielding portion has a first length M3 along the left and right direction, where the first length M3 is greater than or equal to the first height M1.

The present application further adopts the technical solution below. A handheld blower includes a grip for a user to hold; a pipe assembly for the air to pass through; a fan assembly including fan blades rotatable about an axis of the fan assembly; and a motor for driving the fan assembly to rotate. The handheld blower further includes a display, where the display includes an electronic display screen.

In an example, the display is disposed on the front side of the grip.

In an example, a handle for the user to hold is further included, where the display is disposed between the grip and the handle.

In an example, a housing is further included, where the pipe assembly is disposed on the front side of the housing, and the display is disposed on the housing.

In an example, a control assembly is further included, where the minimum distance between the display and the control assembly is less than or equal to 100 mm.

In an example, a battery pack for supplying power to the handheld blower is further included, where the display is capable of displaying at least one of the power capacity of the battery pack, the output rotational speed of the handheld blower, an operation gear of the handheld blower, a fault prompt, and a Bluetooth connection state.

In an example, an illumination device is further included.

In an example, a handle for the user to hold is further included, where the illumination device is disposed on the front side of the handle.

In an example, the display includes screen box soft rubber, a light-transmissive screen, screen box hard rubber, a light source, a communication board, and a control board.

In an example, the effective area S of the display is defined as the displayable area of the electronic display screen, where the effective area S is greater than or equal to 4 $cm^2$.

DETAILED DESCRIPTION

Figure 1:
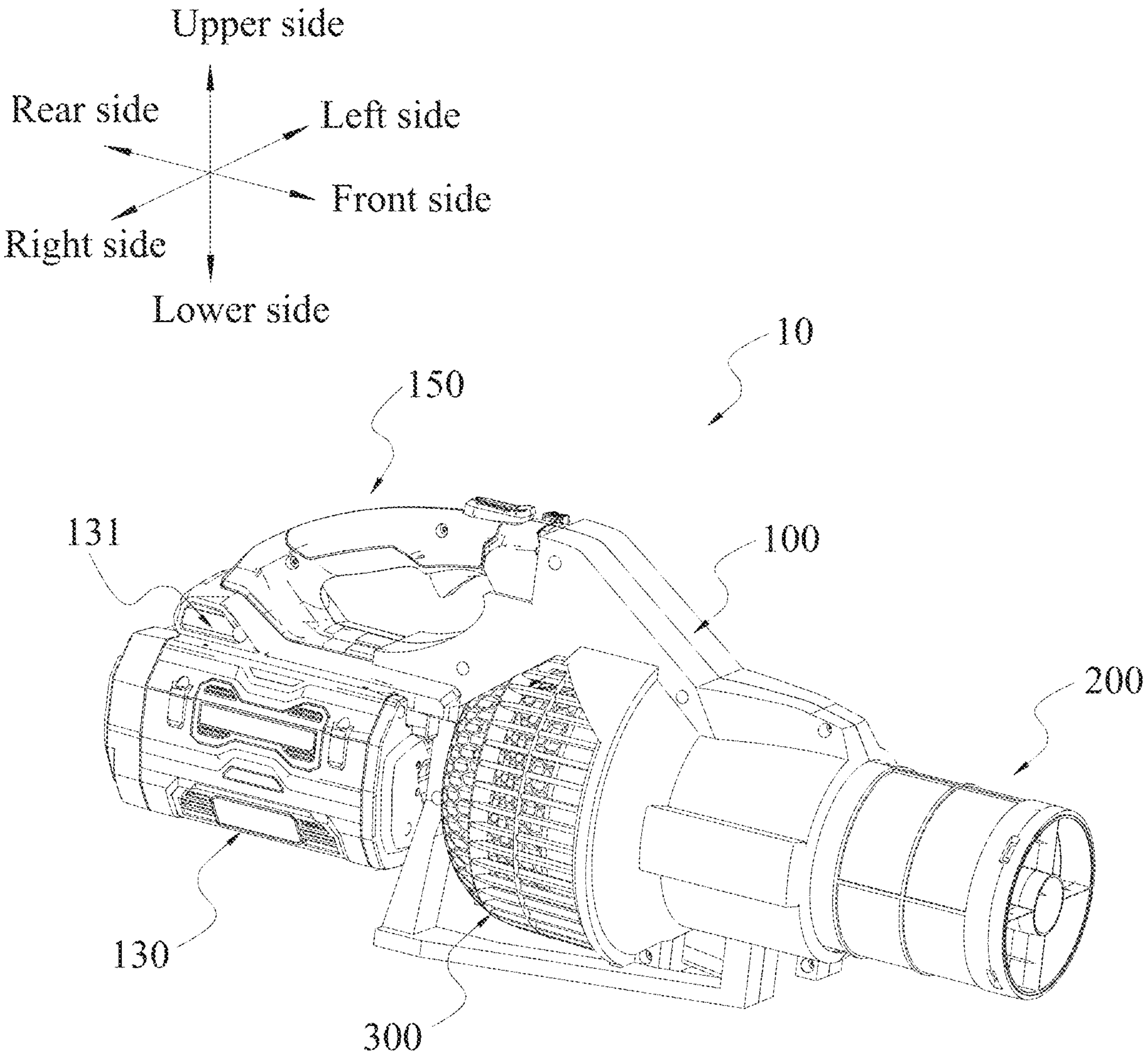
FIG. 1 is a perspective view of a blower from one perspective.

In this application, the terms “comprising”, “including”, “having” or any other variation thereof are intended to cover an inclusive inclusion such that a process, method, article or device comprising a series of elements includes not only those series of elements, but also other elements not expressly listed, or elements inherent in the process, method, article, or device. Without further limitations, an element defined by the phrase “comprising a . . . ” does not preclude the presence of additional identical elements in the process, method, article, or device comprising that element.

In this application, the term “and/or” is a kind of association relationship describing the relationship between associated objects, which means that there can be three kinds of relationships. For example, A and/or B can indicate that A exists alone, A and B exist simultaneously, and B exists alone. In addition, the character “/” in this application generally indicates that the contextual associated objects belong to an “and/or” relationship.

In this application, the terms “connection”, “combination”, “coupling” and “installation” may be direct connection, combination, coupling or installation, and may also be indirect connection, combination, coupling or installation. Among them, for example, direct connection means that two members or assemblies are connected together without intermediaries, and indirect connection means that two members or assemblies are respectively connected with at least one intermediate members and the two members or assemblies are connected by the at least one intermediate members. In addition, "connection" and "coupling" are not limited to physical or mechanical connections or couplings, and may include electrical connections or couplings.

In this application, a person of ordinary skill in the art will understand that relative terms (e.g., "about", "approximately", "substantially", etc.) used in conjunction with quantities or conditions include the values and have the meaning indicated by the context. For example, the relative term includes at least the degree of error associated with the measurement of a specific value, the tolerance caused by manufacturing, assembly, use, etc. associated with a specific value. Such terms should also be regarded as disclosing a range defined by the absolute values of the two endpoints. Relative terms may refer to the addition or subtraction of a certain percentage (e.g., 1%, 5%, 10% or more) of the indicated value. Numerical values that do not use relative terms should also be disclosed as specific values with tolerances. In addition, "substantially" when expressing a relative angular position relationship (e.g., substantially parallel, substantially perpendicular) may refer to adding or subtracting a certain degree (e.g., 1 degree, 5 degrees, 10 degrees or more) on the basis of the indicated angle. In the present application, a person of ordinary skill in the art will understand that the function performed by a component may be performed by one component, multiple components, one part, or multiple parts. Similarly, the function performed by a part may also be performed by one part, one component, or a combination of multiple parts.

In this application, the terms "upper", "lower", "left", "right", "front", "back" and other directional words are described in terms of the orientation and position relationship shown in the accompanying drawings. In addition, in the context, it is also necessary to understand that when it is mentioned that an element is connected to another element "upper" or "lower", it can not only be directly connected to another element "upper" or "lower", but also indirectly connected to another element "upper" or "lower" through an intermediate element. It should also be understood that the directional words such as upper side, lower side, left side, right side, front side, back side, etc. not only represent the positive orientation, but can also be understood as the side orientation. For example, the bottom may include directly below, lower left, lower right, lower front, and lower back, etc.

The present application is applicable to an airflow device, which can implement functions including one or two of blowing and suction. That is to say, the airflow device may be a fan. For example, the airflow device may be a blower, a blow-suction machine, or another device that needs to blow or suck the airflow to do work. The blower accelerates the air through the rotation of the fan and pushes an object to be moved through the airflow. The blow-suction machine has two functions: blowing and suction so that the blow-suction machine can push the object through the airflow and suck the object through the airflow. The blower and the blow-suction machine are often used in fields such as garden cleaning.

The technical solution of the present application is described below using a blower 10 as an example.

As shown in FIGS. 1 to 4, the blower 10 includes a housing 100, a blow-suction structure 200, and a power supply system. The housing 100 forms an accommodation space that can accommodate at least part of the blow-suction structure 200, and the housing 100 is formed with or connected to a grip 150 for the user to hold. The blow-suction structure 200 includes functional assemblies for implementing blowing and suction functions, such as a motor 230, a fan assembly 250, and guide vanes 282. The blow-suction structure 200 further includes a pipe assembly 260 for fixing and accommodating the preceding functional assemblies and providing a channel for the airflow. A vent cover 300 is used for sucking air into the blow-suction structure 200. In this example, the vent cover 300 is grid-shaped. The housing 100 connects and fixes the vent cover 300 to the blow-suction structure 200. Air is sucked into the blower 10 through the vent cover 300 and driven by the fan assembly 250 in the blow-suction structure 200 to be blown out from a first end 201 of the blow-suction structure 200.

In this example, the housing 100 includes a left housing 110 and a right housing 120, and the left housing 110 and the right housing 120 together form the grip 150 for the user to hold. The left housing 110 forms a first coupling portion 111, the right housing 120 forms a second coupling portion 121, and the first coupling portion 111 and the second coupling portion 121 together form a battery pack coupling portion 131 for mounting a battery pack 130. The battery pack 130 may supply power to the blower 10, and the blower 10 may use mains power. The lower end of the left housing 110 is formed with or connected to a first bracket 112, and the lower end of the right housing 120 is formed with or connected to a second bracket 122. When the blower 10 is placed on a plane, the first bracket 112 and the second bracket 122 support the blow-suction structure 200 so that the blower 10 does not fall over. In an example, the grip 150 may be provided independently of the housing 100, that is to say, the grip 150 may not be formed by extending from the housing 100.

Figure 2:
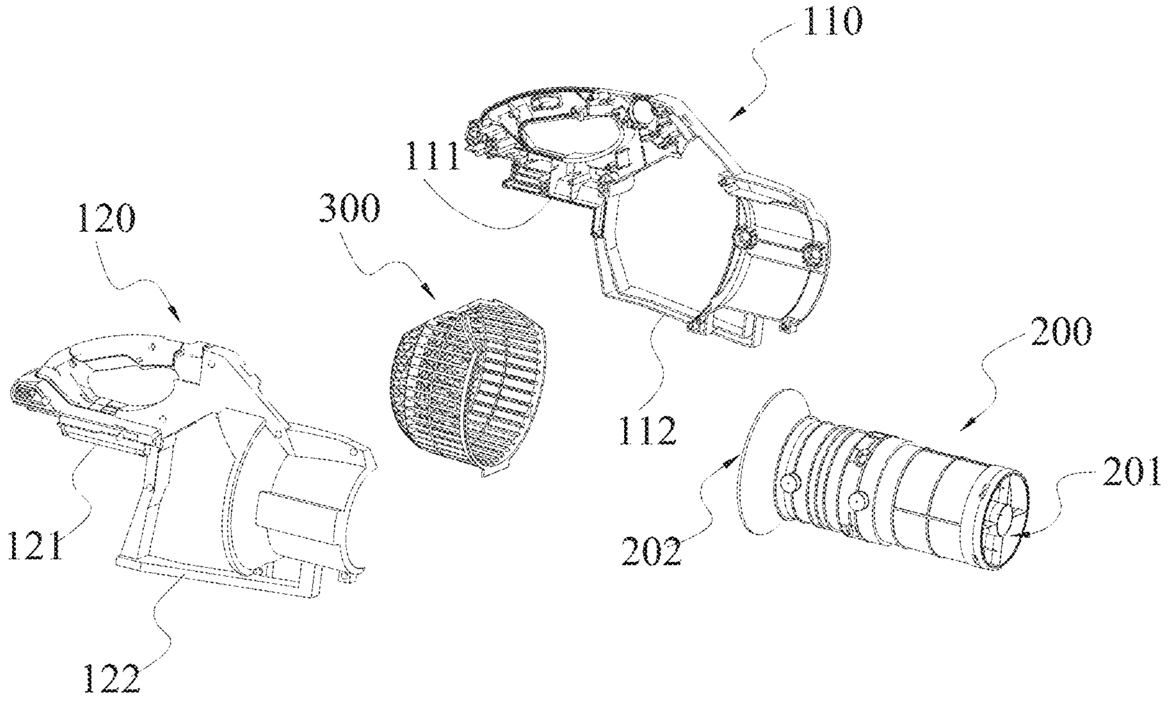
FIG. 2 is an exploded view of a blower.
Figure 3:
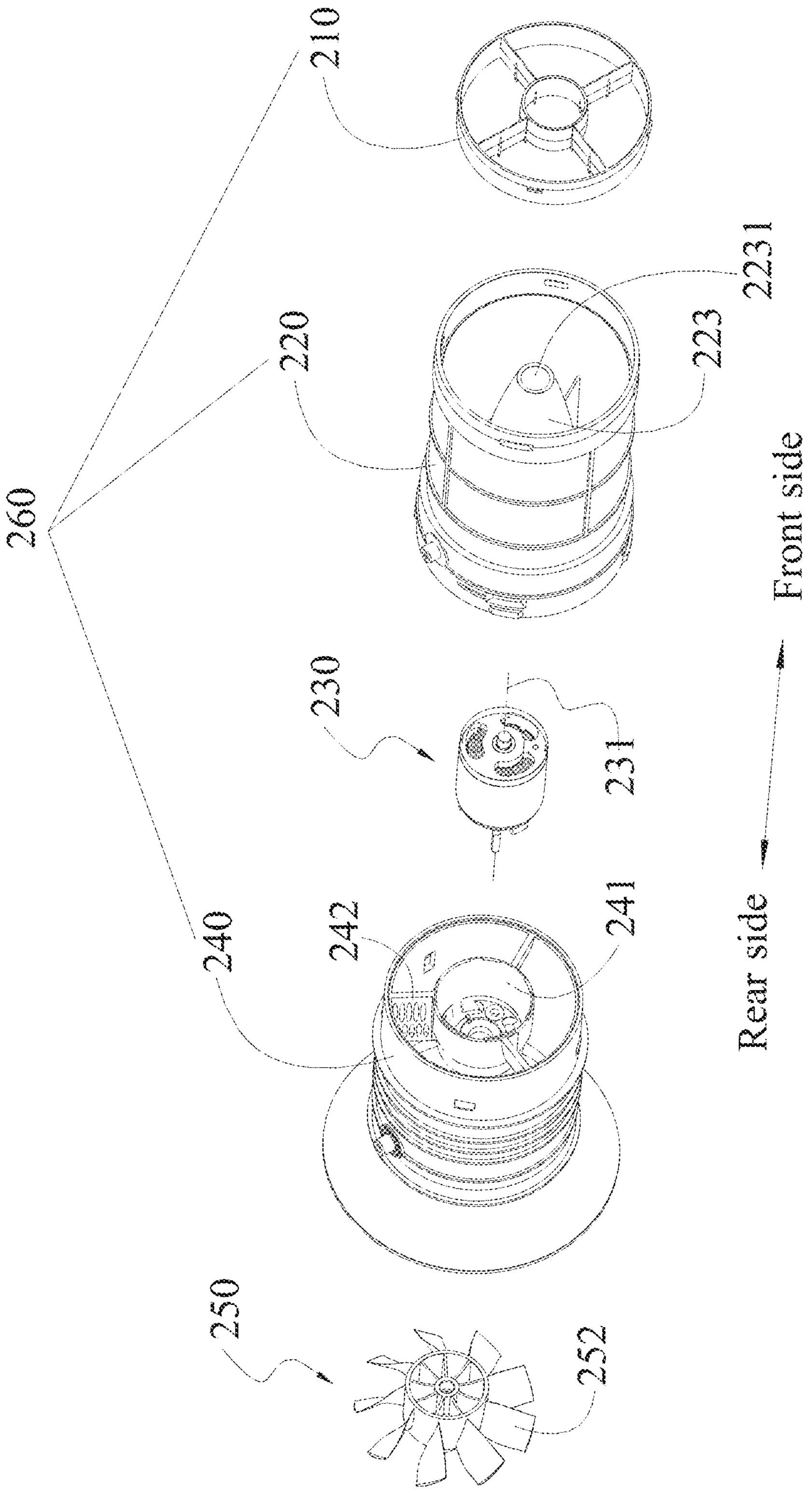
FIG. 3 is an exploded view of a pipe assembly shown in FIG. 2.
Figure 4:
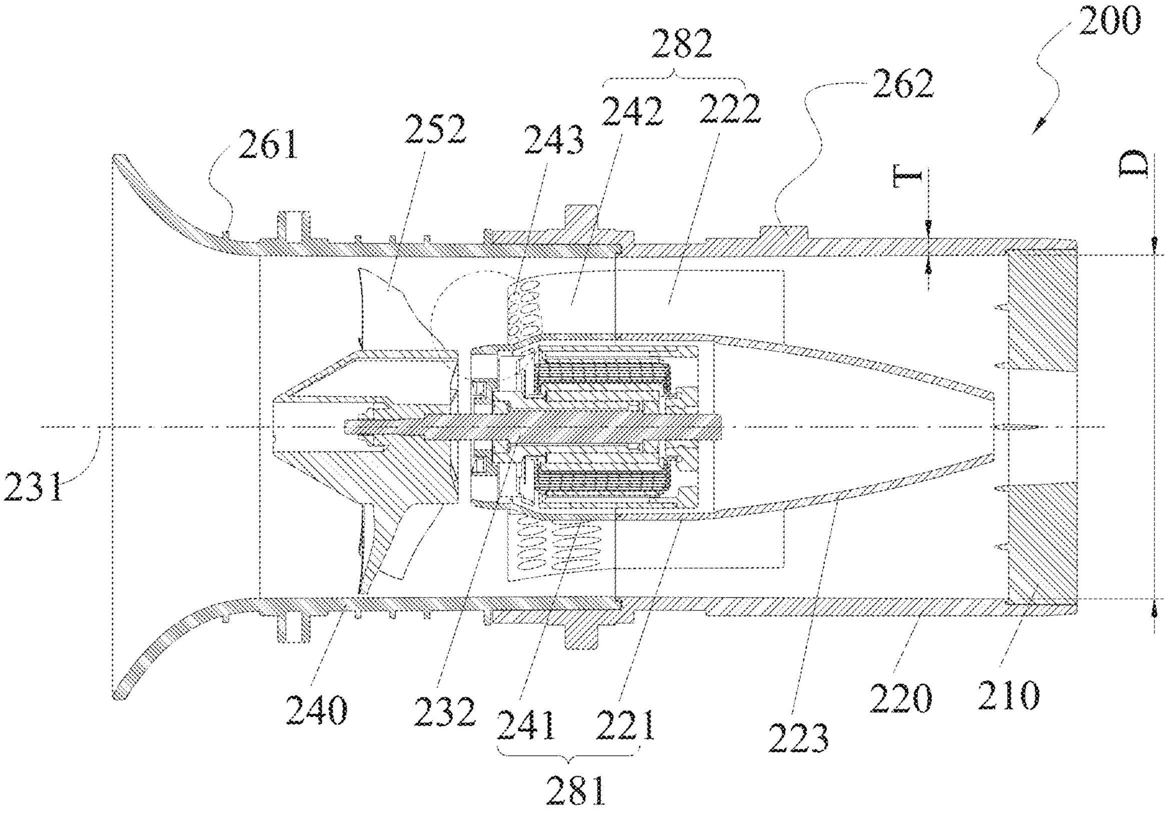
FIG. 4 is a sectional view of some structures of the blower shown in FIG. 1.

As shown in FIGS. 2 to 4, the pipe assembly 260 is connected to the housing 100, and at least part of the pipe assembly 260 is wrapped and/or fixed by the housing 100. The pipe assembly 260 is used for the air to pass through and includes a first end 201 and a second end 202. At least part of the airflow flows between the first end 201 and the second end 202. For the blower 10 in this example, the rotation of the motor 230 drives fan blades 252 to rotate so that the air outside the blower 10 enters the second end 202 of the pipe assembly 260 from the vent cover 300, flows through the fan blades 252, the guide vanes 282, and a conical pipe 223 in sequence, and finally flows out from the first end 201 of the pipe assembly 260. For the blow-suction machine, when the blow-suction machine is in a suction mode, the airflow flows in a direction opposite to that in the preceding blower.

Figure 6:
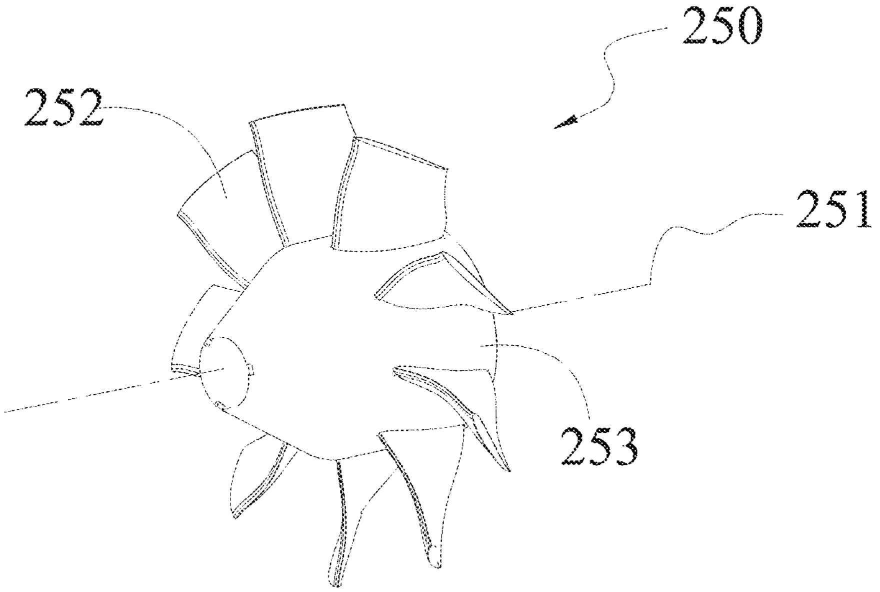
FIG. 6 is a perspective view of a fan assembly.
Figure 7:
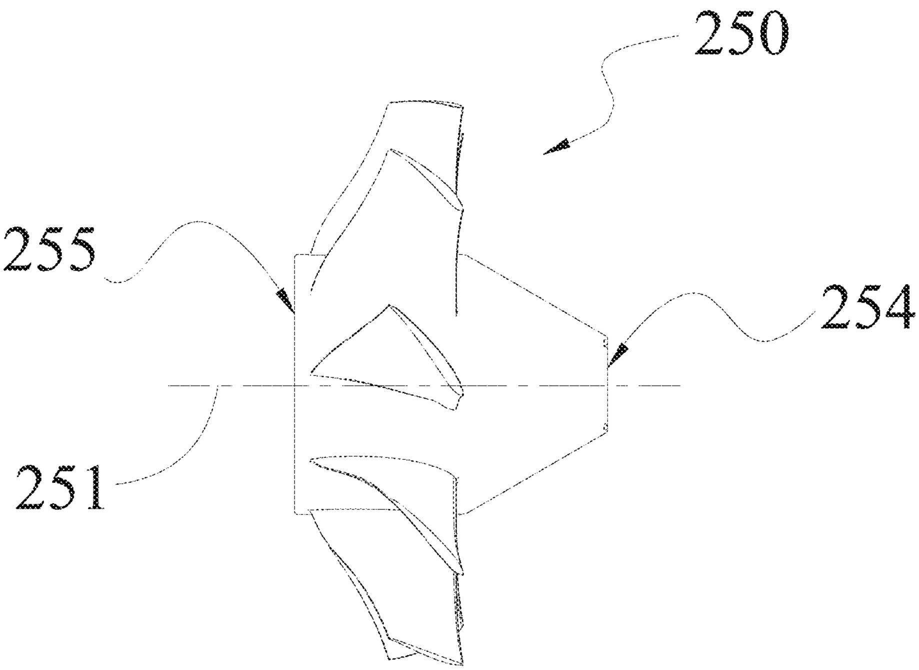
FIG. 7 is a side view of the fan assembly in FIG. 6.

As shown in FIGS. 6 and 7, the fan assembly 250 includes fan blades 252 and a fan blade support portion 253, and the fan blades 252 are mounted on the fan blade support portion 253 or integrally formed with the fan blade support portion 253. The fan blades 252 are rotatable about a fan axis 251. The fan assembly 250 may be an axial flow fan or a centrifugal fan.

As shown in FIGS. 3 and 4, the motor 230 includes a motor output shaft 232, the motor output shaft 232 extends along a motor axis 231, and the fan axis 251 of the fan blades 252 basically coincides with the motor axis 231. A rear end 254 (referring to FIG. 7) of the fan assembly 250 has a hollow structure inside. The motor output shaft 232 extends into the fan blade support portion 253 of the fan assembly 250. The motor output shaft 232 and the fan assembly 250 are fixed by screws.

FIG. 4 and FIGS. 9 to 14 disclose the structures of a second pipe 240 and the guide vanes 282 therein.

Figure 9:
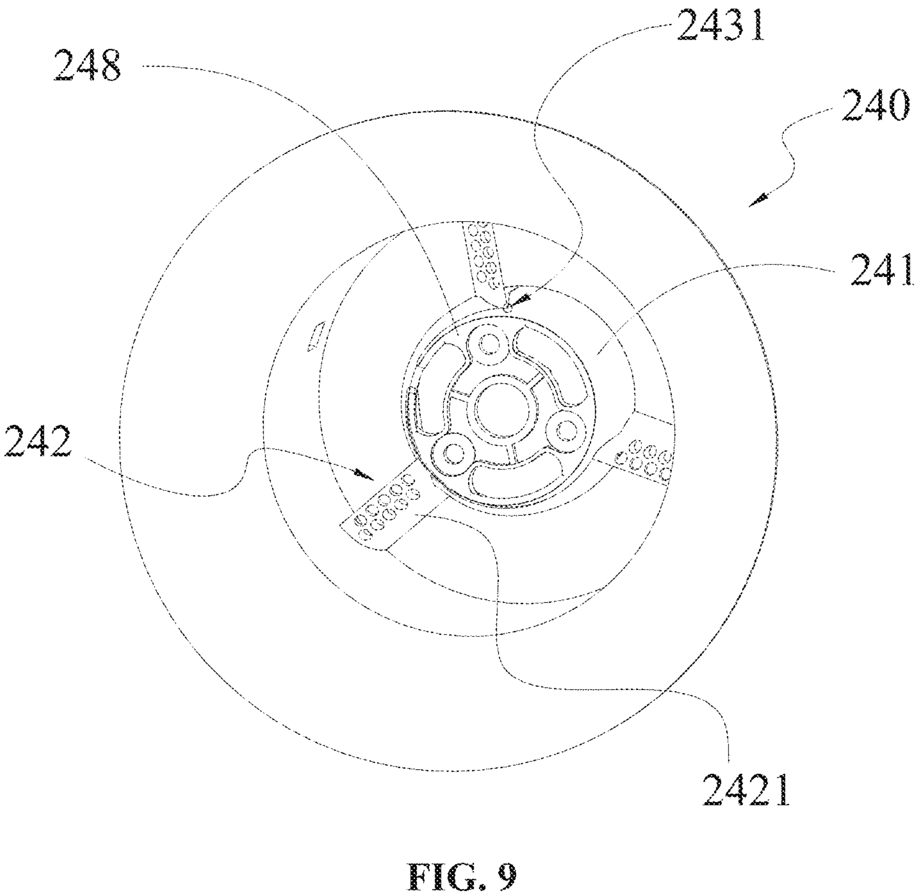
FIG. 9 is a perspective view of a second pipe in FIG. 3.

As shown in FIG. 4, in this example, the pipe assembly 260 includes a first pipe 220 and a second pipe 240. The guide vanes 282 include first guide vanes 242 and second guide vanes 222. The first guide vanes 242 are located in the second pipe 240, and the second guide vanes 222 are located in the first pipe 220. The blower 10 further includes a guide vane support portion 281 for supporting the guide vanes 282. The guide vane support portion 281 includes a first guide vane support portion 241 and a second guide vane support portion 221. The first guide vane support portion 241 supports the first guide vanes 242, and the second guide vane support portion 221 supports the second guide vanes 222. A guide vane root 2431 of the first guide vane 242 is located on the first guide vane support portion 241, and the first guide vane 242 connects the first guide vane support portion 241 to an outer housing of the second pipe 240. As shown in FIG. 9, three first guide vanes 242 are disposed on the first guide vane support portion 241. The first guide vane support portion 241 forms an accommodation space for accommodating at least part of the motor 230. The screw passes through a mounting hole 246 to fix the motor 230 into the second pipe 240. A guide vane axis 249 passes through the center of the first guide vane support portion 241. The first guide vanes 242 are arranged at intervals in the circumferential direction of the guide vane axis 249. The first guide vanes 242 and the first guide vane support portion 241 extend basically along the radial direction of the guide vane axis 249.

It is to be noted that, as shown in FIG. 3, in this example, the pipe assembly 260 further includes a protective cover 210, and the protective cover 210 is not the guide vane 282. The protective cover 210 is disposed at the frontmost side of the conical pipe 223 and may be used for reminding the operator not to put hands into the blower 10. In this example, four ribs are provided on the protective cover 210, and three guide vanes 282 are provided. In addition, as shown in FIG. 4, the guide vanes 282 are disposed between the fan blades 252 and the protective cover 210, and the guide vanes 282 are disposed between the fan blades 252 and the conical pipe 223. The second guide vane support portion 221 extends forward and is connected to the conical pipe 223. Therefore, in other words, the guide vanes 282 surround and support the conical pipe 223. After the airflow flows in through the vent cover 300 of the second end 202 of the blower 10 and is accelerated by the fan blades 252, the airflow is guided by the guide vanes 282 to flow along the outer wall of the conical pipe 223 to an air port 2231 on the front side of the conical pipe 223. At this time, a part of the airflow passes through the protective cover 210 and flows out from the second end 201 of the blower 10, and the other part of the airflow flows back from the air port 2231 to the motor 230 to help the motor dissipate heat.

Figure 10:
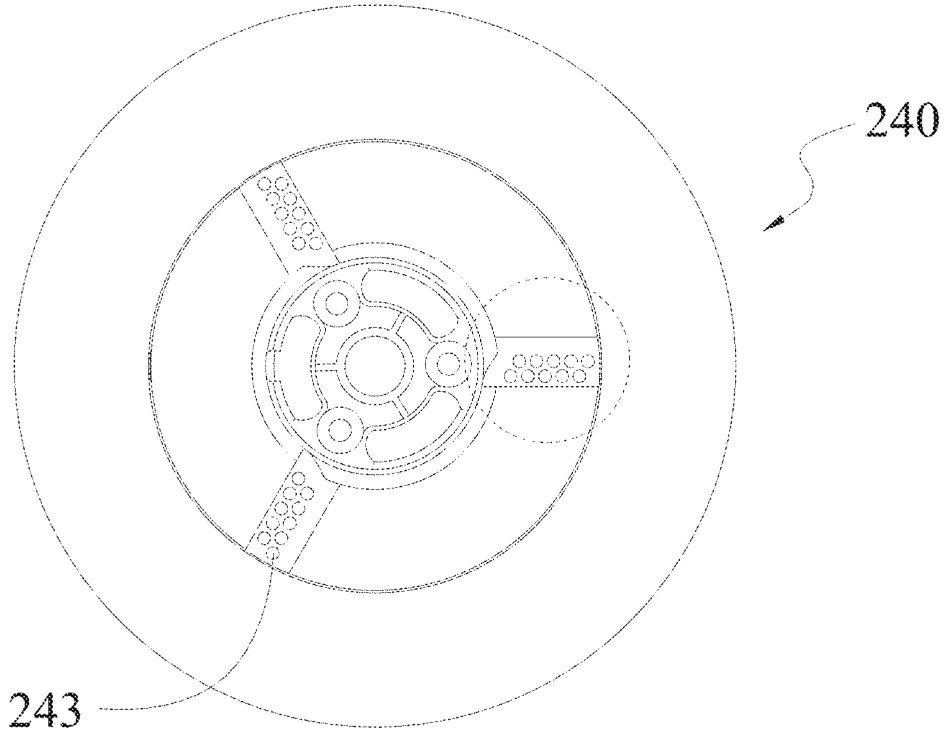
FIG. 10 is a front view of the second pipe in FIG. 9.
Figure 11:
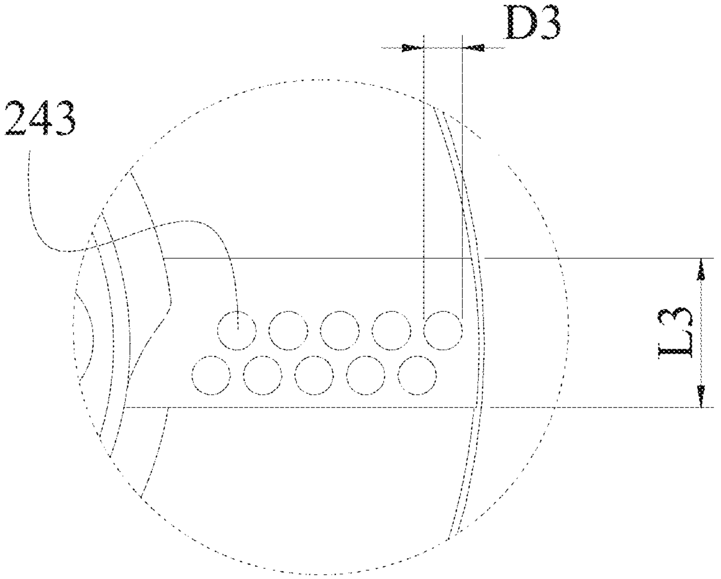
FIG. 11 is a partial enlarged view of a region in FIG. 10.

As shown in FIGS. 10 and 11, the first guide vane 242 includes multiple through holes 243 penetrating at least part of the first guide vane 242. In this example, each first guide vane 242 is provided with multiple through holes 243. In this example, the radial thickness L3 of the first guide vane 242 is greater than or equal to 9 mm and less than or equal to 15 mm. In an example, the radial thickness L3 is about 11 mm. In an example, the radial thickness L3 is about 13 mm. When the fluid flows through the first guide vane 242, part of the fluid passes through the multiple through holes in the first guide vane 242 so that flow diversion, vibration damping, and noise reduction can be achieved.

As shown in FIG. 11, when the first guide vane 242 is observed from the front side of the airflow device or the blower 10, at least one of the multiple through holes 242 is basically circular, and the hole diameter D3 of each of the multiple through holes 242 is greater than or equal to 2 mm and less than or equal to 5 mm. In an example, the hole diameter D3 is about 2.5 mm. In an example, the hole diameter D3 is about 3 mm. In an example, the hole diameter D3 is about 3.5 mm. In an example, the hole diameter D3 is about 4 mm. It is to be noted that the shapes of the multiple through holes 243 are not limited as long as the fluid such as air can pass through the inside of the multiple through holes 243. It is to be noted that, in this example, basically circular includes both a circle in the geometric sense and an ellipse with a ratio of the major axis length to the minor axis length being between 1 and 1.1.

Figure 5:
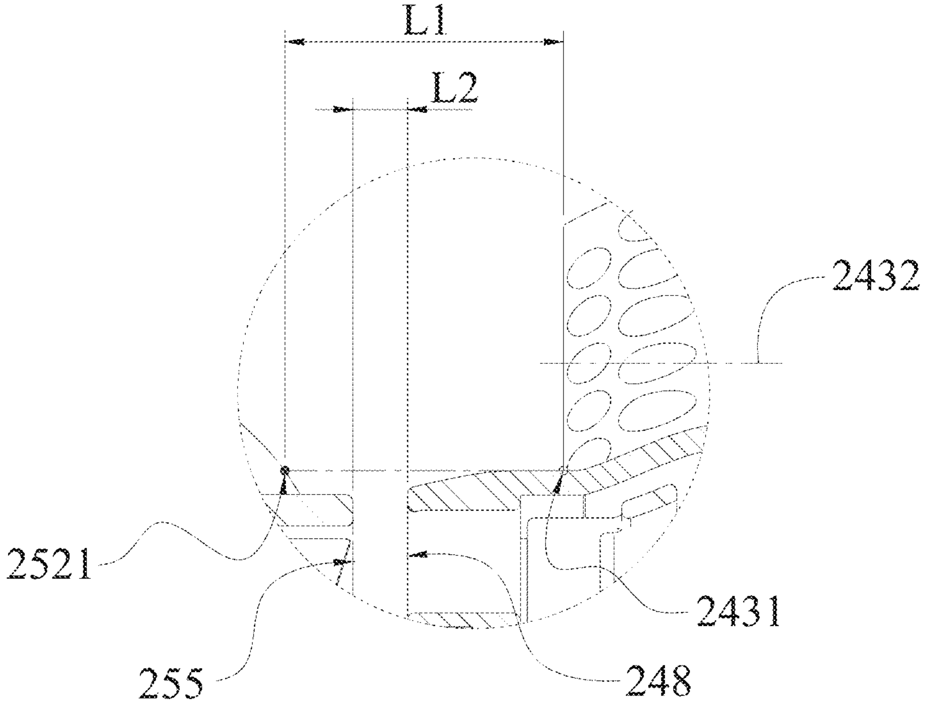
FIG. 5 is a partial enlarged view of a region in FIG. 4.

As shown in FIG. 5, in this example, at least one of the multiple through holes 243 penetrates the first guide vane 242 along a through hole axis 2432, and the through hole axis 2432 is basically parallel to the fan axis 251 of the fan assembly 250. Since the fan axis 251 is basically parallel to the guide vane axis 249, the through hole axis 2432 is also basically parallel to the guide vane axis 249. The "punching direction" of the multiple through holes 243 is basically consistent with the motion direction of the fluid such as air. The multiple through holes 243 penetrate the first guide vane 242 along through hole axes 2432, and the through hole axes 2432 are basically parallel to the fan axis 251 of the fan assembly 250. In this example, the through hole axes 2432 are also basically parallel to the guide vane axis 249 and the fan axis 251. In an example, the through hole axes 2432 of the multiple through holes 243 may form an included angle with the guide vane axis 249, and the included angle is greater than 0 degrees and less than or equal to 50 degrees. Within this angle range, the multiple through holes 243 guide the flow direction of the fluid to a certain extent, thereby reducing the vibration and noise generated when the fluid "collides" with the first guide vanes 242. In some examples, the included angle may be 10 degrees, 20 degrees, or 30 degrees. It is to be noted that, in this example, basically parallel includes both absolute parallelism of two axes in the geometric sense and a state in which the included angle between the two axes is relatively small, such as a state in which the included angle between the two axes is within 10 degrees.

Figure 12:
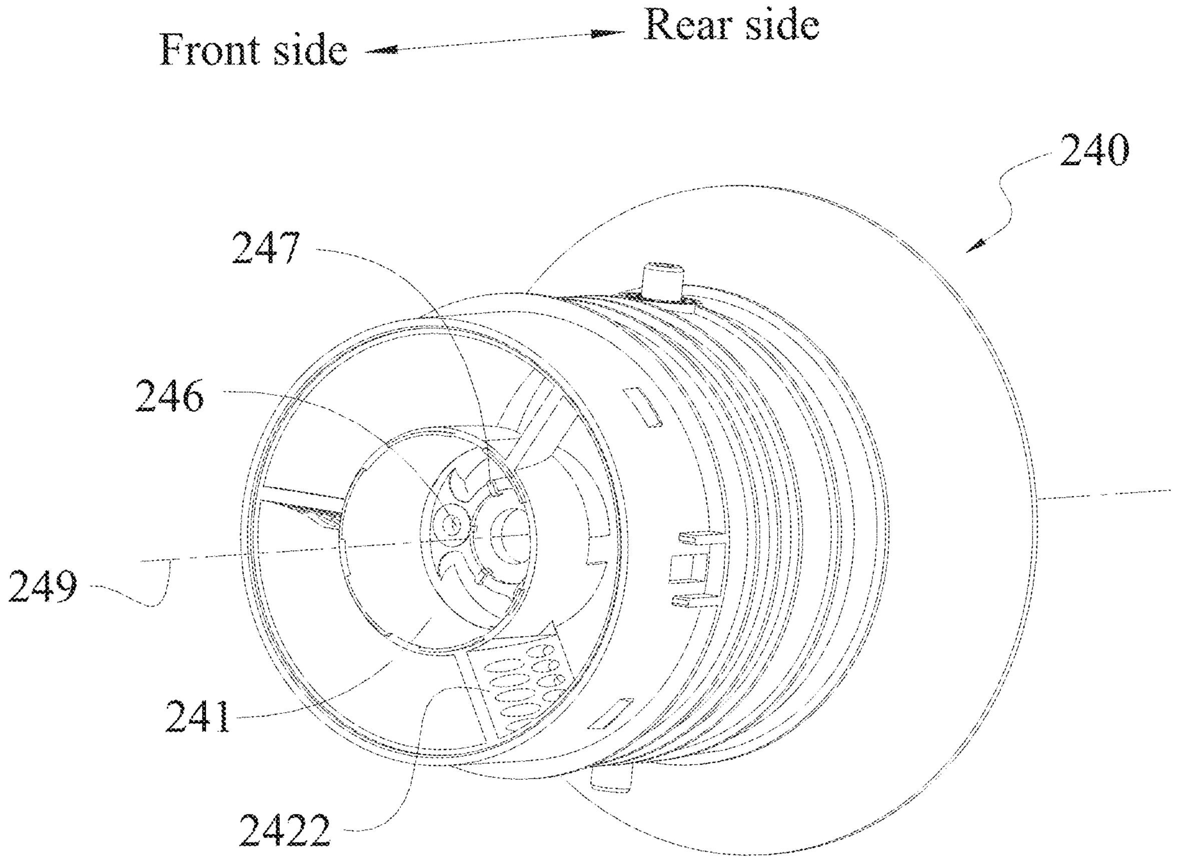
FIG. 12 is a perspective view of the second pipe in FIG. 9 from another perspective.
Figure 13:
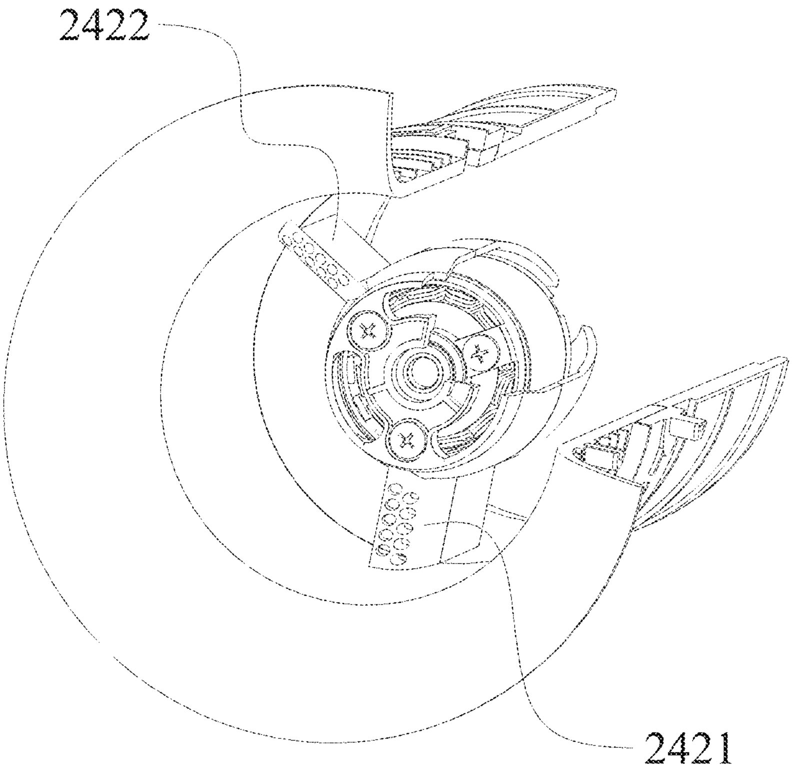
FIG. 13 is a sectional perspective view of the second pipe in FIG. 12.

For ease of description, as shown in FIGS. 9, 12, and 13, the first guide vane 242 includes at least a first surface 2421 and a second surface 2422. In this example, the first surface 2421 is an outwardly convex surface, and the second surface 2422 is an inwardly concave surface. When the fluid flows to the first surface 2421, a part of the fluid passes through the multiple through holes 242, and the other part of the fluid continues flowing along the first surface of the first guide vane 242. Finally, a part of all the fluid passing through the first guide vane 242 flows out from the first end 201 (referring to FIG. 2) of the pipe assembly 260, and the other part enters the air port 2231 of the conical pipe 223 and flows back to the motor 230 to help the motor 230 to dissipate heat.

As shown in FIG. 11, in the radial direction of the guide vane axis 249, the opening rate of the first guide vane 242 is defined as the ratio of the total opening area of the first guide vane 242 to the total area of the first guide vane 242, and the opening rate is greater than or equal to 10% and less than or equal to 75%. In an example, the opening rate is greater than or equal to 20% and less than or equal to 50%. In an example, the opening rate may be 25%, 30%, or 40%. Limiting the range of the opening rate is equivalent to limiting the proportion of the fluid that can flow through the inside of the first guide vane 242 so that while the guiding capability of the first guide vane 242 is not greatly reduced, the degree of the impact between the fluid and the first surface 2421 of the first guide vane 242 can be reduced, thereby reducing the vibration and noise.

It is to be noted that the space formed between two adjacent guide vanes 282 is not the multiple through holes 243 mentioned in the present application, and the multiple through holes 243 are formed on the same guide vane 282. The opening rate is also for the same guide vane 282. In an example, different guide vanes 282 on the same blower 10 may have different opening rates, and different guide vanes 282 on the same blower 10 may have different through-hole shapes. Referring to FIGS. 4 and 5, FIG. 5 is a partial enlarged view of FIG. 4. As shown in FIG. 5, along the direction of the fan axis 251, the first distance L1 is formed between the guide vane root 2431 of the first guide vane 242 and the fan blade 252, where the first distance L1 is greater than or equal to 5 mm and less than or equal to 30 mm. It is to be noted that the guide vane root 2431 refers to the rearmost side of the intersection of the first guide vane 242 and the first guide vane support portion 241. As shown in FIG. 5, a projection of the guide vane root 2431 on the fan blade 252 along the direction of the guide vane axis 249 is a first point 2521 on the fan blade 252, and the distance between the guide vane root 2431 and the first point 2521 is the first distance L1.

In an example, the first distance L1 is greater than or equal to 5 mm and less than or equal to 30 mm. In an example, the first distance L1 is greater than or equal to 5 mm and less than or equal to 20 mm. In an example, the first distance L1 is greater than or equal to 20 mm and less than or equal to 30 mm. In some examples, the first distance L1 is about 100 mm, 15 mm, or 20 mm. According to the preceding settings, when the first distance L1 is greater than or equal to 5 mm and less than or equal to 30 mm, the distance set between the first guide vane 242 and the fan blade 252 can make the fluid flow from the fan blade 252 to the first guide vane 242 at a more appropriate speed and impact force, and the vibration and noise generated when the fluid "collides" with the first guide vane 242 are not too large. If the first distance L1 is greater than 30 mm, the distance between the fan blade 252 and the first guide vane 242 is too large, affecting the flow guiding effect of the first guide vane 242. If the first distance L1 is less than 5 mm, the distance between the fan blade 252 and the first guide vane 242 is too small, and the vibration and noise generated by the airflow are relatively large.

The fan assembly 250 includes a fan front end 255 located on the front side and a fan rear end 254 located on the rear side, and the first guide vane support portion 241 includes a first rear edge 248 located on the rear side (referring to FIG. 9). The second distance L2 is defined as the distance between the fan front end 255 of the fan assembly 250 and the first rear edge 248 of the first guide vane support portion 241, and the second distance L2 is greater than or equal to 3 mm and less than or equal to 6 mm. When the second distance L2 is in the above range, the heat dissipation performance of the motor 230 is better.

As shown in FIG. 4, the average wall thickness T of the pipe assembly 260 is greater than or equal to 3 mm. It is to be noted here that the average wall thickness T refers to the average thickness of the pipe wall of the pipe assembly 260. For example, the average wall thickness T of the first pipe 220 is greater than or equal to 3 mm, and the average wall thickness T of the second pipe 240 is greater than or equal to 3 mm. The average wall thickness here does not take into account the local wall thickness increase caused by the irregular thickness increase on the outer side of the pipe assembly 260. For example, the thickness increase caused by a first protrusion 262 on the first pipe 220 is not taken into account in the average wall thickness of the first pipe 220 and the average wall thickness of the pipe assembly 260. For another example, the local thickness increase caused by a first convex ring 261 on the second pipe 240 is not taken into account in the average wall thickness of the second pipe 240 and the average wall thickness of the pipe assembly 260. In this example, the first protrusion 262 and the first convex ring 261 may be provided to implement functions such as assembly or local reinforcement. Regardless of whether the fan assembly 250 is a centrifugal fan or an axial flow fan, the vibration of the fan and the noise generated by the vibration can be reduced as long as the average wall thickness T of the pipe assembly 260 is greater than or equal to 3 mm.

In an example, the inner diameter D of the first pipe 220 is greater than or equal to 90 mm. In some examples, the inner diameter D may be 95 mm, 100 mm, 105 mm, 110 mm, 115 mm, or 125 mm. The product T*D of the average wall thickness T of the pipe assembly and the inner diameter D of the pipe assembly is greater than or equal to 2700 mm mm, and the ratio T/D of the average wall thickness T of the pipe assembly to the inner diameter D of the pipe assembly is greater than or equal to 1:50 and less than or equal to 1:15.

According to the blower design in the related art, the average wall thickness of the pipe assembly 260 is mostly less than 3 mm, thereby achieving a smaller overall weight. On the other hand, when the average wall thickness of the pipe assembly 260 is less than 3 mm, if the inner diameter D of the pipe assembly 260 increases to be greater than or equal to 90 mm, theoretically, the stiffness of the pipe assembly 260 increases.

Figure 19:
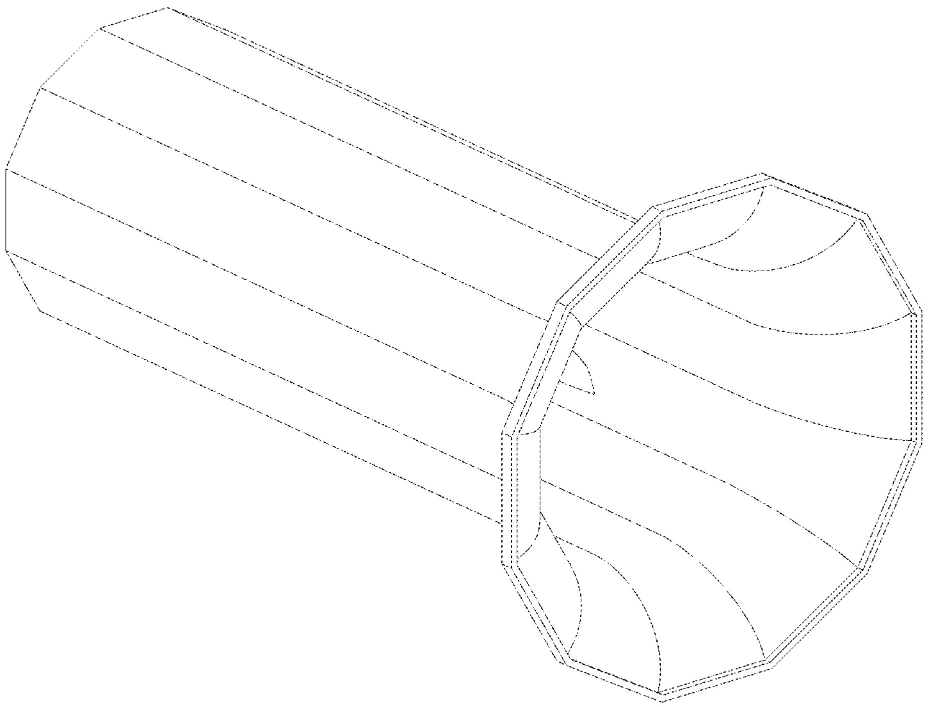
FIG. 19 is a schematic view of another pipe assembly.
Figure 20:
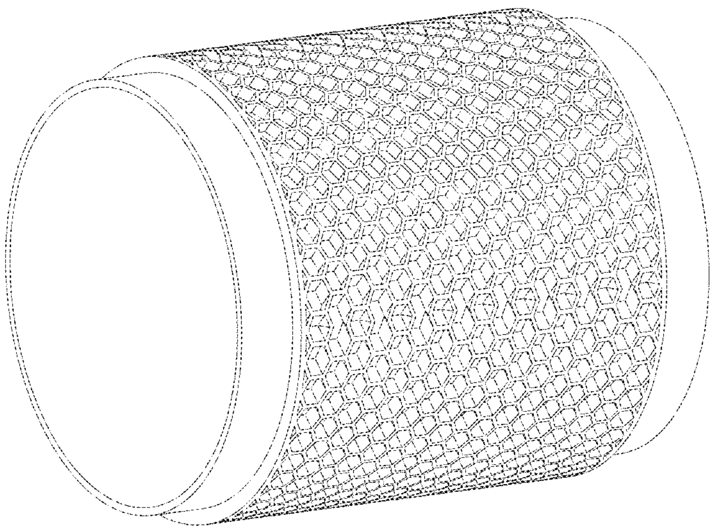
FIG. 20 is a schematic view of another pipe assembly.

When the average wall thickness T of the pipe assembly 260 is constant, the larger the inner diameter of the pipe assembly 260 is, the larger the tensile and compressive stiffness, shear stiffness, and bending stiffness of the pipe assembly 260 are. Therefore, when the average wall thickness T of the blower increases, the stiffness increases. Initially, the applicant performs exploration by simply increasing the stiffness of the pipe assembly 260. As shown in FIG. 19, the applicant attempts to change the housing of the pipe assembly 260 from a gentle arc shape to a polygonal shape to try to increase the stiffness to reduce the vibration. As shown in FIG. 20, the applicant attempts to add a series of mesh ribs to the outer wall of the pipe assembly 260 to increase the stiffness of the material to reduce the vibration. However, both approaches to increasing the material stiffness in FIGS. 19 and 20 fail to achieve the effect of reducing the vibration of the pipe assembly 260.

Through deductions, simulations, and experiments, it is finally concluded that we need to increase the wall thickness of the pipe assembly 260 to reduce the tiny amplitude generated by the pipe assembly 260, thereby reducing the noise.

A concept needs to be introduced here: modal frequency. The pipe is used as an example. When the wall thickness is constant, the larger the outer diameter of the pipe is, the lower the modal frequency is, and the more modes exist within a test range. When the outer diameter of the pipe is constant, the larger the wall thickness is, the higher the modal frequency is, and the few modes exist within a test range. The magnitude of the number of modes reflects the magnitude of the noise generated by the vibration. By increasing the modal frequency and reducing the number of modes within a certain test range, the applicant reduces the noise generated by the structural vibration of the blower.

Figure 21:
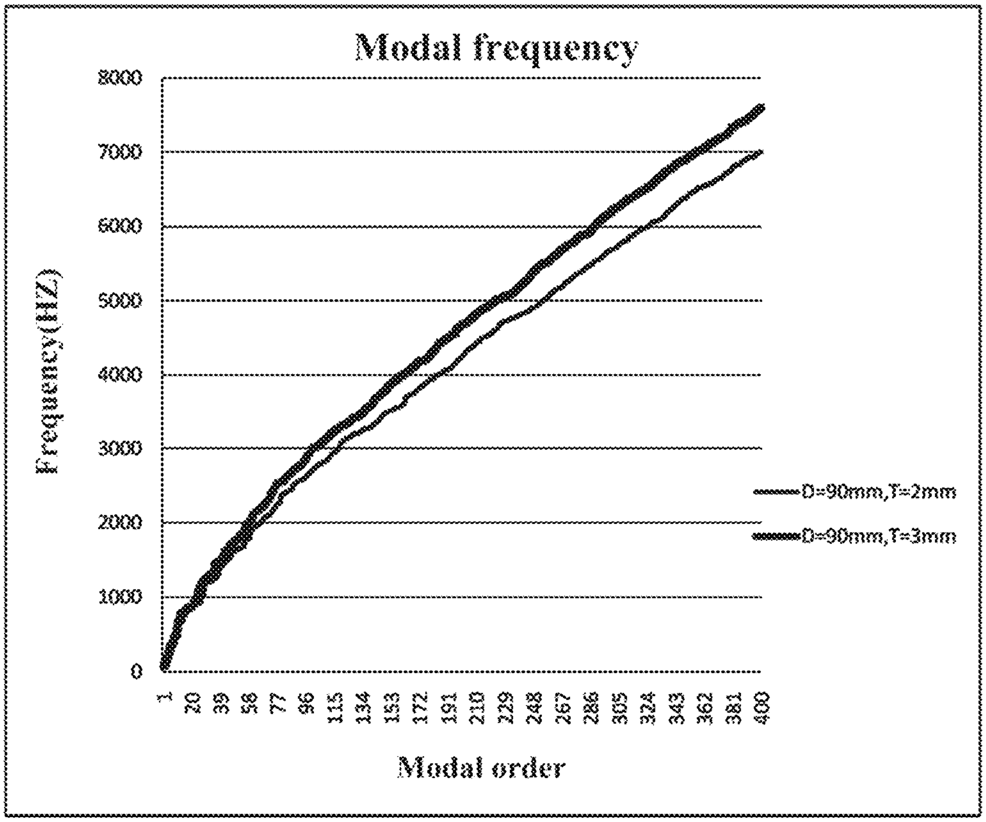
FIG. 21 is a graph illustrating the modal frequency relationship for different average wall thicknesses.

As shown in FIG. 21, the simulation results show that for the pipe assembly 260 with an inner diameter D of 90 mm, when the average wall thickness T of the pipe assembly 260 increases from 2 mm to 3 mm, the modal order of the same frequency shifts to the left, that is, the number of modes decreases, and the vibration is damped, thereby reducing the noise.

In an example, the average wall thickness T of the pipe assembly 260 is greater than or equal to 3 mm and less than or equal to 5 mm. In an example, the average wall thickness T of the pipe assembly 260 is greater than or equal to 3.5 mm. In some examples, the average wall thickness T of the pipe assembly 260 is about 3.5 mm, 4 mm, or 4.5 mm. When the average wall thickness of the pipe assembly 260 is too small, the housing of the pipe assembly 160 may vibrate too much, thereby causing excessive noise. When the average wall thickness of the pipe assembly 260 is too large, the blower 10 may be too heavy, affecting the operating experience of the user.

Figure 8:
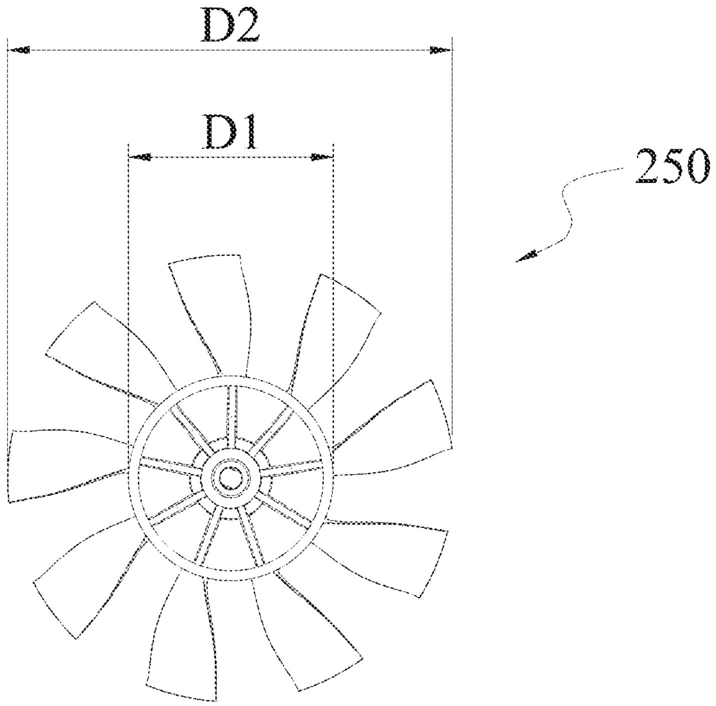
FIG. 8 is a front view of the fan assembly in FIG. 6.

As shown in FIG. 8, the hub ratio is defined as the ratio of the maximum first diameter D1 formed by the fan blade support portion 253 to the second diameter D2 formed by the outermost edges of the fan blades 252. The hub ratio may also be defined as the ratio of the diameter formed by the tops of the fan blades 252 to the diameter formed by the roots of the fan blades 252 when the fan blades 252 rotate. The hub ratio is greater than or equal to 0.4 and less than or equal to 0.5. In an example, the first diameter D1 is about 47.2 mm and the hub ratio is about 0.46. In an example, the flow rate of the blower 10 is greater than or equal to 1000 CFM, the fan assembly is an axial flow fan, and the hub ratio is greater than or equal to 0.4 and less than or equal to 0.5.

Table one shows the flow rates, wind speeds, kinetic energy efficiencies, thrusts, and other parameters outputted by the blowers 10 with different hub ratios when the inner diameter D of the pipe assembly 260 is 105 mm and the motor 230 has different rotational speeds. The flow rate mentioned in the present application refers to the mass flow rate, and the wind speed refers to the wind speed at the outlet of the blower. The kinetic energy efficiency refers to (0.5*wind speed squared*mass flow rate)/fan loss.

TABLE 1

| Hub ratio | Rotational speed (rpm) | Mass flow rate (kg/s) | Volume flow rate ($m^3$/s) | Volume flow rate (CFM) | Wind speed (m/s) | Loss (W) | Kinetic energy efficiency | Thrust (N) |
|---|---|---|---|---|---|---|---|---|
| 0.45 | 25000 | 0.66 | 0.55 | 1173 | 70.9 | 2446 | 0.67 | 46.50 |
| 0.55 | 25000 | 0.61 | 0.52 | 1091 | 65.9 | 2461 | 0.54 | 40.22 |
| 0.45 | 32000 | 0.84 | 0.71 | 1502 | 90.7 | 5131 | 0.67 | 76.20 |
| 0.55 | 32000 | 0.78 | 0.66 | 1396 | 84.4 | 5161 | 0.54 | 65.89 |
| 0.45 | 35000 | 0.92 | 0.78 | 1643 | 99.3 | 6713 | 0.67 | 91.16 |
| 0.55 | 35000 | 0.85 | 0.72 | 1527 | 92.3 | 6753 | 0.54 | 78.82 |

It can be seen from the preceding table that when the rotational speed of the motor is constant, the volume flow rate, wind speed, and thrust of the blower with a hub ratio of 0.45 are all greater than those of the blower with a hub ratio of 0.55, and the blower with a hub ratio of 0.45 has a higher kinetic energy efficiency, which means that a higher proportion of inputted energy can be converted into airflow kinetic energy. When the hub ratio is constant, the larger the rotational speed of the motor is, the larger the volume flow rate, wind speed, kinetic energy efficiency, and thrust of the blower are. By reducing the hub ratio to less than 0.5 and applying other technologies, the maximum rotational speed of the motor does not need to increase to 35000 rpm to achieve an air volume greater than or equal to 1000 CFM. The rotational speed of the motor is relatively small so that the life of the bearings for positioning the motor can be extended, and the motor has a lower heat dissipation requirement, which is conducive to extending the life of the blower 10. When the hub ratio is greater than 0.5, the efficiency of the whole machine is relatively high. Therefore, if the hub ratio is to be reduced to a range of 0.4 to 0.5, other technical solutions in this specification are needed to improve the efficiency of the whole machine. When the maximum rotational speed of the motor is greater than or equal to 35000 rpm, the dynamic balance of the whole machine is affected, causing greater vibration of the whole machine and affecting the service life.

It is to be noted that the inner diameter D of the first pipe 220 of the blower 10 is not limited. That is to say, the blowers 10 with various inner diameters may all adopt the method of providing the through holes 243 on the first guide vane 242 to reduce the vibration and noise. In an example, the inner diameter D of the first pipe 220 is greater than or equal to 90 mm. In some examples, the inner diameter D may be 95 mm, 100 mm, 105 mm, 110 mm, 115 mm, or 125 mm.

Generally speaking, the blower 10 with a larger inner diameter D has a larger flow rate and makes greater noises. Therefore, applying the solution disclosed in the present application to the blower 10 with an inner diameter D greater than or equal to 90 mm can achieve more obvious vibration damping and noise reduction effects, but it does not mean that the technical solution of the present application is suitable for only the application to the blower 10 with an inner diameter D greater than or equal to 90 mm.

Figure 14:
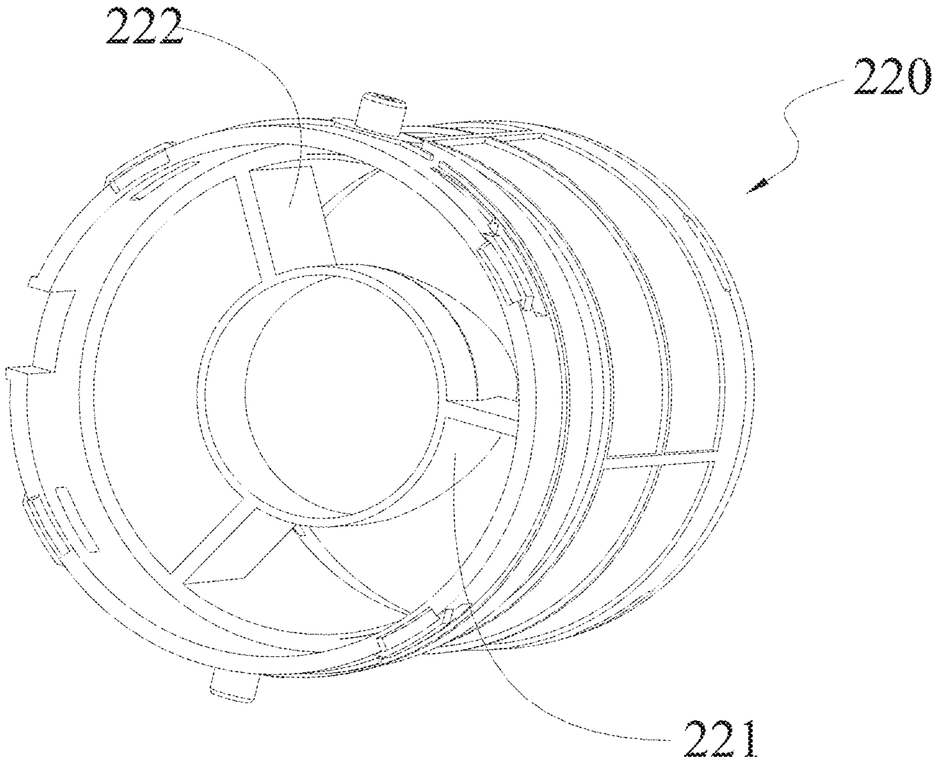
FIG. 14 is a perspective view of a first pipe in FIG. 3.

As shown in FIG. 14, the first pipe 220 includes the second guide vanes 222. When the first pipe 220 and the second pipe 240 are coupled together, the second guide vane 222 is engaged with the first guide vane 242. The second guide vanes 222 are disposed on the outer side of the conical pipe 223 to keep the conical pipe 223 stable.

As shown in FIGS. 15 to 18, in an example, a conical pipe 223*a* is formed inside a pipe assembly 260*a*, and the conical pipe 223*a* extends from a first end 2011*a* located on the front side of the pipe assembly 260*a*. The conical pipe 223*a* accommodates at least part of the motor 230, and the distance by which the conical pipe 223*a* extends from the first end 2011*a* is the fourth distance L4. The guide vane 282 includes a third end facing the fan blade 252 and a fourth end 2223 facing away from the fan blade. The distance from the fourth end 2223 to the first end is the fifth distance L5. The ratio L5/L4 of the fifth distance to the fourth distance is greater than or equal to 0 and less than or equal to 0.1.

Figure 15:
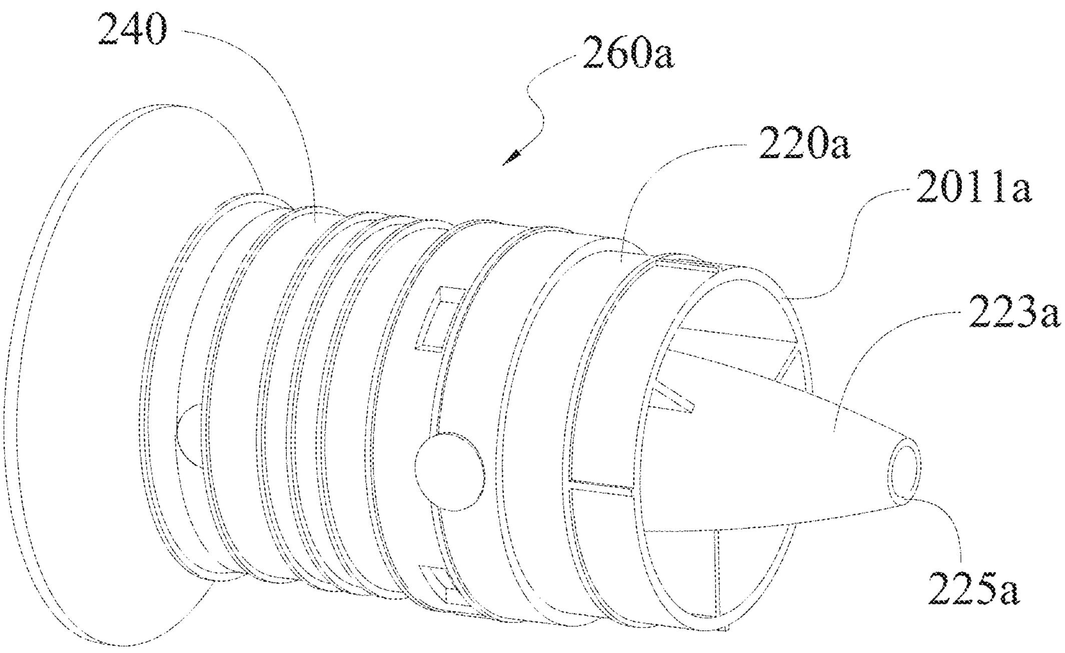
FIG. 15 is a perspective view of a pipe assembly in another example.
Figure 16:
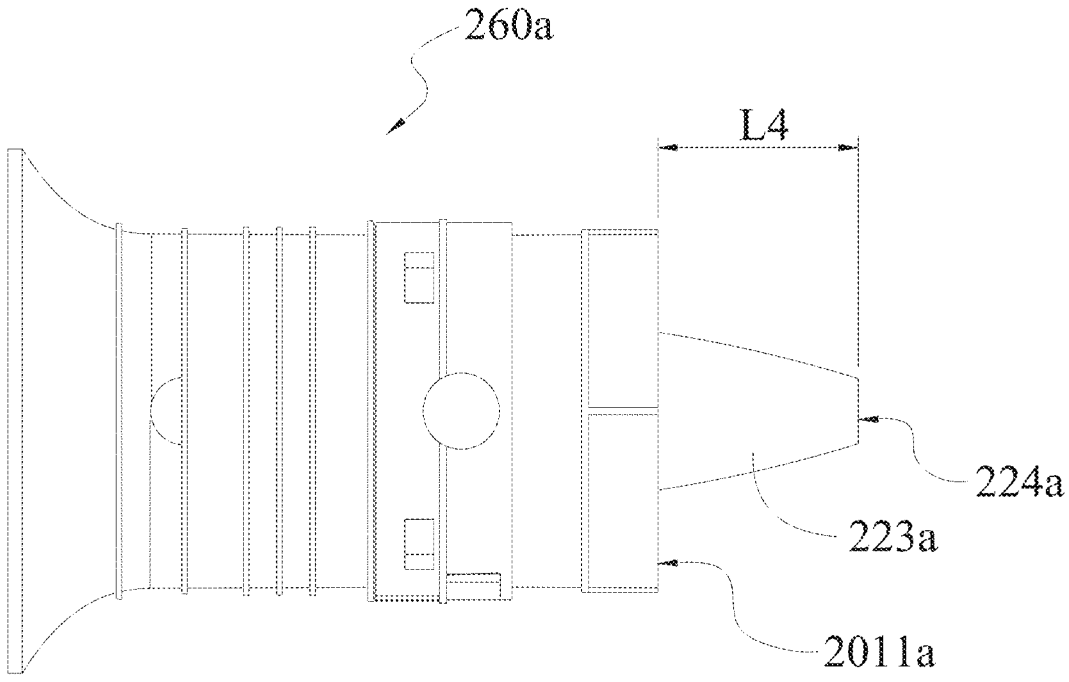
FIG. 16 is a side view of the pipe assembly in FIG. 15.
Figure 17:
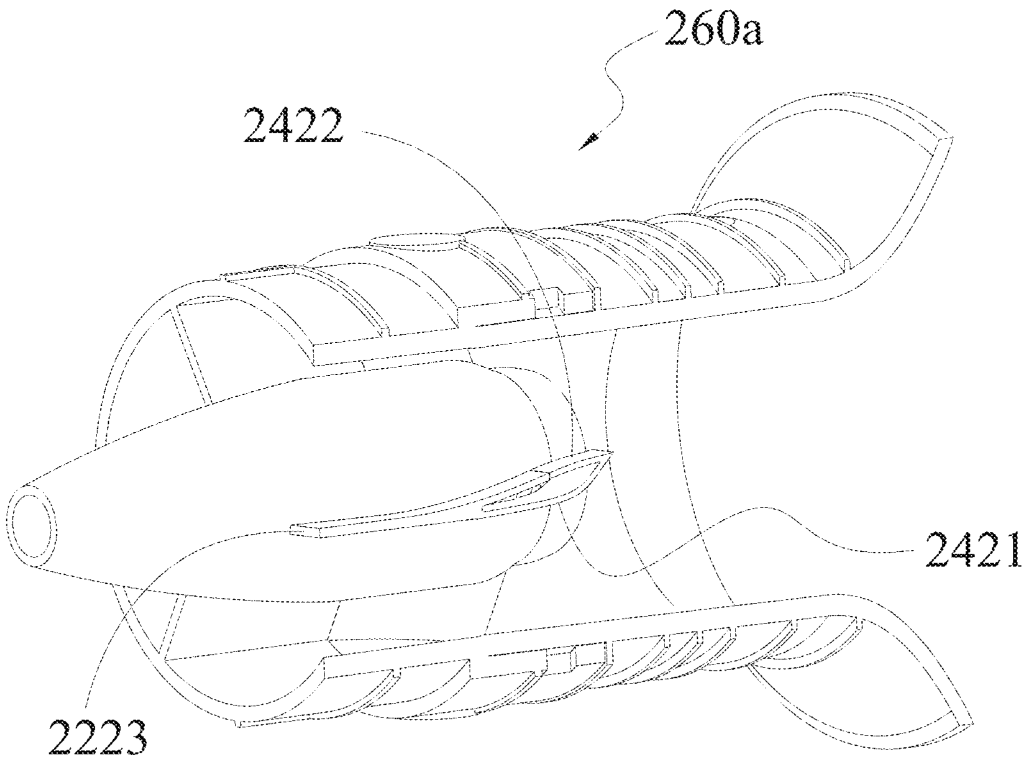
FIG. 17 is a sectional perspective view of the pipe assembly in FIG. 15.

In the example disclosed in FIGS. 15 to 17, the fifth distance is about 0, that is to say, the fourth end 2223 of the guide vane 282 is basically flush with the first end 2011*a* of the pipe assembly 260*a*. In the example disclosed in FIG. 18, the fifth distance is not 0, and the ratio L5/L4 of the fifth distance to the fourth distance is less than or equal to 0.1. In this manner, the end of the guide vane 282 is basically flush with the first end 2011*a* of the pipe assembly 260*a*, and the vibration of the housing of the pipe assembly 260 can be damped by the guide vane 282.

Figure 18:
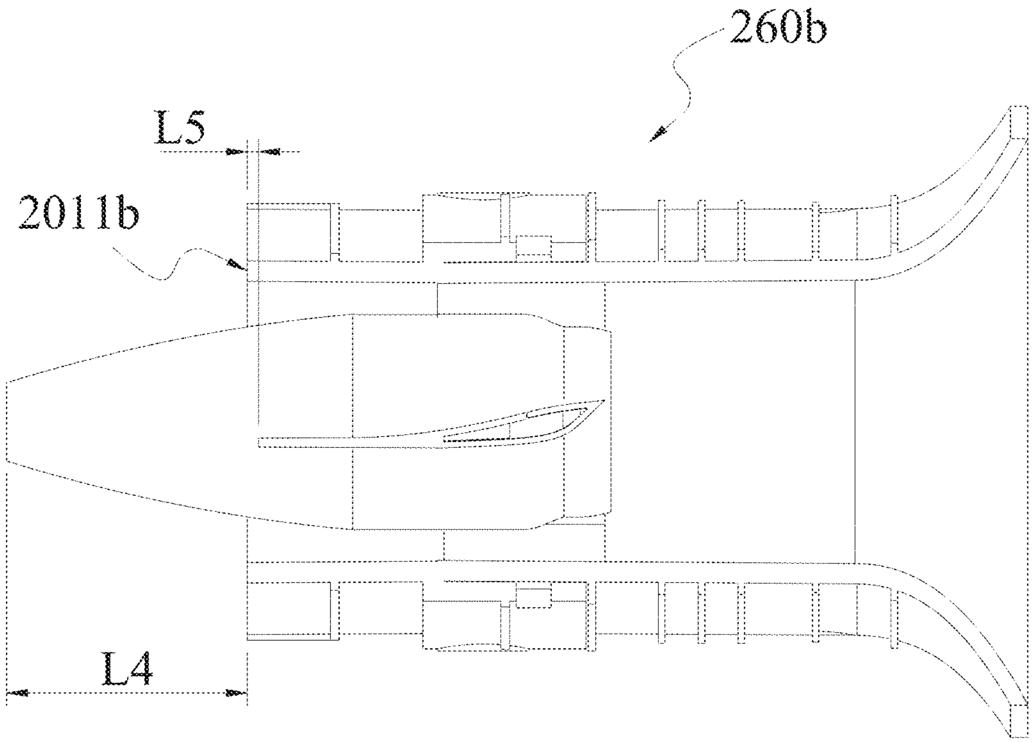
FIG. 18 is a side view of a pipe assembly in another example.

As shown in FIG. 18, a pipe assembly 260*b* has a first end 2011*b*, and the first end 2011*b* of the pipe assembly 260*b* should try not to exceed the end of the guide vane 282. Even if the first end 2011*b* of the pipe assembly 260*b* exceeds the end of the guide vane 282, if L5/L4 is greater than or equal to 0 and less than or equal to 0.1, the vibration of the housing of the pipe assembly 260*b* can be controlled within a reasonable range to prevent generating huge noise.

When the flow rate of the blower 10 is greater than or equal to 1000 CFM, the inner diameter D of the pipe assembly 260 is generally greater than or equal to 90 mm to satisfy the requirement for outputting a large flow rate. In an example, the inner diameter D of the pipe assembly 260 is greater than or equal to 90 mm, the air volume of the blower 10 is greater than or equal to 1000 CFM, the operating rotational speed of the motor 230 is lower than 35000 rpm, and the fan assembly 250 is an axial flow fan. In the present application, the blow-suction structure 200 is optimized so that when the inner diameter D of the pipe assembly 260 is greater than or equal to 90 mm and the operating rotational speed of the motor 230 is not higher than 35000 rpm, the flow rate of the blower 10 can still be greater than or equal to 1000 CFM. That is to say, by limiting the first guide vanes 242, the multiple through holes 243, the average wall thickness D of the pipe assembly 260, the hub ratio of the fan assembly 250, and the first distance between the guide vane root 2431 of the first guide vane 242 and the fan blade 252, when the rotational speed of the motor 230 does not increase to 35000 rpm, the air volume of the blower can be greater than 1000 CFM, and the air discharge effect of the whole machine is better.

In an example, the maximum rotational speed of the motor is less than or equal to 30000 rpm, and the flow rate of the airflow device is greater than or equal to 1000 CFM. In an example, the maximum rotational speed of the motor is less than or equal to 27500 rpm, and the flow rate of the airflow device is greater than or equal to 1000 CFM.

The technical solution involved in the present application can be applied to both the blower and the blow-suction machine and can achieve the effect of optimizing vibration and noise. Therefore, the technical solution of the present application is also applicable to the blow-suction machine. In addition, the airflow device involved in the present application may also be a device with blowing and/or suction capabilities that is different from the blower and the blow-suction machine in the related art, such as a device that implements the main function of the airflow device by doing useful work through the airflow.

For the blow-suction machine that can blow and suck air, the technical solution involved in the present application may be used as an option or applied when the blow-suction machine implements the blowing function.

Figure 22:
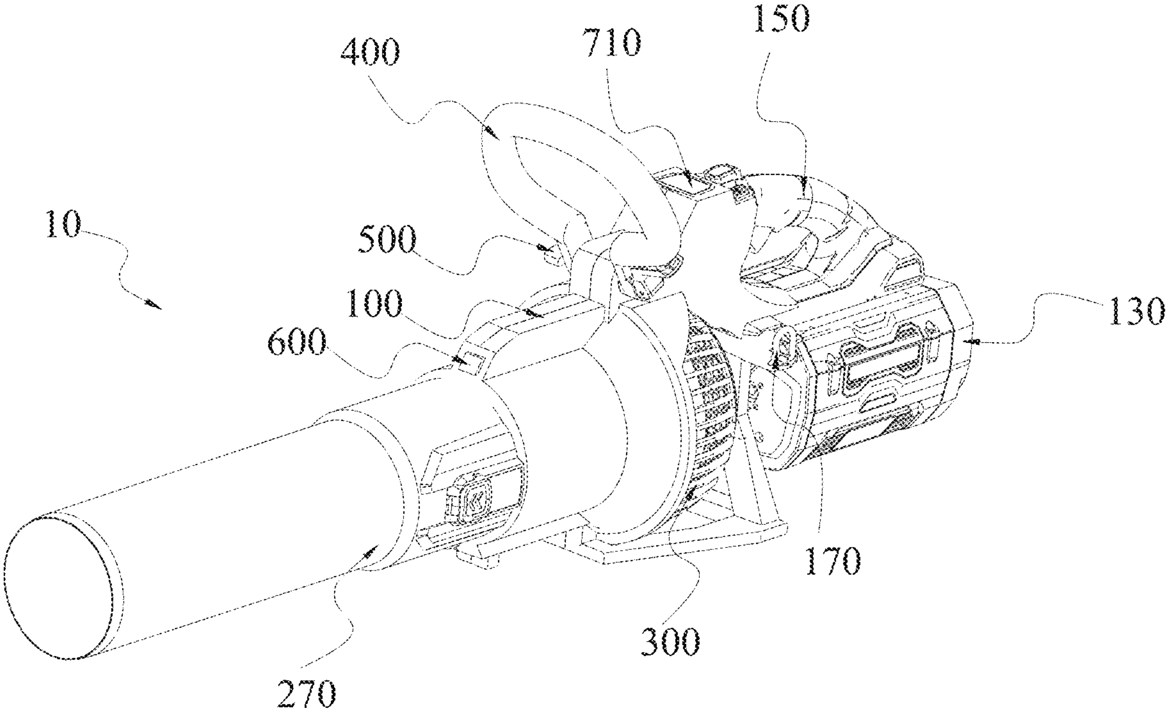
FIG. 22 is a schematic view of a blower from another perspective.

In an example, as shown in FIG. 22, a wind tube 270 is mounted to the blow-suction structure 200. In other words, the wind tube 270 is mounted to the pipe assembly 260. The wind tube 270 may include various structures or forms to guide the flow direction and flow speed of the airflow when the airflow finally flows out. The user may mount different types of wind tubes 200 to satisfy different working conditions. In some examples, the wind tube 270 may be a straight wind tube shown in FIG. 22, a trumpet-shaped wind tube with an enlarged air outlet, or the like.

The blower 10 further includes a handle 400 used for the user to hold and located on the front side of the grip 150. When using the blower 10, the user may hold the grip 150 with one hand at the back and hold the handle 400 with the other hand in front. The blower 10 is held with two hands, thereby avoiding fatigue caused by holding the blower with one hand. In addition, for the blower 10 with a large air volume, such as the blower 10 with an air volume greater than 1000 CFM, holding the blower 10 in a front-and-back manner can ensure that the blower 10 operates more smoothly and improve the user experience. In this example, the handle 400 is disposed at the rear end of the pipe assembly 260 and located above the vent cover 300.

Figure 23:
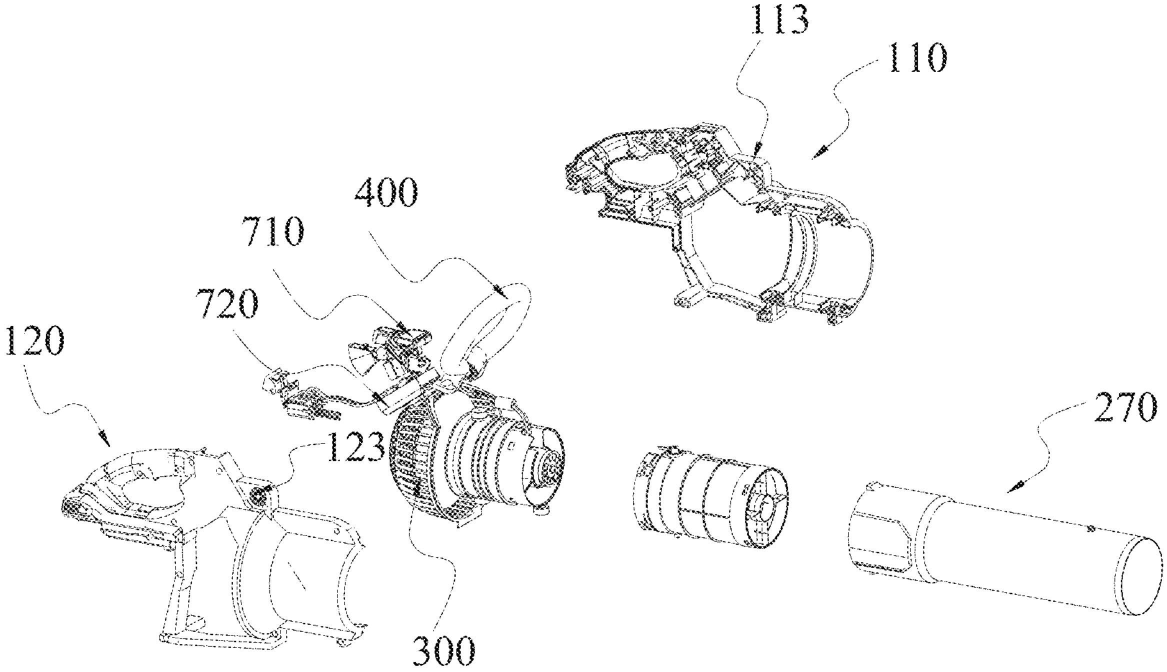
FIG. 23 is an exploded view of a blower.

In an example, as shown in FIG. 23, the handle 400 is substantially annular so that the handle 400 is convenient for the user to hold and is not prone to accidental slipping during the holding process. In an example, the handle 400 is completely enclosed. It is to be noted that the handle 400 may also be configured to have an opening, that is to say, the handle 400 may be in an incomplete closed shape.

Figure 24:
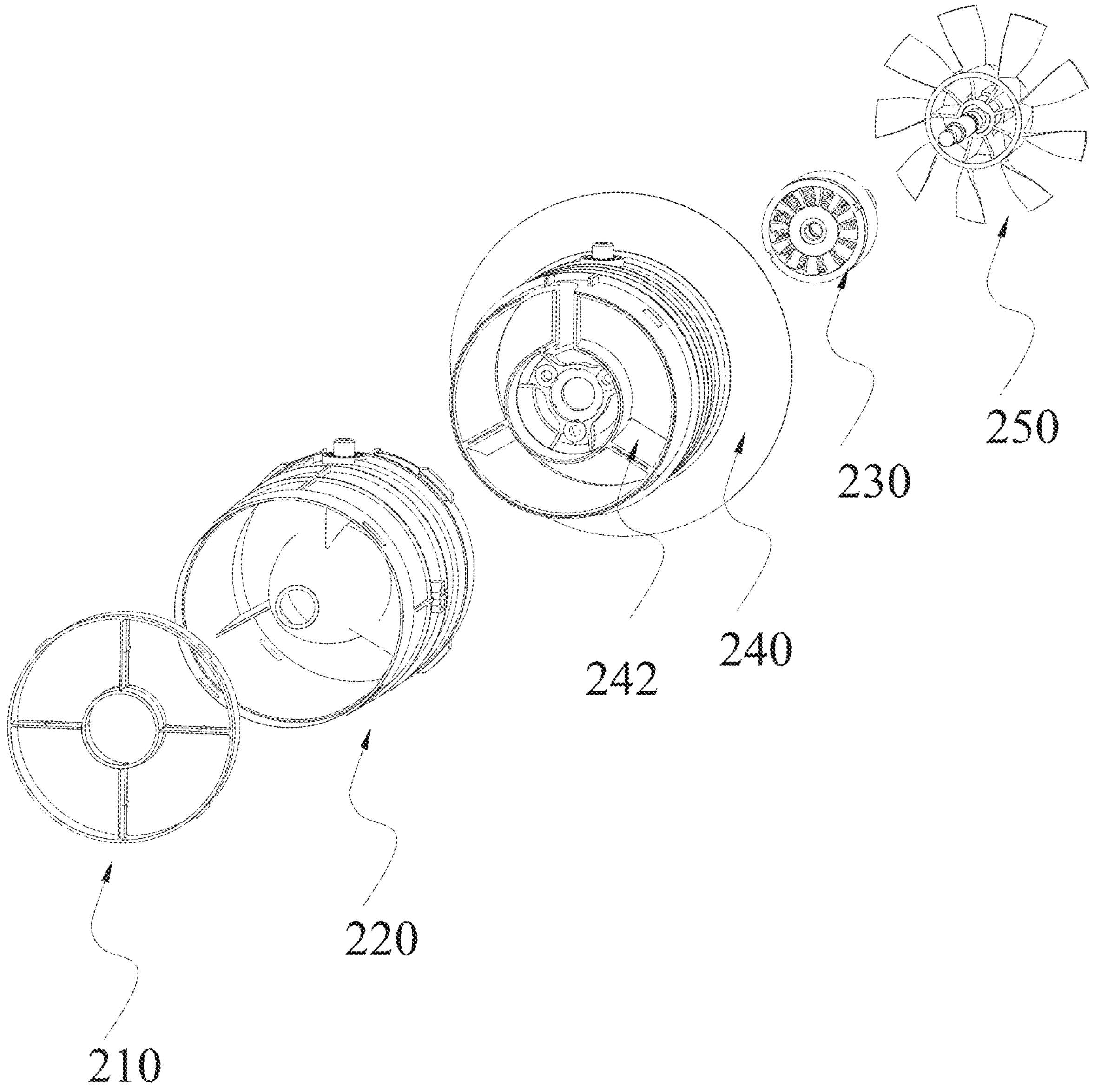
FIG. 24 is an exploded view of a pipe assembly.

In some examples, as shown in FIG. 24, the first guide vanes 242 may not be provided with through holes.

Figure 25:
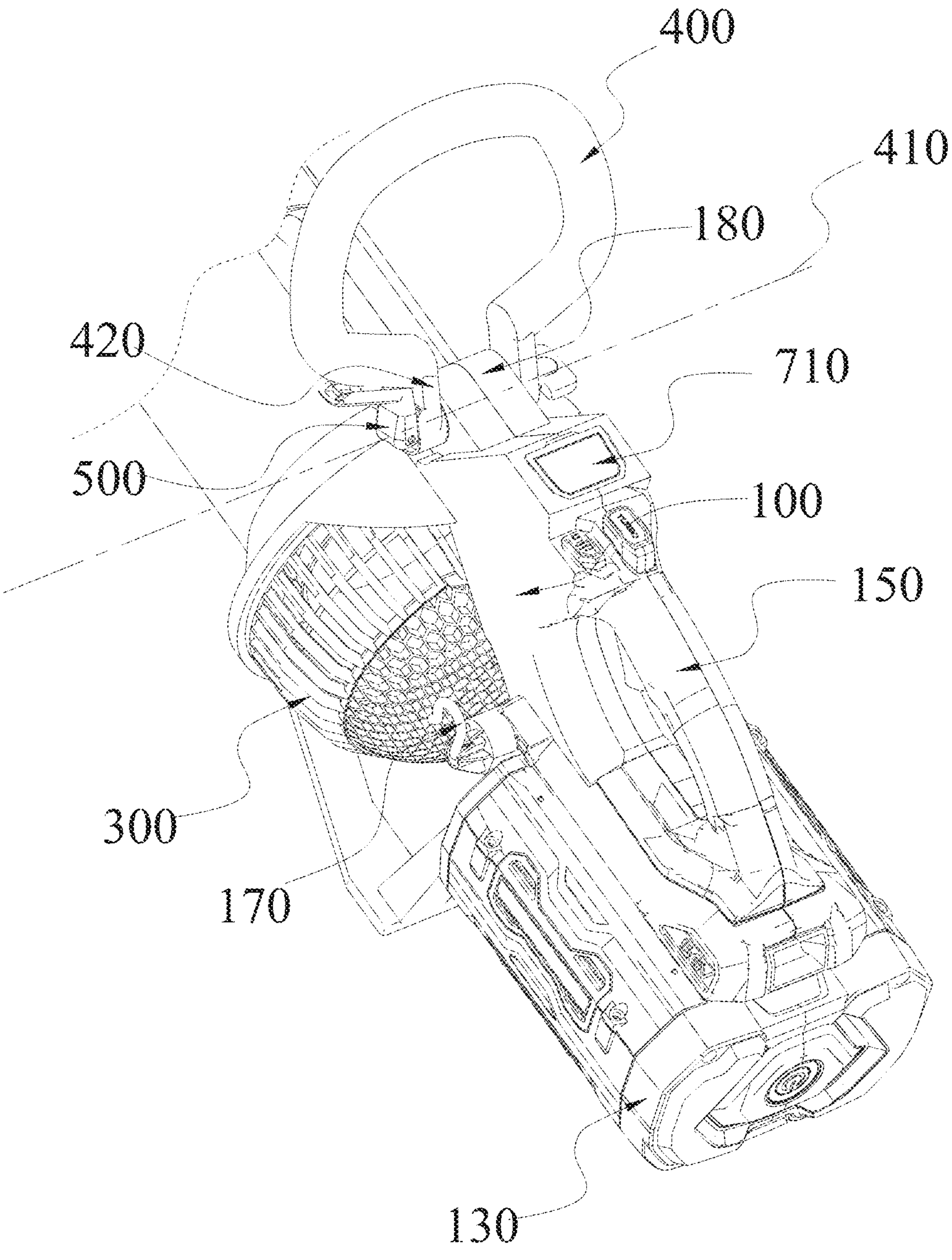
FIG. 25 is a partial structural view of a blower.

As shown in FIG. 25, the housing 100 is provided with a mounting portion 180 at the front side of the grip 150, the handle 400 is provided with a mating portion 420, and the mating portion 420 is connected to the mounting portion 180. The mounting portion 180 is provided to improve the convenience of mounting the handle 400. As shown in FIG. 23, a left mounting portion 113 is provided on the left housing 110, and a right mounting portion 123 is formed on the right housing 120. When the left housing 110 and the right housing 120 are buckled together, the left mounting portion 113 and the right mounting portion 123 together form the mounting portion 180. It is to be understood that, in other examples, the shape of the handle 400 may also be configured to be an L shape or another irregular shape.

In some examples, the handle 400 is detachably connected to the housing 100, so the user can choose to mount the handle 400 according to actual usage requirements and hold the blower 10 with two hands to work. The user may also choose to remove the handle 400 and hold the blower 10 only by the grip 150.

Figure 26:
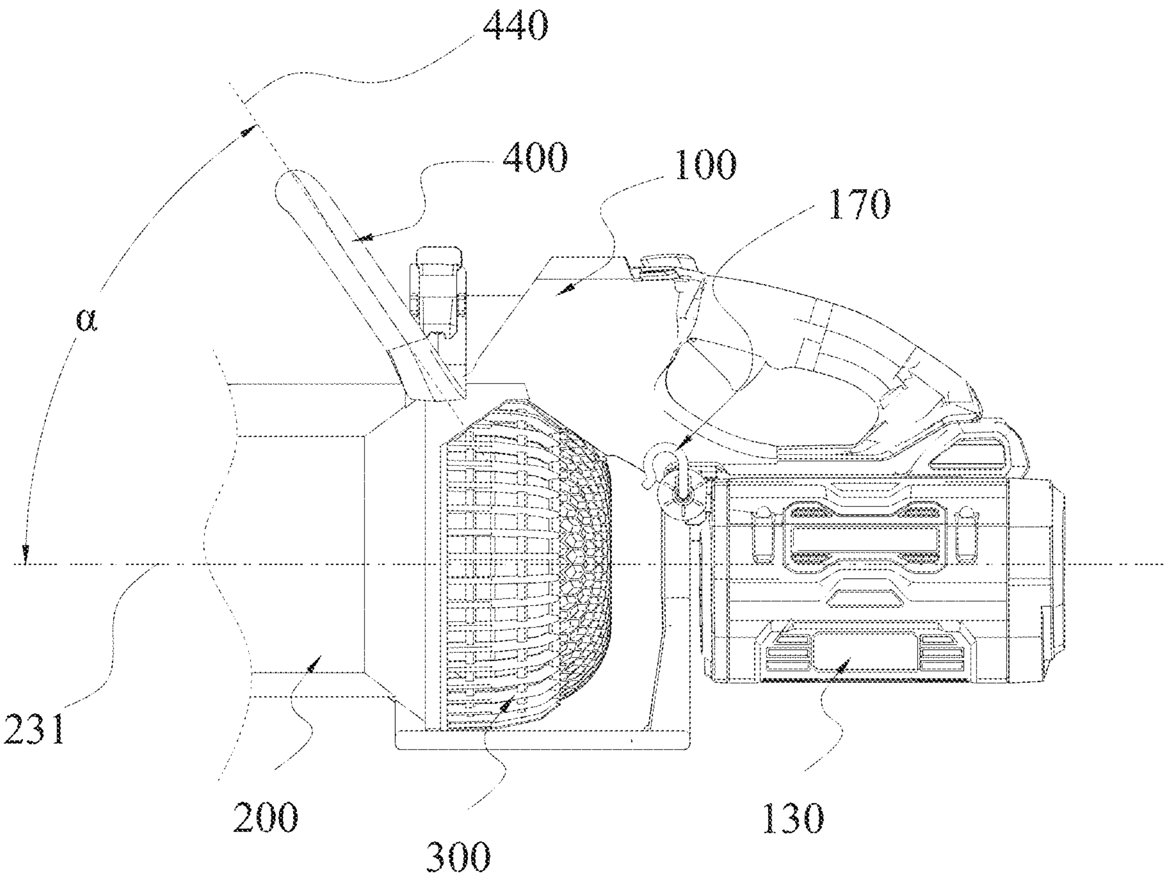
FIG. 26 is a side view of structures in FIG. 25.

In some examples, as shown in FIG. 25, the handle 400 is movably connected to the housing 100, and the handle 400 is rotatable relative to the housing 100 about a handle axis 410. When the user needs to adjust the direction of an air outlet 2231 of the pipe assembly 260, the handle 400 can adaptively rotate about the handle axis 410 so that the posture of the handle 400 relative to the grip 150 is adjusted, thereby ensuring the comfort of the user holding the blower 10 with two hands. In this example, the handle axis 410 extends along the left and right direction, so the swing of the handle 400 and the adjustment of the posture of the handle 400 in the front and rear direction can be performed. In some examples, as shown in FIG. 26, the angle of rotation of the handle 400 is a, and the angle of rotation a is greater than 10 degrees and less than or equal to 150 degrees, that is, the handle 400 is rotatable within a range of 10 degrees to 150 degrees. It is to be noted that the angle of rotation a is the maximum angle of rotation from the motor axis 231 of the blower 10 to the rear of the blower 10.

In some examples, the handle 400 has at least one lockable position. In some scenarios, such as a scenario in which the direction of the air outlet 2231 of the pipe assembly 260 does not need to be adjusted frequently during the use of the blower 10 or a scenario in which the user has a specific preference for the angle of the handle 400, the handle 400 can be locked at a fixed position, thereby better satisfying the operating requirements of the user. In an example, the handle 400 may be configured to be lockable at one position, two positions, three positions, or any position within a rotatable angle range.

As shown in FIG. 25, the blower 10 further includes a mounting assembly 500, and the handle 400 is mounted on the housing 100 through the mounting assembly 500. The mounting assembly 500 enables the handle 400 to rotate about the handle axis 410 and enables the handle 400 to be locked at any position within a rotation angle range, thereby satisfying different usage requirements of the user.

Figure 27:
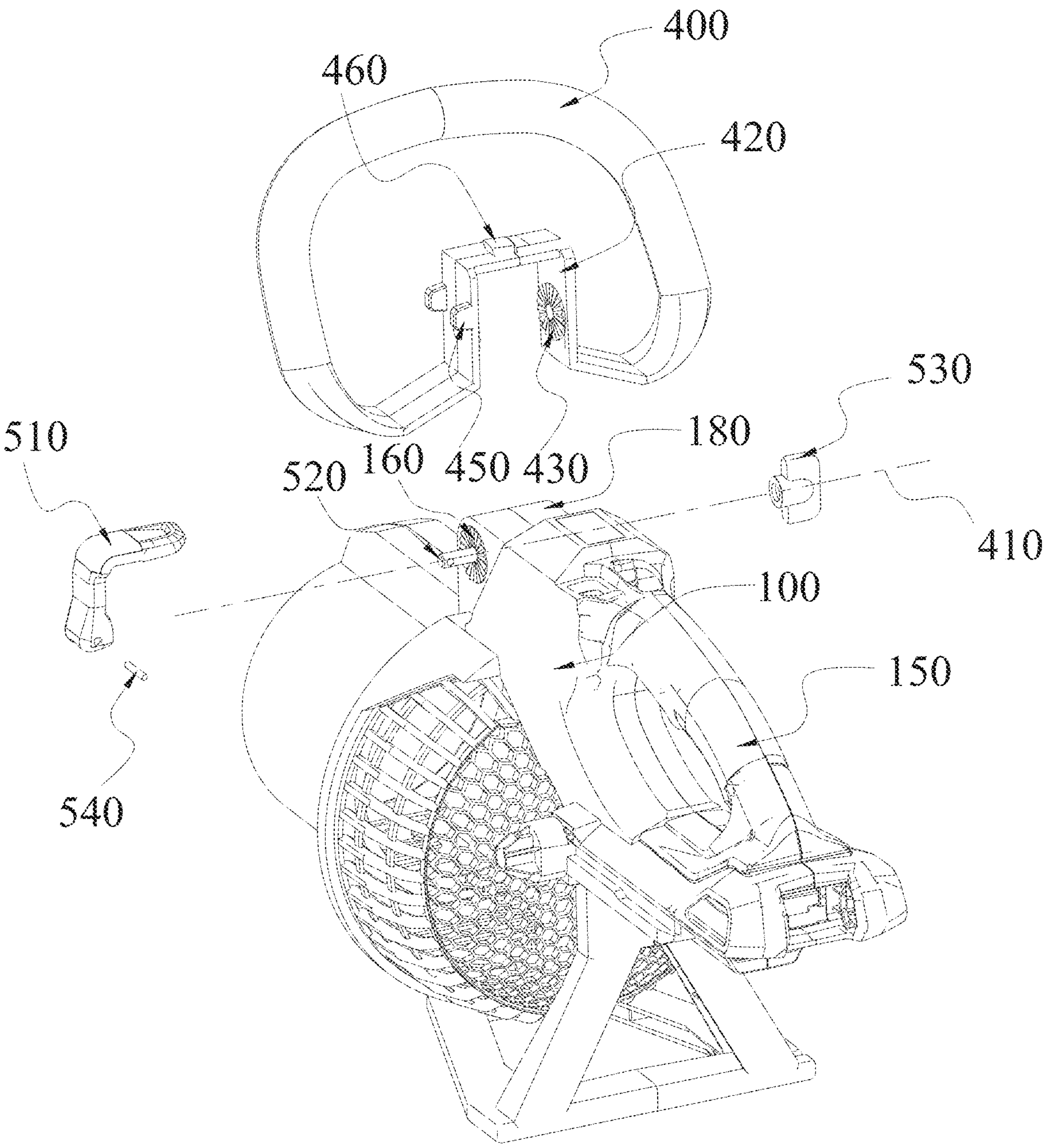
FIG. 27 is an exploded view of a mounting assembly and a first handle of a blower.
Figure 28:
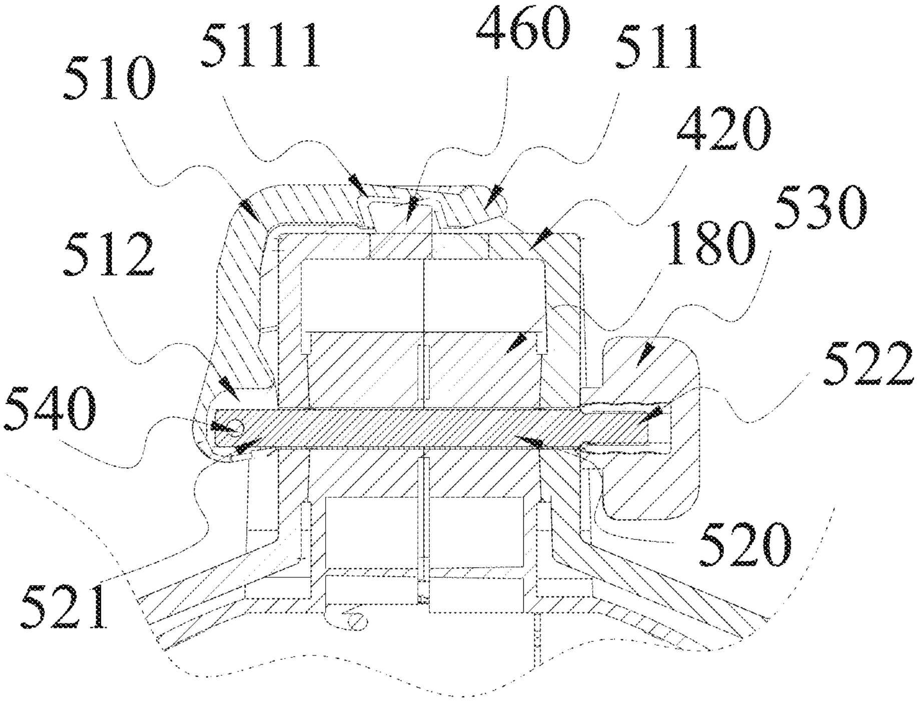
FIG. 28 is a sectional view of the blower provided in FIG. 27 when a trigger is in a locked state.
Figure 29:
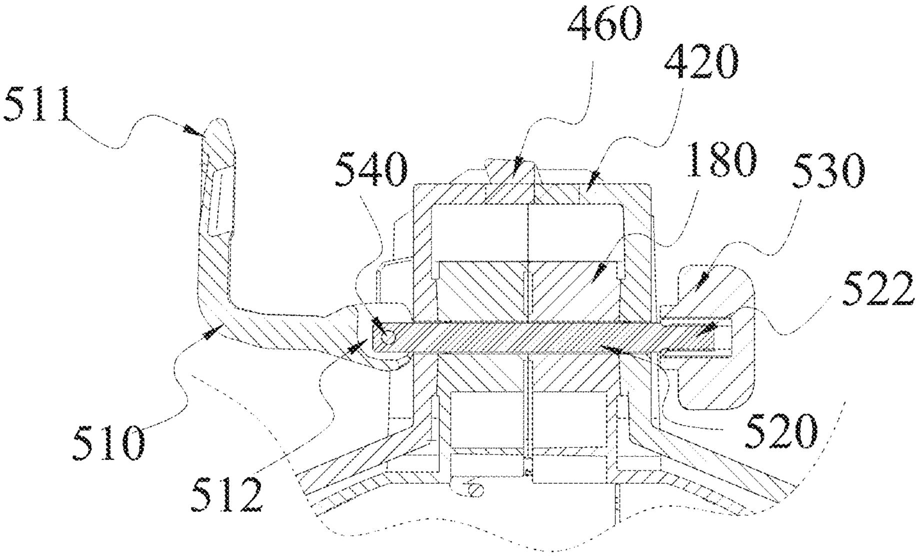
FIG. 29 is a sectional view of the blower provided in FIG. 27 when a trigger is in an unlocked state.

As shown in FIGS. 27 to 29, the mounting assembly 500 includes a trigger 510, a rotary shaft 520, and a fastener 530. The rotary shaft 520 passes through the housing 100 and the handle 400, and the rotary shaft 520 is parallel to the handle axis 410 so that the handle 400 is rotatable about the handle axis 410. The fastener 530 is detachably connected to a first end of the rotary shaft 520, and the trigger 510 is hinged to a second end of the rotary shaft 520. The trigger 510 is rotatable relative to the rotary shaft 520 so that the trigger 510 has a locking position and an unlocking position. When the trigger 510 is at the locking position, the handle 400 is clamped between the fastener 530 and the trigger 510, and when the trigger 510 is at the unlocking position, the handle 400 is rotatable relative to the rotary shaft 520.

In a usage scenario, the user rotates the trigger 510 to unlock the handle 400. At this time, the handle 400 can be rotated so that the angle of the handle 400 can be adjusted. When the angle of the handle 400 is adjusted to a suitable position, the trigger 510 is rotated in reverse so that the trigger 510 locks the handle 400 at the current position. In another usage scenario, the user rotates the trigger 510 to the unlocking position and keeps the trigger 510 at the unlocking position. Therefore, when the blower 10 is in use, the angle of the handle 400 can be automatically adjusted as the air discharge direction of the pipe assembly 260 changes. In a usage scenario, the user rotates the trigger 510 to the unlocking position and removes the fastener 530 from the rotary shaft 520. At this time, the handle 400 and the mounting assembly 500 can be removed from the housing 100, and the user holds the blower 10 only by the grip 150.

As shown in FIGS. 28 and 29, the trigger 510 includes an operating end 511 and a mating end 512. The mating end 512 rotatably mates with the rotary shaft 520 through a hinge shaft 540. The hinge shaft 540 is perpendicular to the rotary shaft 520. The operating end 511 is an end facing away from the mating end 512, and the operating end 511 is used for the user to operate. The mating end 512 is configured to be a cam structure. When a convex part of the cam structure is rotated to be in contact with the mounting portion 180 of the housing 100 by rotating the operating end 511, the trigger 510 and the fastener 530 clamp and lock the handle 400. When a non-convex part of the cam structure faces the mounting portion 180 by rotating the operating end 511, the distance between the trigger 510 and the fastener 530 increases, so the handle 400 is no longer clamped, and the handle 400 is unlocked. In an example, the fastener 530 may be a component with a threaded hole, and the end of the rotary shaft 520 is provided with external threads. The fastener 530 is threadedly connected to the end of the rotary shaft 520 so that the fastener 530 is detachable and easy to operate. In other examples, the fastener 530 may be a pin, a pin hole is provided at the end of the rotary shaft 520, and the pin is inserted into the pin hole so that the rotary shaft 520 can be prevented from moving along the axial direction. In other examples, the fastener 530 may be detachably connected to the rotary shaft 520 by mating with other components.

In some examples, as shown in FIGS. 28 and 29, the mating portion 420 of the handle 400 is substantially configured in an "n" shape, and the mating portion 420 clamps the left and right sides of the mounting portion 180. As shown in FIG. 27, handle engaging portions 430 are provided on sidewalls of the mating portion 420 opposite to the mounting portion 180, and the handle engaging portion 430 is configured to be a gear structure. Correspondingly, housing engaging portions 160 are provided on sidewalls of the mounting portion 180 opposite to the mating portion 420. The handle engaging portion 430 and the housing engaging portion 160 can engage with each other so that the handle 400 has a damping feel when rotating relative to the housing 100. In this manner, not only is the angle of the handle 400 convenient to adjust, but also the handle 400 can be locked at a specific position. As shown in FIGS. 27 and 28, two limiting ribs 450 are provided on the mating portion 420 of the handle 400. The two limiting ribs 450 are spaced apart along the front and rear direction. The operating end 511 of the handle 400 can be clamped between the two limiting ribs 450. The setting of the limiting ribs 450 can prevent the operating end 511 from moving. A snap 460 is provided on one of the operating end 511 of the trigger 510 and the mating portion 420 of the handle 400, and a snap groove 5111 is provided on the other one of the operating end 511 of the trigger 510 and the mating portion 420 of the handle 400. The snap 460 and the snap groove 5111 can be snap-fitted together so that the positions of the trigger 510 and the handle 400 can be locked, thereby preventing the trigger 510 from being operated incorrectly. In this example, the snap 460 is provided on the mating portion 420 of the handle 400, and the snap groove 5111 is provided on the operating end 511 of the trigger 510. In other examples, the snap groove 5111 may be provided on the mating portion 420 of the handle 400, and the snap 460 is provided on the operating end 511 of the trigger 510, as long as the snap 460 does not interfere with the rotation of the trigger 510.

Figure 30:
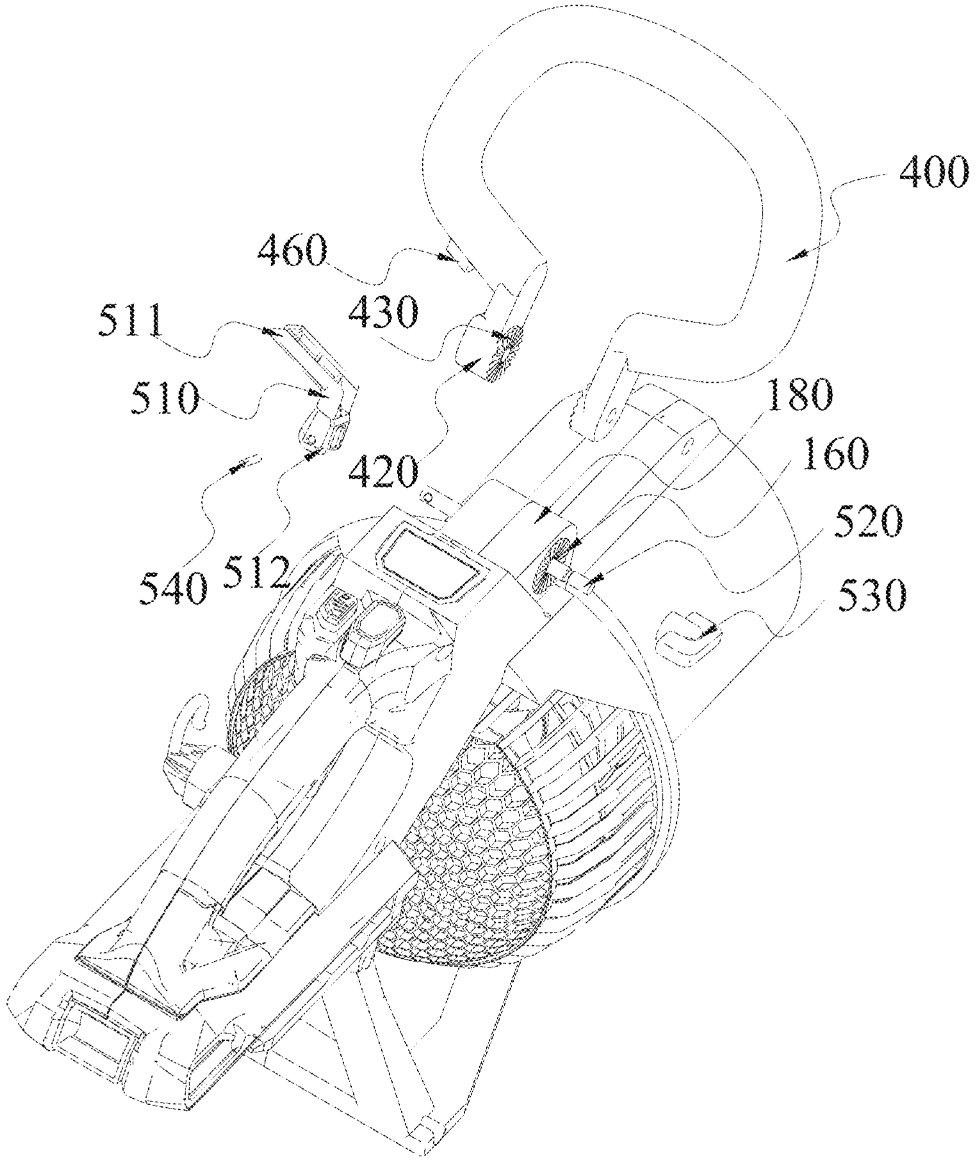
FIG. 30 is an exploded view of a mounting assembly and a second handle of a blower.

In another example, as shown in FIG. 30, the handle 400 is configured to be an annular structure with a notch, and two ends of the annular structure are mating portions 420 of the handle 400. Two ends of the notch can clamp the left and right sides of the mounting portion 180, respectively. The working principle of the trigger 510 in this example is the same as that in the previous example.

Figure 31:
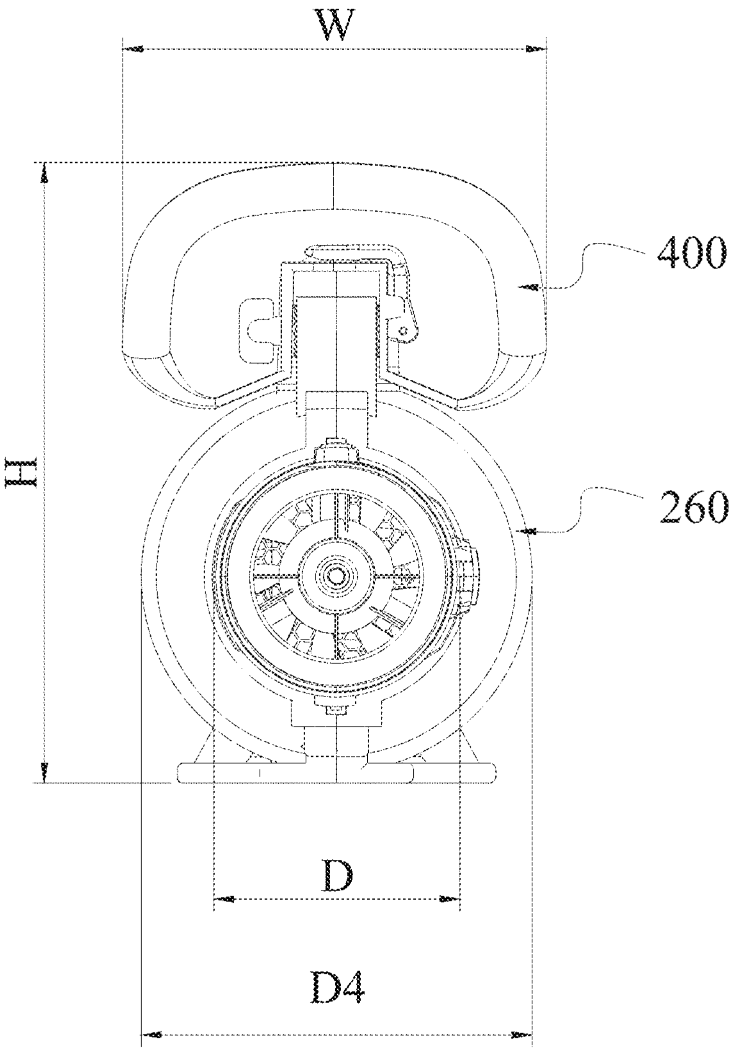
FIG. 31 is a front view of a blower provided with a first handle.
Figure 32:
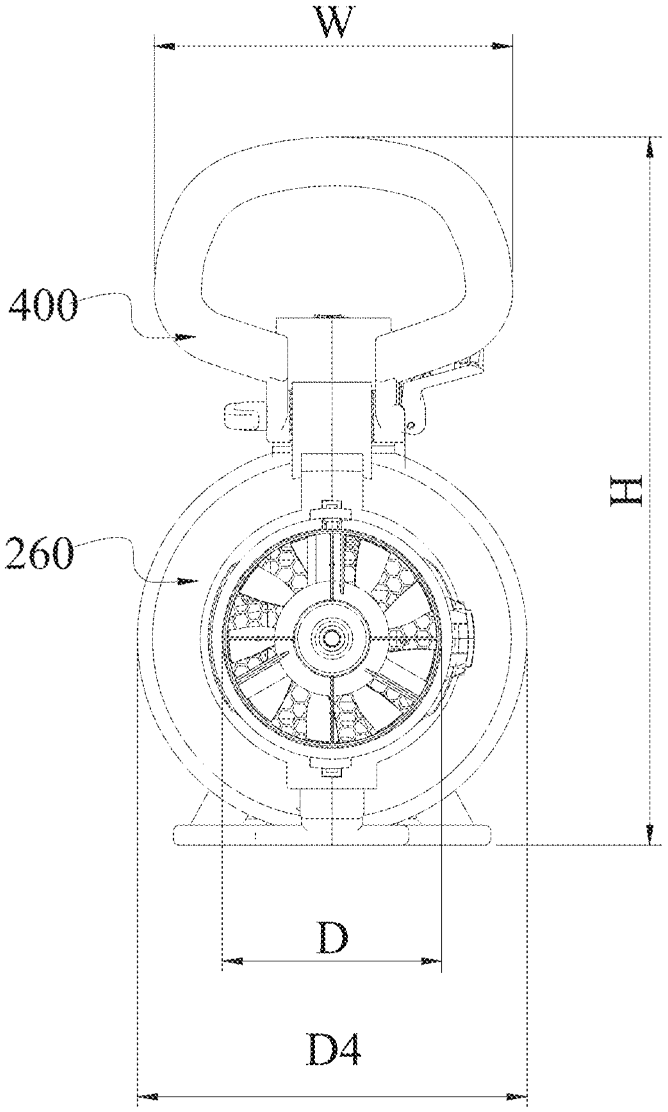
FIG. 32 is a front view of a blower provided with a second handle.

As shown in FIGS. 31 and 32, the inner diameter of the pipe assembly 260 is D, the width of the handle 400 along the left and right direction is W, and W/D is greater than or equal to 1 and less than or equal to 2.5. The width of the handle 400 along the left and right direction is set within this range. In this manner, on the one hand, the holding range of the user can be adjusted within a sufficiently wide range so that when the blowing direction of the pipe assembly 260 is adjusted, the user can adaptively adjust the holding position, thereby ensuring a better holding experience; on the other hand, the following can be avoided: the width of the entire blower 10 is too large due to too large a width of the handle 400. In some examples, W/D is greater than or equal to 1.2 and less than or equal to 2. In some examples, W/D may be 1.3, 1.6, 1.9, or the like.

As shown in FIGS. 31 and 32, when the angle of rotation of the handle 400 is adjusted and the blower 10 is supported on a plane, the maximum height of the entire blower 10 is H, where His greater than or equal to 200 mm and less than or equal to 450 mm. Under the condition that the height of the housing 100 of the blower 10 is constant, the maximum height of the blower 10 is set within a range of 200 mm to 450 mm so that the handle 400 has a suitable height. In this manner, it is convenient for the hand of the user to reach into the handle 400, and the dimension of the blower 10 in the height direction is not too large.

As shown in FIGS. 31 and 32, the maximum outer diameter of the pipe assembly 260 is D4, and H/D4 is greater than or equal to 1 and less than or equal to 4. In an example, H/D4 is greater than or equal to 1 and less than or equal to 2.5. H/D4 is set within the preceding range so that the blower 10 has suitable dimensions in the up and down direction and the left and right direction, thereby avoiding the problem of a decreased holding experience due to the large distance between the position of the force application point of the user on the handle 400 and the center of gravity of the blower 10 in the height direction, thereby ensuring the holding comfort of the user.

Figure 33:
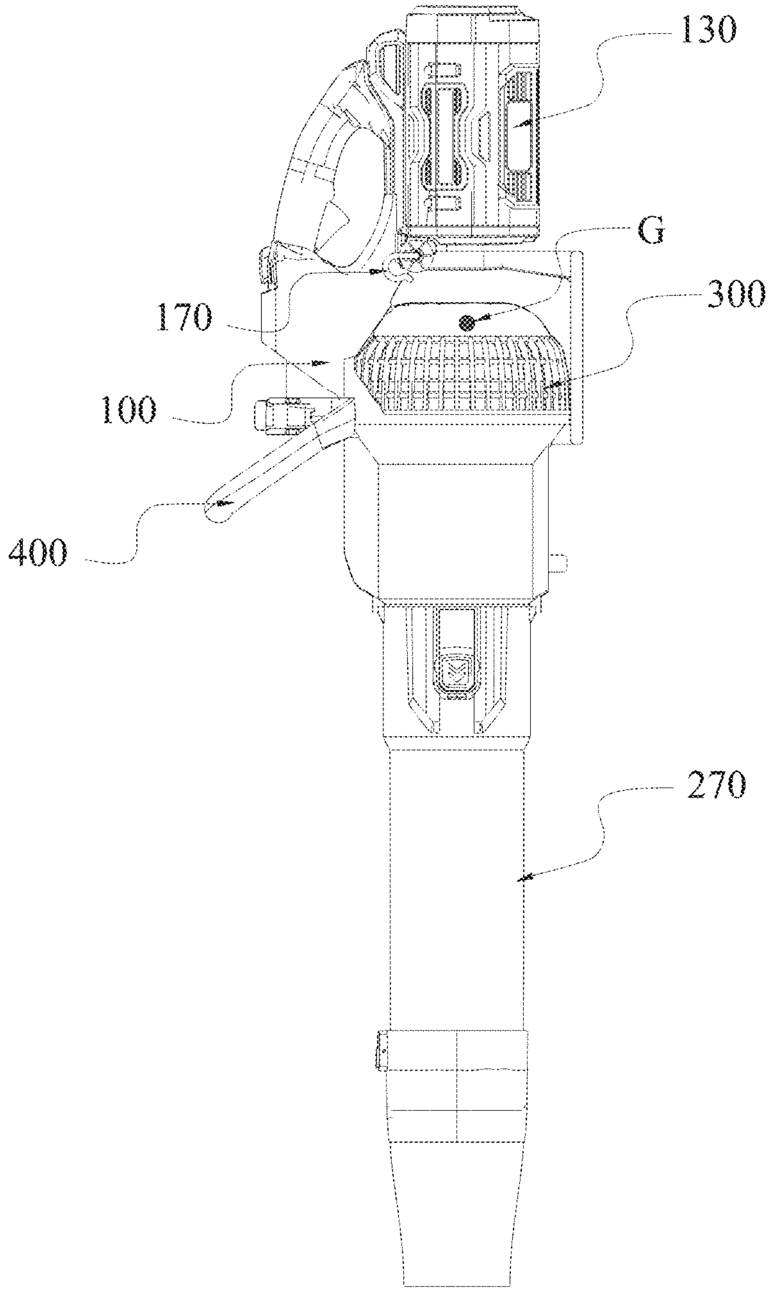
FIG. 33 is a side view of a blower.

In some examples, as shown in FIGS. 25 and 33, the blower 10 further includes a belt coupling portion 170. A belt 800 is usually worn around the waist of the user, and the belt coupling portion 170 is used for mounting the entire blower 10 on the belt 800. Therefore, the belt 800 may be used for supporting the blower 10 with the help of the waist strength of the user, thereby reducing the fatigue of the hands of the user during use.

It is to be noted that the blower 10 here is a handheld blower that cannot be carried on the back of the user for use, rather than a backpack blower with a backpack function. In some examples, the handheld blower has only the grip 150 that implements the main holding function and is located nearby. In some examples, the handheld blower further has the handle 400 that implements the holding function together with the grip 150. The handle 400 may be understood as a second handle or an auxiliary handle. In addition, this example further provides the belt 800 to relieve the pressure on the grip 150. For the blower 10 with the handle 400 (that is, the auxiliary handle), the belt 800 helps relieve the pressure on the grip 150 and the handle 400. Therefore, the battery pack 130 of the blower 10 with the belt 800 is usually mounted along a blower axis 101, or the battery pack 130 is usually mounted in the extension region of the wind tube 270. The battery pack coupling portion 131 in this example is connected to the housing 100 instead of being provided outside the housing 100. For example, the battery pack 130 is mounted on a backpack in the backpack blower.

In this example, as shown in FIG. 33, the belt coupling portion 170 is located behind the center of gravity G of the blower 10. It is to be noted that the center of gravity G represents the center of gravity of the blower 10 to which the battery pack 130 is mounted. In an example, the belt coupling portion 170 is disposed between an air inlet end of the pipe assembly 260 and the battery pack 130. In an example, the projection of the belt coupling portion 170 on the motor axis 231 is located within the range of the projection of the grip 150 on the motor axis 231. In an example, the belt coupling portion 170 is disposed between the grip 150 and the handle 400. In an example, the belt coupling portion 170 is disposed on the rear side of the center of gravity G. The belt coupling portion 170 is set within the preceding range so that the balance state of the blower 10 hung on the belt 800 is consistent with the balance state of the blower 10 held by the hand of the user. When the blower 10 switches between a handheld state and a waist-hanging state, the user does not need to adjust the habits and skills of using the blower 10, thereby improving the convenience of operating the blower 10 and the user experience.

Figure 34:
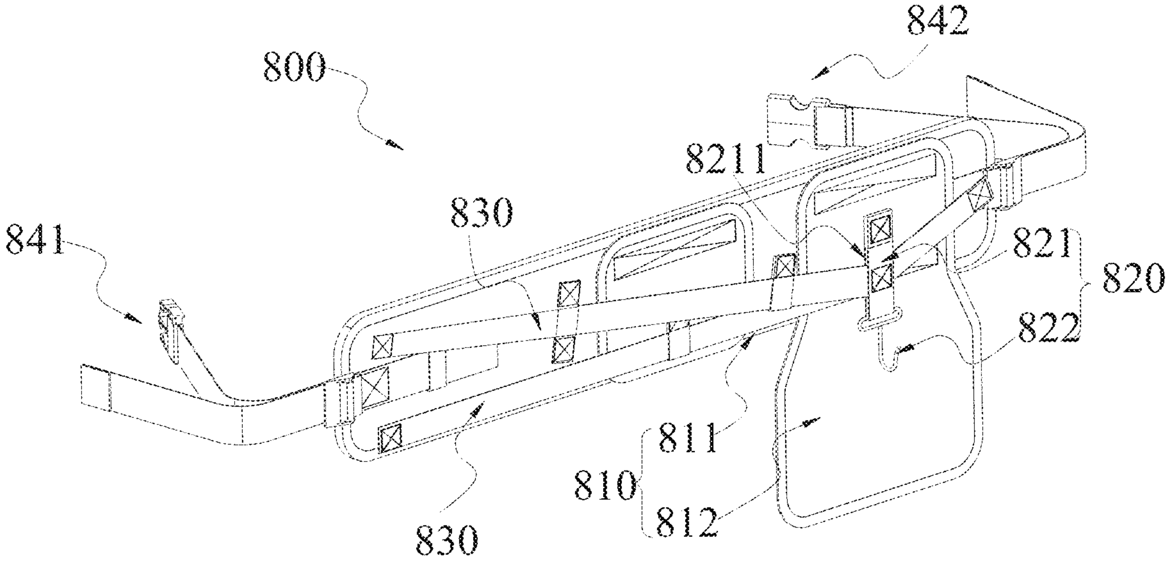
FIG. 34 is a perspective view of a belt.
Figure 35:
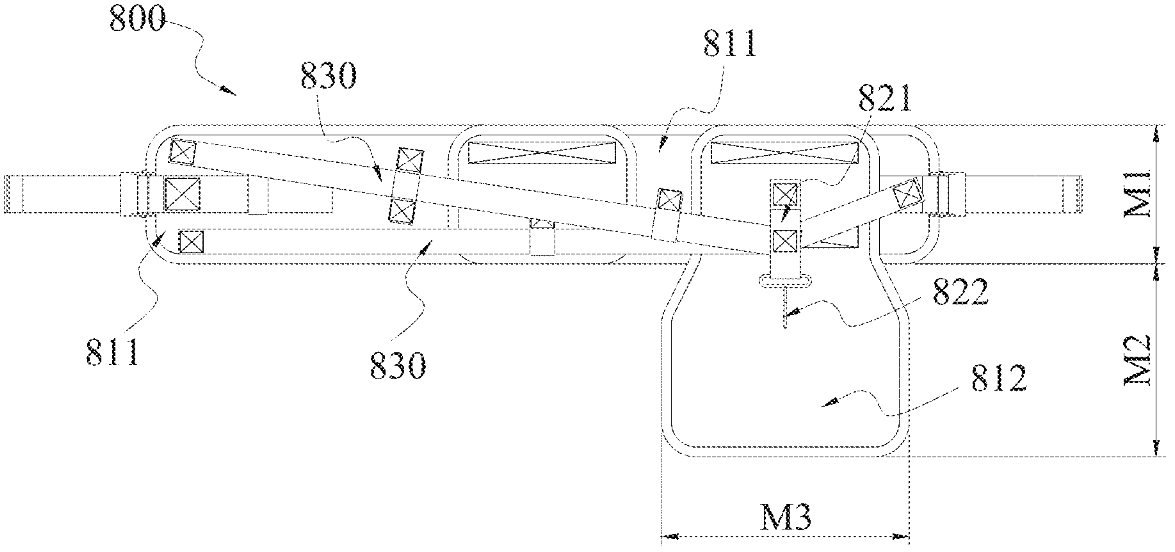
FIG. 35 is an expansion view of a belt.

As shown in FIGS. 34 and 35, the belt 800 includes a belt body 810 and a coupling member 820. The belt body 810 is wrapped around and fixed on the waist of the user, and the coupling member 820 is fixed on the belt body 810 and connected to the belt coupling portion 170. In this example, the belt body 810 includes a looped portion 811 and a shielding portion 812. The looped portion 811 is used for surrounding the waist of the user, and two ends of the looped portion 811 may be fixed through a snap connection, a strap connection, or the like. In an example, a first mounting portion 841 and a second mounting portion 842 are snap-fitted, thereby locking the belt 800.

The shielding portion 812 is connected to the looped portion 811 and extends downward from the looped portion 811. In an example, the looped portion 811 has a first height M1 along the up and down direction, and the shielding portion 812 has a second height M2 along the up and down direction, where the second height M2 is greater than or equal to the first height M1. In an example, the shielding portion 812 has a first length M3 along the left and right direction, and the first length M3 is greater than or equal to the first height M1. In this manner, when the blower 10 is hooked on the belt 800, the shielding portion 812 can separate the blower 10 from the clothes of the user, thereby preventing the blower 10 from sucking the clothes of the user into the air inlet of the blower.

In this example, the coupling member 820 includes a mounting belt 821 and a belt mounting portion 822. The coupling member 820 is fixed on the belt body 810. The belt mounting portion 822 is connected to the coupling member 820. The belt coupling portion 170 can be hooked on the coupling member 820. In an example, the coupling member 820 may be made of cloth so that the coupling member 820 can be easily connected to the belt body 810. The coupling member 820 may be made of metal material to ensure sufficient strength. In this example, the belt coupling portion 170 and the coupling member 820 are both configured to be hooks. In some examples, one of the belt coupling portion 170 and the coupling member 820 may be configured to be a hook, and the other one of the belt coupling portion 170 and the coupling member 820 may be configured to be a hanging ring. In other examples, the belt coupling portion 170 and the coupling member 820 may be a snap-fit structure, a strap structure, or the like.

As shown in FIG. 34, a penetration portion 8211 is provided on the coupling member 820, the belt 800 further includes two lifting straps 830, the first ends of the two lifting straps 830 are both connected to the belt body 810, and the second ends of the two lifting straps 830 pass through the penetration portion 8211, intersect, and are connected to the belt body 810. The two lifting straps 830 are provided to lift the coupling member 820 so that the entire belt 800 can be prevented from being pulled downward excessively due to a larger force on the coupling member 820, thereby improving the user experience.

It is to be noted that the belt coupling portion 170 and the belt mounting portion 822 may each be an open hook, a completely enclosed hook, or a hook that is switchable between the open form and the completely enclosed form.

Figure 36:
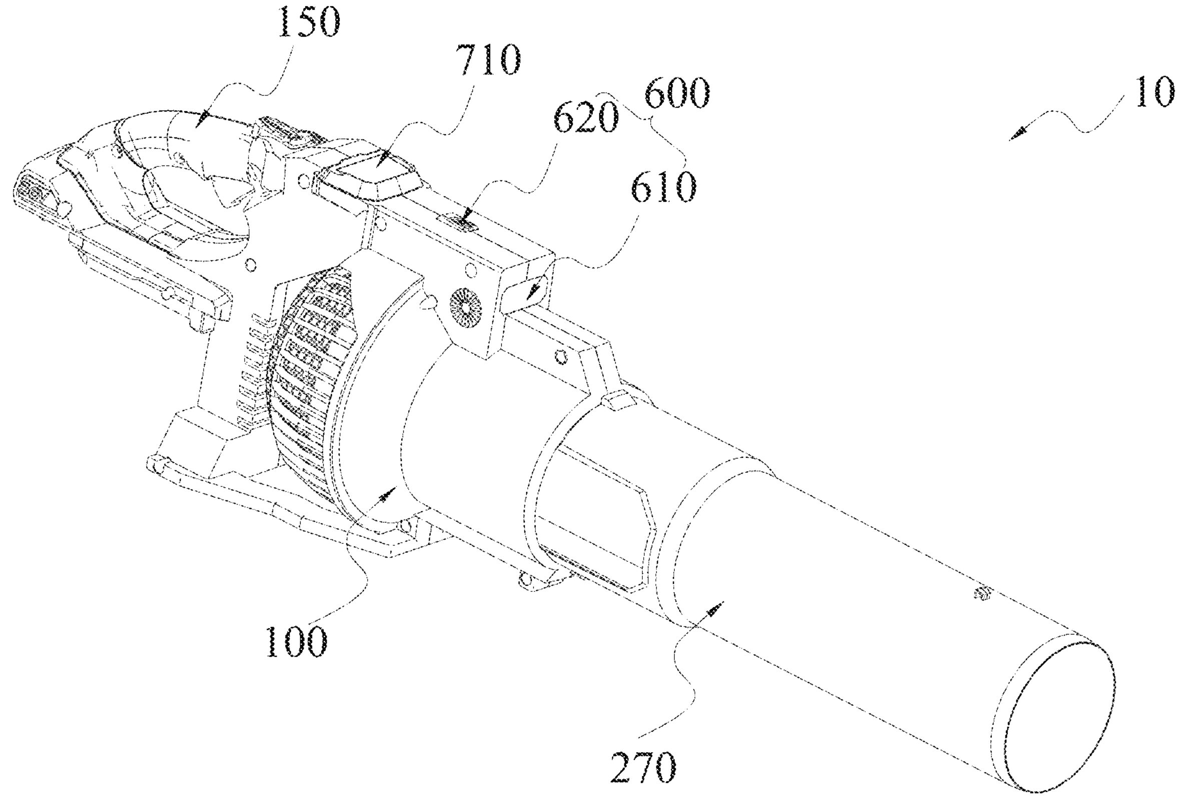
FIG. 36 is a structural view of a handheld blower.

In some examples, as shown in FIG. 36, the blower 10 further includes an illumination device 600 for increasing the brightness of the surrounding environment when the blower 10 is in operation so that the blower 10 can work well even in a dimly lit environment, thereby improving the user experience. The illumination device 600 includes a light assembly 610 and a switch assembly 620. The switch assembly 620 is used for controlling the working state of the light assembly 610. In this example, the light assembly 610 is connected to the housing 100 and disposed on the front side of the handle 400, thereby preventing the handle 400 from blocking the light of the light assembly 610. It is to be noted that the illumination device 600 may include only the light assembly 610 and does not include the switch assembly 620. Here, "not including the switch assembly 620" means not including the physical structure of the switch assembly 620 shown in FIG. 36. In an example, the user may control the light assembly 610 through a device such as a mobile phone that is connected to the blower 10 via signals. In an example, the illumination device 600 may be provided with a light sensor. When the light sensor recognizes that the ambient brightness decreases to a threshold, the light assembly 610 automatically lights up. In an example, the switch assembly 620 may be integrated with other switch structures of the blower 10.

Figure 37:
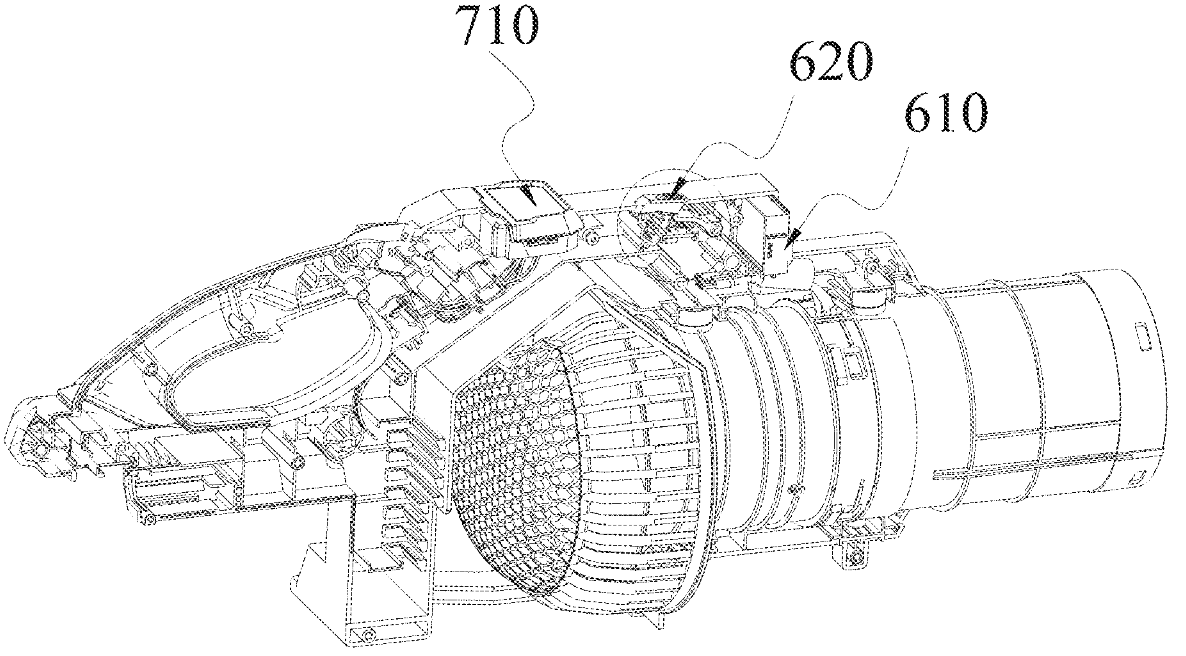
FIG. 37 is a partial structural view of a handheld blower.
Figure 38:
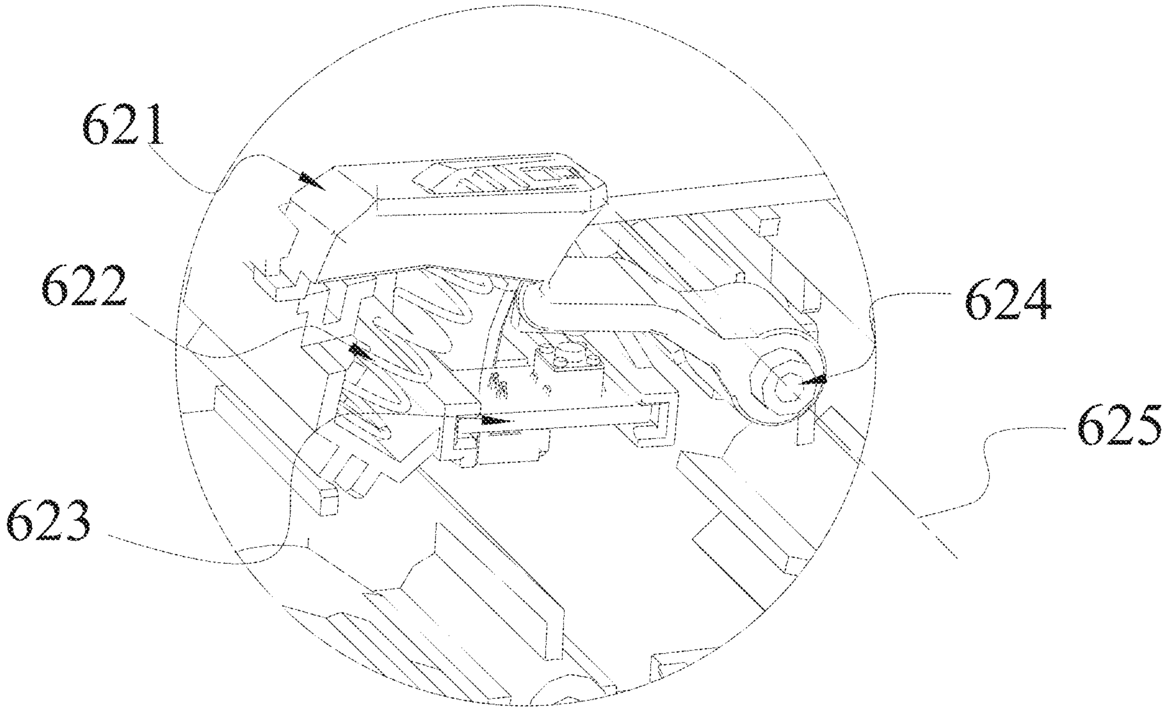
FIG. 38 is a partial enlarged view of a region in FIG. 37.

In some examples, as shown in FIGS. 37 and 38, the light assembly 610 is disposed toward the front side of the blower 10, and the switch assembly 620 is disposed toward the top of the blower 10, thereby making it easier for the user to see and operate the switch assembly 620. The switch assembly 620 includes a button 621, a pivot shaft 624, an elastic member 622, and a first circuit board 623. The button 621 is pivotally connected to the housing 100 via the pivot shaft 624, and the axis of the pivot shaft 624 is a pivot axis 625. The first circuit board 623 is opposite to the button 621, and the first circuit board 623 is electrically connected to the light assembly 610. The elastic member 622 is disposed between the button 621 and the housing 100. When the user presses the button 621, the button 621 rotates about the pivot axis 625 and approaches the first circuit board 623, thereby triggering the electrical components on the first circuit board 623 and lighting the light assembly 610 up. When the user releases the button 621, the elastic member 622 resets the button 621. In some examples, a mechanical switch is disposed on the first circuit board 623; and when the button 621 is reset, the mechanical switch is turned off, and the light assembly 610 is turned off accordingly. In some examples, an electronic switch is disposed on the first circuit board 623; and when the button 621 is reset, the light assembly 610 is not turned off, and the user needs to press the button 621 again to turn off the light assembly 610.

Figure 39:
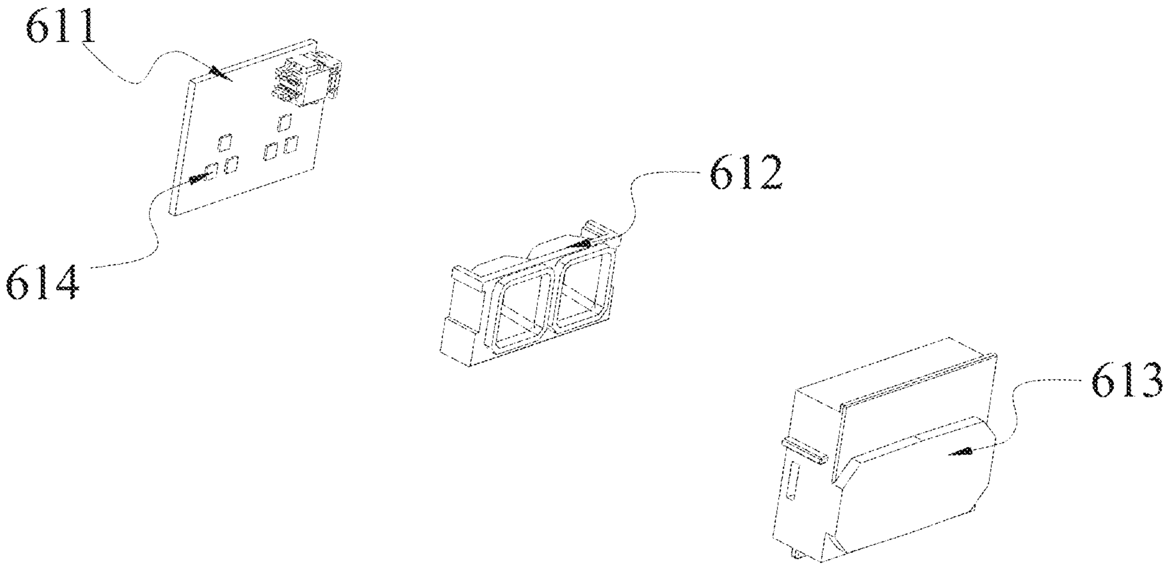
FIG. 39 is an exploded view of a light assembly.

As shown in FIG. 39, the light assembly 610 includes a second circuit board 611 electrically connected to the first circuit board 623. Light-emitting elements 614 are disposed on the second circuit board 611. When the first circuit board 623 is triggered by the button 621, the second circuit board 611 turns on or off the light-emitting elements 614. In an example, the light-emitting element 614 may be a light-emitting diode (LED) lamp. The light assembly 610 further includes a light guide portion 612 and a light-transmissive portion 613. The light guide portion 612 is disposed on the front side of the second circuit board 611, and a light guide channel is disposed on the light guide portion 612. The light-emitting elements 614 at least partially extend into the light guide channel, thereby limiting the light direction of the light-emitting elements 614. The light-transmissive portion 613 covers the front side of the second circuit board 611, thereby protecting the second circuit board 611, the light-emitting elements 614, and the light guide portion 612 and ensuring that the light of the light-emitting elements 614 can propagate.

Figure 40:
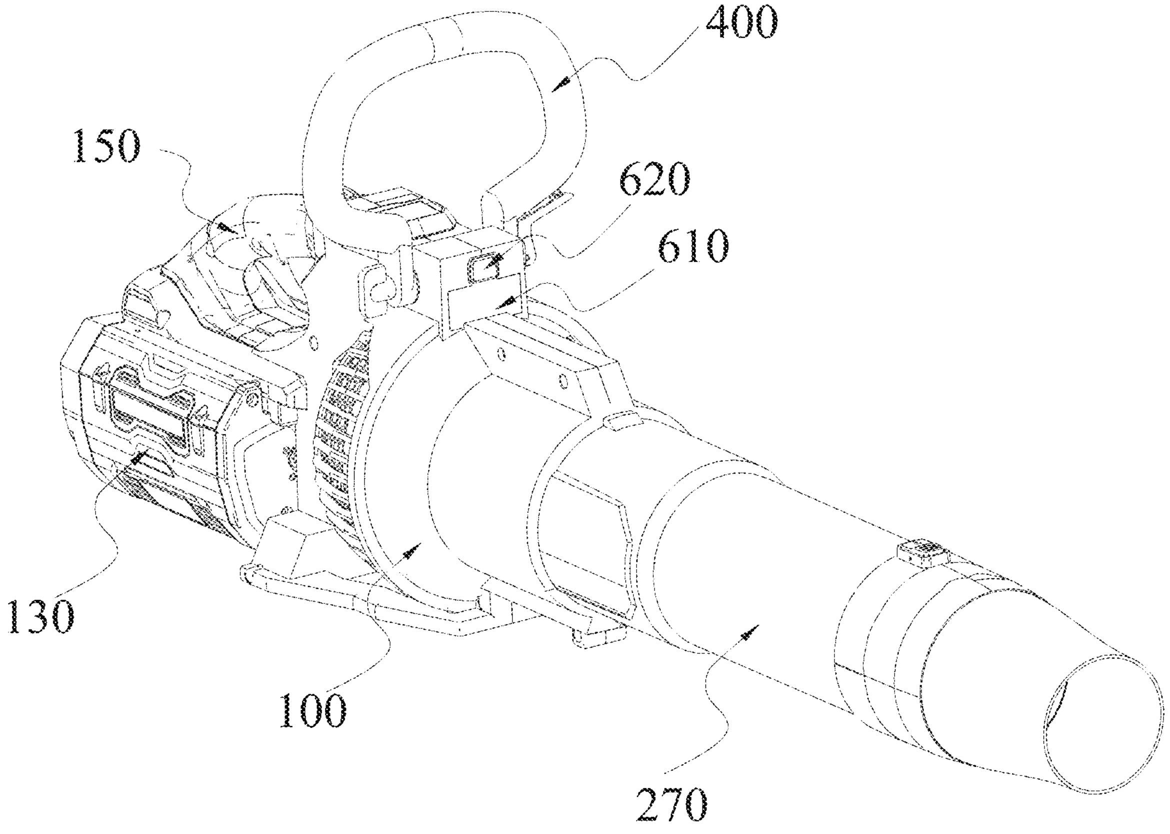
FIG. 40 is a structural view of another handheld blower.
Figure 41:
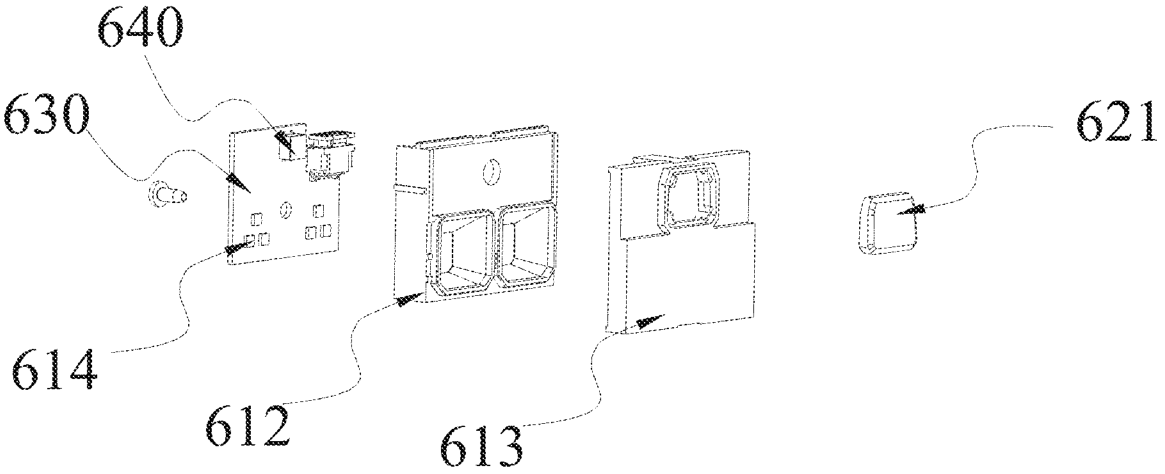
FIG. 41 is an exploded view of an illumination device.

In some examples, as shown in FIGS. 40 and 41, the switch assembly 620 and the light assembly 610 are integrated, thereby making the appearance of the blower 10 simpler and more aesthetic. The integrated structure of the switch assembly 620 and the light assembly 610 is disposed toward the front side of the blower 10, thereby illuminating the working environment in front of the blower 10. The illumination device 600 includes a third circuit board 630 and a button 621 opposite to the third circuit board 630. The third circuit board 630 is provided with the light-emitting elements 614 and an electronic switch 640. In some examples, when the user presses the button 621, the button 621 triggers the electronic switch 640, and the third circuit board 630 causes the light-emitting elements 614 to light up. When the user presses the button 621 again, the electronic switch 640 is turned off, and the light-emitting elements 614 are turned off accordingly. In some examples, the light-emitting elements 614 have at least two brightnesses. When the user presses the button 621 for the first time, the light-emitting elements 614 emit light of the first brightness. When the user presses the button 621 for the second time, the light-emitting elements 614 emit light of the second brightness. When the user presses the button 621 for the third time, the light-emitting elements 614 are turned off.

As shown in FIG. 41, the illumination device 600 further includes a light guide portion 612 and a light-transmissive portion 613. The light guide portion 612 is disposed on the front side of the third circuit board 630. A light guide channel is formed on the light guide portion 612. At least some light-emitting elements 614 are located in the light guide channel. The light guide portion 612 guides the light emitted by the light-emitting elements 614. The light-transmissive portion 613 is disposed on the front side of the light guide portion 612. The light-transmissive portion 613 can protect the third circuit board 630, the light-emitting elements 614, and the light guide portion 612 and ensure that the light of the light-emitting elements 614 can propagate. In this example, the button 621 is movably connected to the light-transmissive portion 613 so that the light-transmissive portion 613 can support the button 621.

Figure 42:
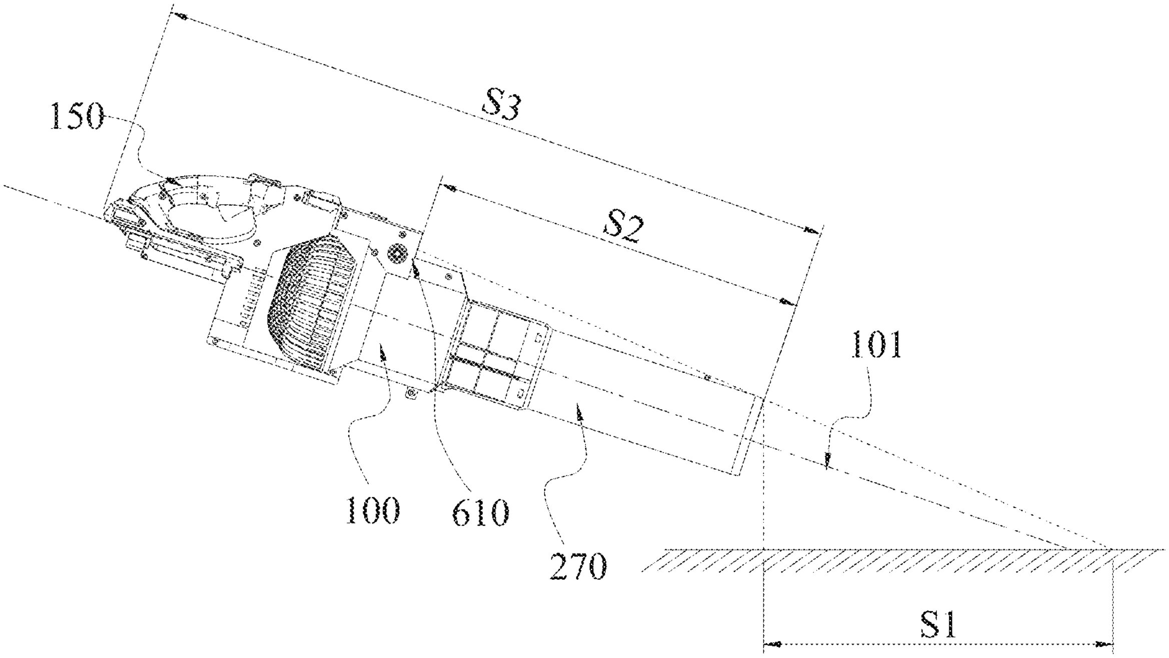
FIG. 42 is a side view of a handheld blower.

As shown in FIG. 42, the blower 10 has the blower axis 101, and the blower axis 101 is collinear with the axis of the pipe assembly 260. Usually, when the blower 10 is in operation, the included angle between the blower axis 101 and the ground is 25 degrees to 40 degrees. As shown in FIG. 42, S1 is defined as the length of the projection of a line on the ground, where the line is a line between the frontmost end of the blower 10 and the farthest end that the illumination device 600 can illuminate on the ground when the blower 10 is in operation. S1 is greater than or equal to 1 m. In some examples, S1 is greater than or equal to 1.5 m. In some examples, S1 is greater than or equal to 2 m. It is to be understood that those skilled in the art may select the light assembly 610 with corresponding performance according to actual requirements for S1.

As shown in FIG. 42, S2 denotes the distance between the light assembly 610 and the frontmost end of the blower 10 along the direction of the blower axis 101, and S3 denotes the length of the blower 10 along the direction of the blower axis 101. S2/S3 is less than or equal to 0.8. By setting S2/S3 within this ratio range, while the light assembly 610 can be easily mounted, the light assembly 610 can be prevented from being positioned too far back, and the light assembly 610 can be prevented from being blocked by the pipe assembly 260 and creating a large shadow region on the ground, thereby improving the user experience. In an example, S2/S3 is less than or equal to 0.7. In some examples, S2/S3 is about 0.55 or 0.45.

As shown in FIG. 36, the blower 10 is a handheld blower, the handheld blower further includes a display 710, and the display 710 includes an electronic display screen 717. In an example, the display 710 can display at least one of the power capacity of the battery pack 130, the output rotational speed of the handheld blower, an operation gear of the handheld blower, a fault prompt, and a Bluetooth connection state. In this manner, the user can more intuitively and quickly acquire the current operation state of the blower 10 so that the user can more conveniently adjust the operation parameters of the handheld blower subsequently, thereby improving the user experience. In some examples, the display 710 may display the operation gear of the handheld blower, the power capacity of the battery pack 130, and the fault prompt. In some examples, the display 710 may display the output rotational speed of the handheld blower, the power capacity of the battery pack 130, and the fault prompt. It is to be understood that, in other examples, the actual display content of the display 710 may be any one or a combination of several of the preceding parameters.

In some examples, as shown in FIG. 36, the display 710 is disposed on the front side of the grip 150 so that the display 710 can be prevented from being blocked when the user holds the blower 10, thereby ensuring the convenience of the user in viewing the display 710. It is to be noted that the display 710 is disposed on the front side of the grip 150, which means that the display 710 is disposed on the front side of the position where the hand is located when the user holds the grip 150 with the hand. Regardless of whether the user holds the grip 150 at a forward or backward position, the display 710 is not blocked.

The display 710 is disposed on the housing 100 so that the housing 100 supports the display 710. In an example, the display 710 may be flush with the outer surface of the housing 100 or may protrude from the outer surface of the housing 100. In this example, the display 710 is disposed on the housing 100 and is disposed upward, thereby improving the viewing convenience of the user. In other examples, the display 710 may be configured to face the left, right, front, or rear of the blower 10.

In some examples, as shown in FIG. 22, the display 710 is disposed between the grip 150 and the handle 400 so that the structure of the blower 10 is compact; and the display 710 is located between two hands of the user so that the user can view the display 710 without being blocked by the hands.

As shown in FIG. 23, the blower 10 further includes a control assembly 720 for controlling the operation state of the blower 10. In an example, the minimum distance between the display 710 and the control assembly 720 is less than or equal to 100 mm. In an example, the minimum distance between the display 710 and the control assembly 720 is less than or equal to 50 mm. In this manner, the signal lines between the display 710 and the control assembly 720 can be prevented from being excessively long and entangled. As shown in FIG. 23, the control assembly 720 is disposed in the space surrounded by the left housing 110 and the right housing 120. The left housing 110 and the right housing 120 are buckled together to form a hole, and the display 710 is disposed at the hole.

Figure 43:
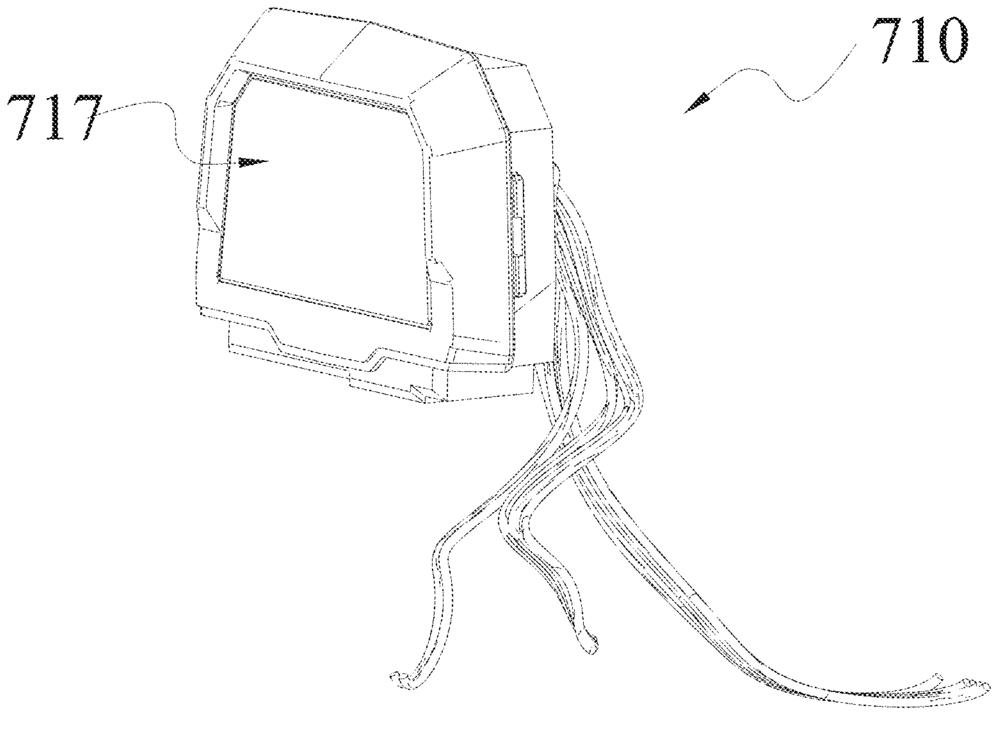
FIG. 43 is a structural view of a display.
Figure 44:
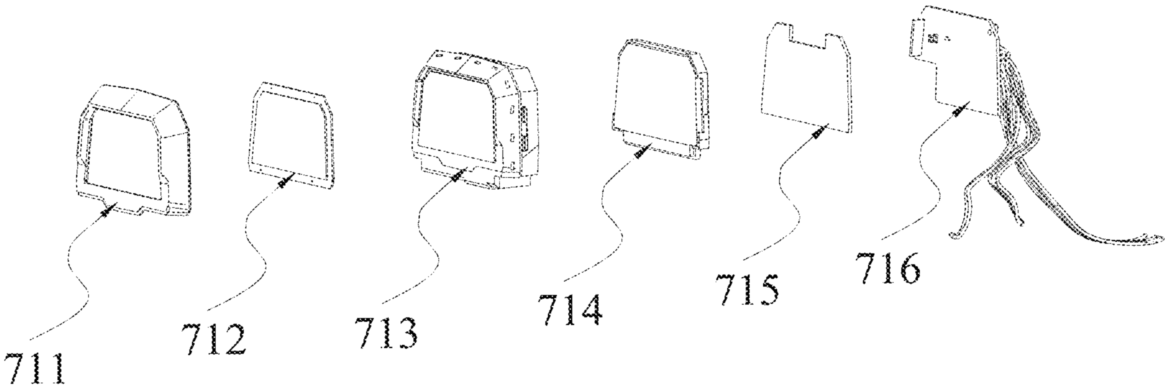
FIG. 44 is an exploded view of a display.

As shown in FIGS. 43 and 44, the display 710 includes screen box soft rubber 711, a light-transmissive screen 712, screen box hard rubber 713, a light source 714, a communication board 715, and a control board 716. The screen box soft rubber 711 and the screen box hard rubber 713 are buckled together and can support the light-transmissive screen 712, the light source 714, the communication board 715, and the control board 716 so that the display 710 is integrated into a whole and is convenient to mount. In this example, the electronic display screen 717 is formed by at least the light source 714 and the control board 716. The communication board 715 is provided with an Internet of Things (IoT) communication module. In an example, the communication board 715 is provided with a Bluetooth module, a Wi-Fi module, or the like. The control board 716 is a printed circuit board (PCB), and the control board 716 is electrically connected to the control assembly 720 of the blower 10. A light-emitting portion may be a liquid-crystal display (LCD) screen or an LED screen. The light-transmissive screen 712 is disposed on the front side of the light-emitting portion. The light-transmissive screen 712 can allow light from the light source 714 to pass through and can protect the light source 714.

The effective area S of the display 710 is defined as the displayable area of the electronic display screen 717, and the effective area S is greater than or equal to 4 $cm^2$. In an example, the effective area S is greater than or equal to 9 $cm^2$ and less than or equal to 15 $cm^2$. In some examples, the effective area S is about 8 $cm^2$, 10 $cm^2$, 12 $cm^2$, or 14 $cm^2$.

Figure 54:
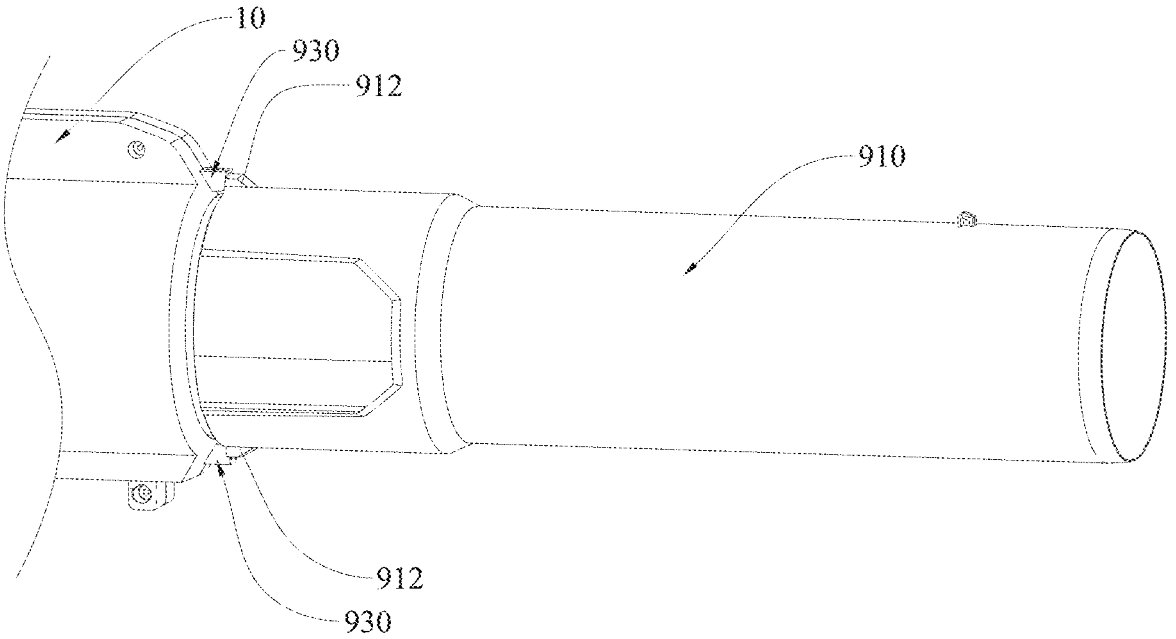
FIG. 54 is a partial schematic view of a blower in a state in which a wind tube is not disassembled.

As shown in FIG. 54, this example provides a blower. The blower includes a body 11 and a wind tube 910. The blower is further provided with an ejection mechanism 900. The ejection mechanism 900 may be provided independently of the body 11 and the wind tube 910 or may include some structures of the body 11 and/or the wind tube 910.

Figure 45:
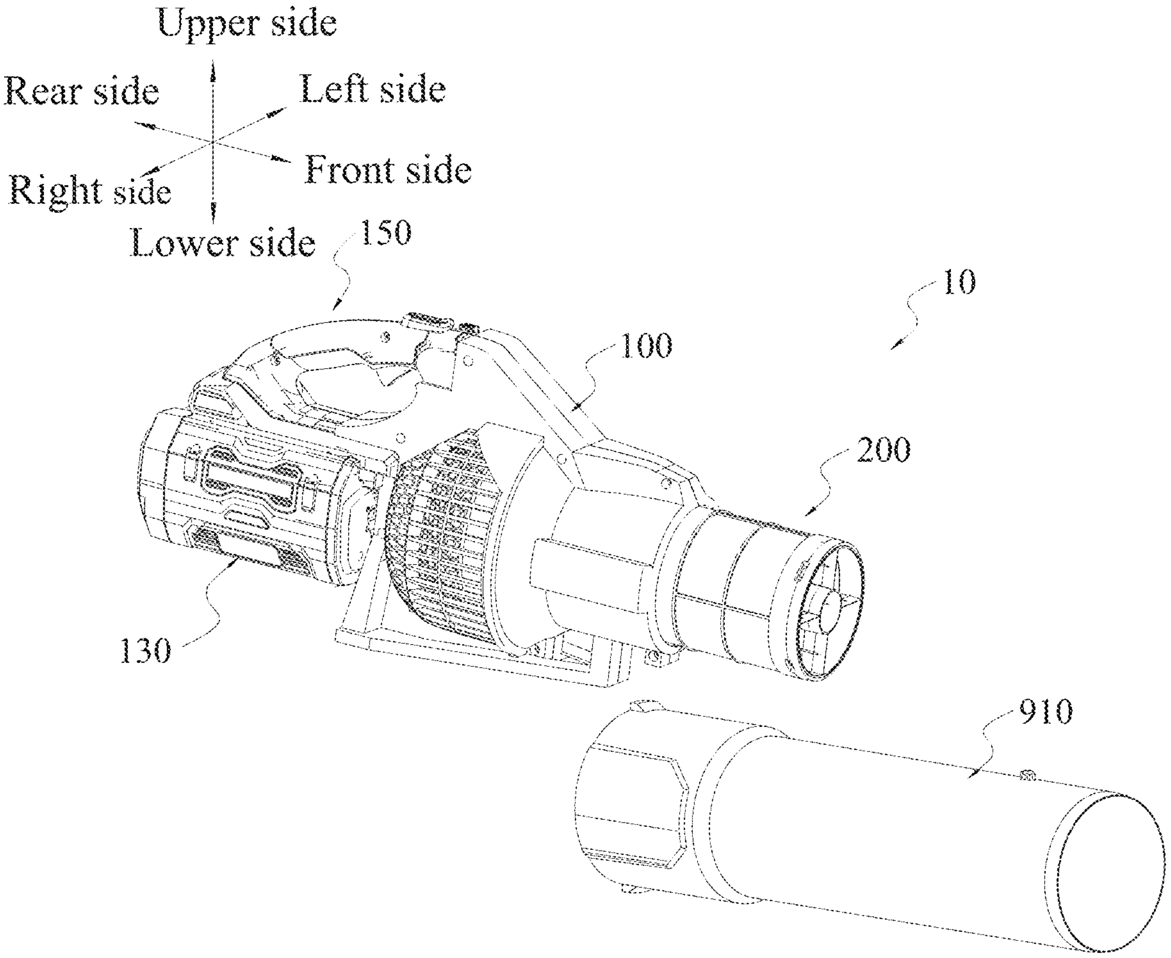
FIG. 45 is an exploded view of a body and a wind tube according to an example.
Figure 46:
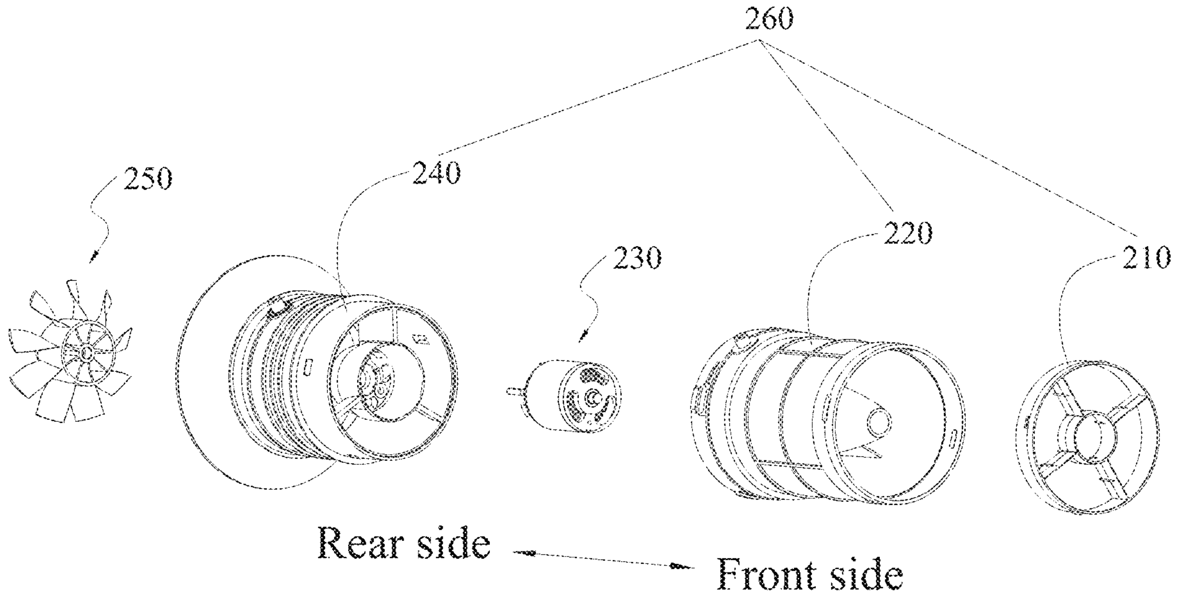
FIG. 46 is an exploded view of a blow-suction structure provided in FIG. 45.

Referring to FIGS. 45 and 46, the body 11 includes the blow-suction structure 200 and the housing 100, and the housing 100 is formed with the grip 150 for the user to hold. The blow-suction structure 200 includes the fan assembly 250 and the motor 230, the fan assembly 250 and the motor 230 are disposed in the pipe assembly 260, and the housing 100 plays a supporting role. The motor 230 is used for driving the fan blades of the fan assembly 250 to rotate about the axis of the fan assembly 250 to accelerate the air to generate the airflow, thereby implementing the blowing and suction functions. The blow-suction structure 200 further includes the pipe assembly 260 for fixing and accommodating the fan assembly 250 and the motor 230 and providing a channel for the airflow. In an example, the pipe assembly 260 includes the protective cover 210, the first pipe 220, and the second pipe 240, thereby facilitating the installation of the fan assembly 250 and the motor 230. The wind tube 910 is detachably connected to the body 11, and the wind tube 910 allows air to pass through.

As shown in FIGS. 47, 48, 52, and 53, the blower is provided with the ejection mechanism 900, and the ejection mechanism 900 applies an ejection force so that the wind tube 910 tends to be separated from the body 11. In this example, the ejection mechanism 900 applies an ejection force to the wind tube 910 so that the wind tube 910 tends to be separated from the body 11. In other examples, the ejection mechanism 900 applies an ejection force to the body 11 so that the body 11 tends to be separated from the wind tube 910.

In an example, the ejection mechanism 900 includes an elastic member 920. The elastic member 920 is disposed between the wind tube 910 and the body 11. When the wind tube 910 is mounted on the body 11, the elastic member 920 is compressed. During the process of disassembling the wind tube 910 from the body 11, the elastic member 920 is reset and generates an elastic restoring force to assist in pushing the wind tube 910 so that the wind tube 910 is released from the body 11, thereby facilitating the disassembly of the wind tube 910.

Figure 47:
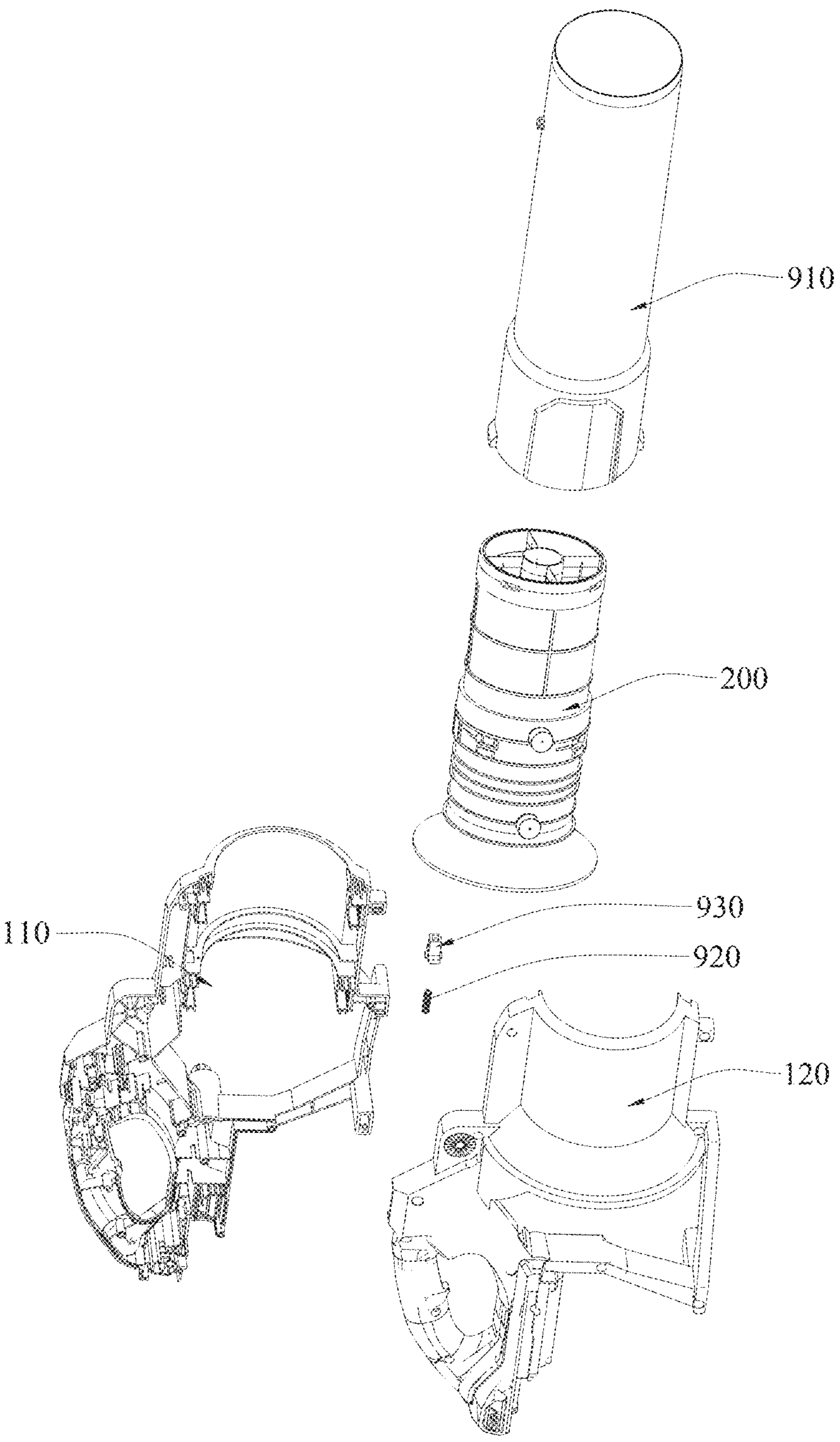
FIG. 47 is an exploded view of an outer housing, the blow-suction structure, and a wind tube provided in FIG. 46.
Figure 48:
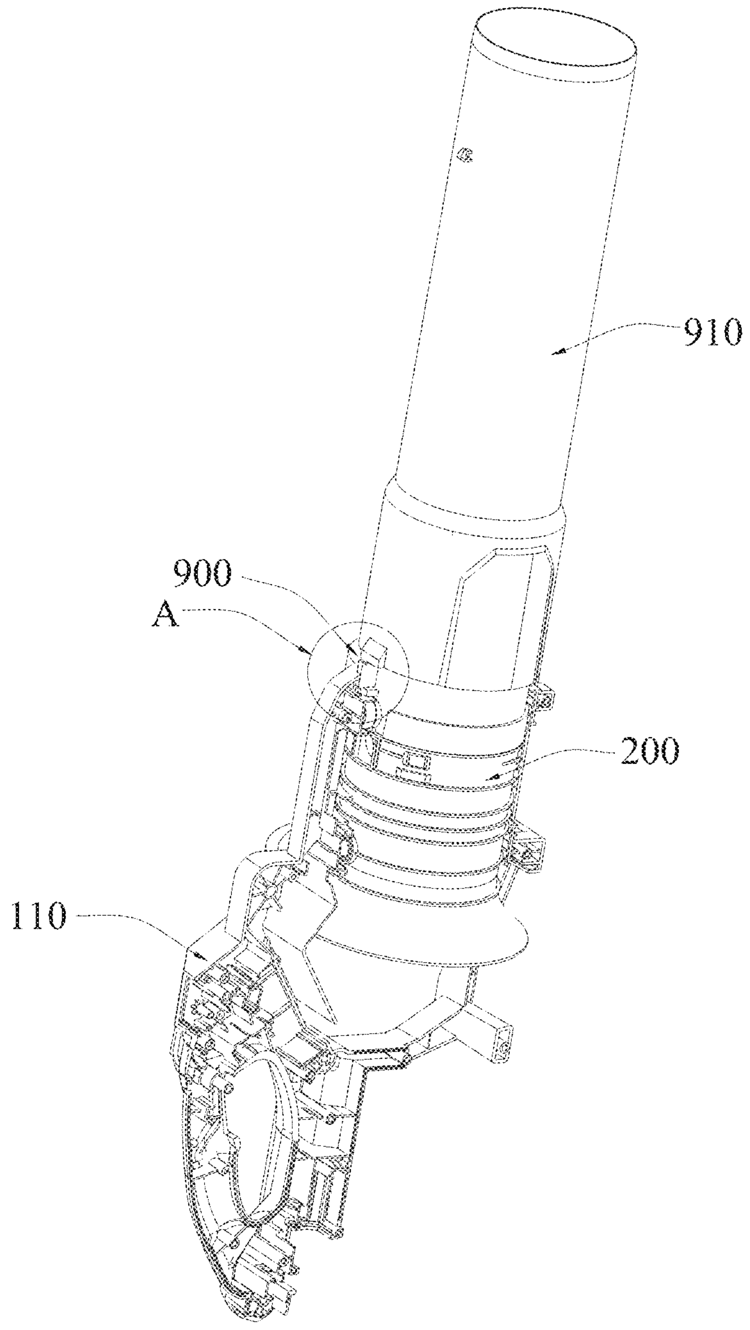
FIG. 48 is a schematic view of a blower provided in FIG. 46 without a second housing.

In an example, as shown in FIG. 47, the housing 100 includes a first housing 110 and a second housing 120. The first housing 110 and the second housing 120 are both half housings. When the two housings are combined, an accommodation space for mounting the blow-suction structure 200 is formed, thereby facilitating manufacturing and assembly. Further, the housing 100 may be used for accommodating the battery pack 130, the control board, and the like. The battery pack 130 is used for supplying power to structures such as the control board and the motor 230. In an example, the first housing 110 and the second housing 120 together form the grip 150. In another example, the grip 150 may be provided independently of the housing 100, that is to say, the grip 150 may not be formed by extending from the housing 100.

Figure 52:
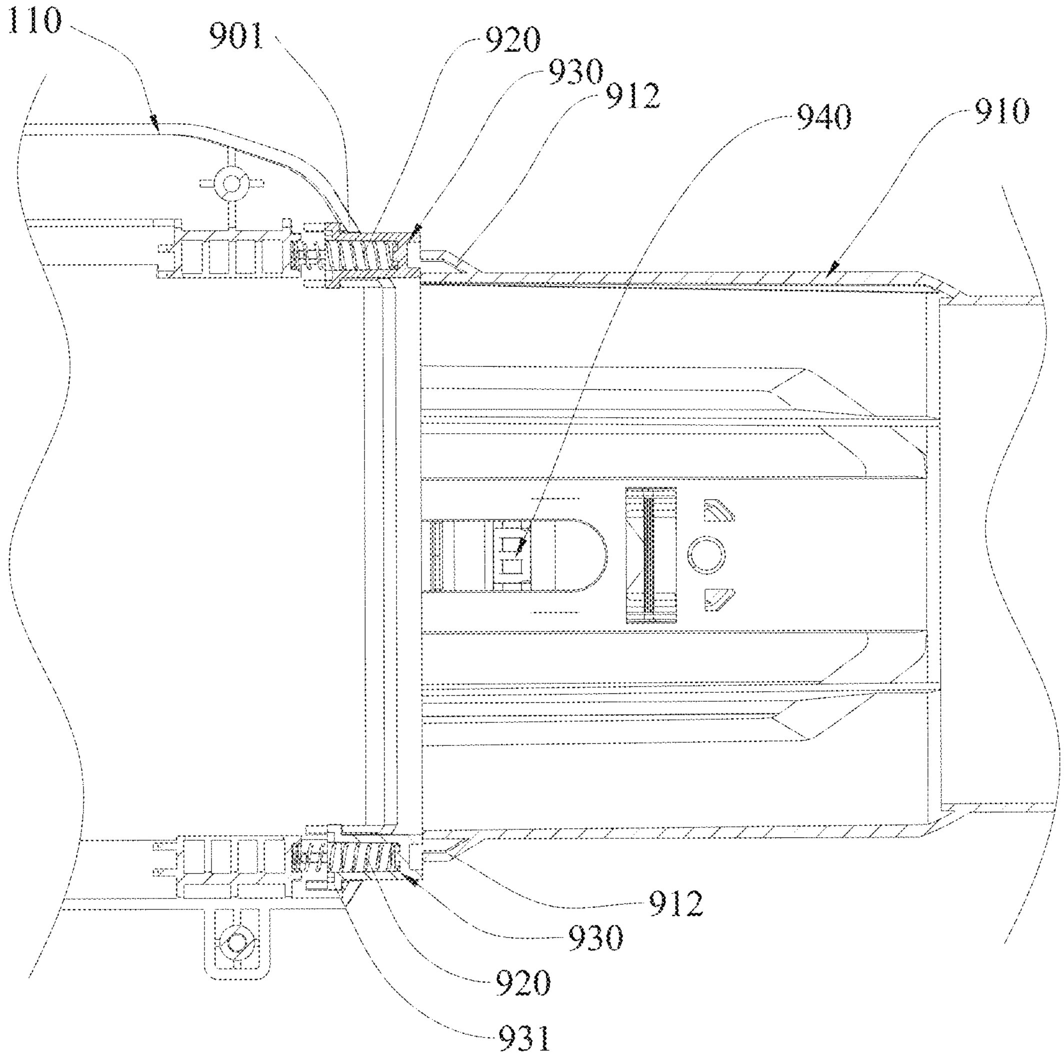
FIG. 52 is a partial sectional view of a blower in a state in which a wind tube is disassembled.

In an example, as shown in FIGS. 52 and 54, at least one elastic member 920 is provided, and at least one mounting portion 90A is circumferentially provided on the body 11. The elastic member 920 is disposed in the corresponding mounting portion 90A. The first end of the elastic member 920 can abut against the wind tube 910, and the second end of the elastic member 920 can abut against the mounting portion 90A. In an example, the mounting portion 90A is a mounting groove, and the elastic member 920 abuts against the bottom of the mounting groove. One or more elastic members 920 generate elastic forces so that the wind tube 910 is elastically connected to the body 11, and the number of elastic members 920 may be set according to requirements. In an example, the mounting portion 90A is provided on the housing 100. When the housing 100 includes the first housing 110 and the second housing 120, the mounting portion 90A may be formed on the first housing 110 or the second housing 120 or the mounting portions 90A may be formed on the first housing 110 and the second housing 120. Alternatively, the first housing 110 and the second housing 120 may each have a half groove, and the mounting portion 90A is formed when the first housing 110 and the second housing 120 are combined. In other examples, the mounting portions 90A are provided on the protective cover 210, or the first pipe 220 and the protective cover 210 together form the mounting portions 90A, or when the body 11 further includes other functional structures, the mounting portions 90A may be provided on other functional structures, as long as the elastic members 920 are mounted on the body 11, or in other words, as long as the elastic members 920 are mounted on the pipe assembly 260.

Figure 53:
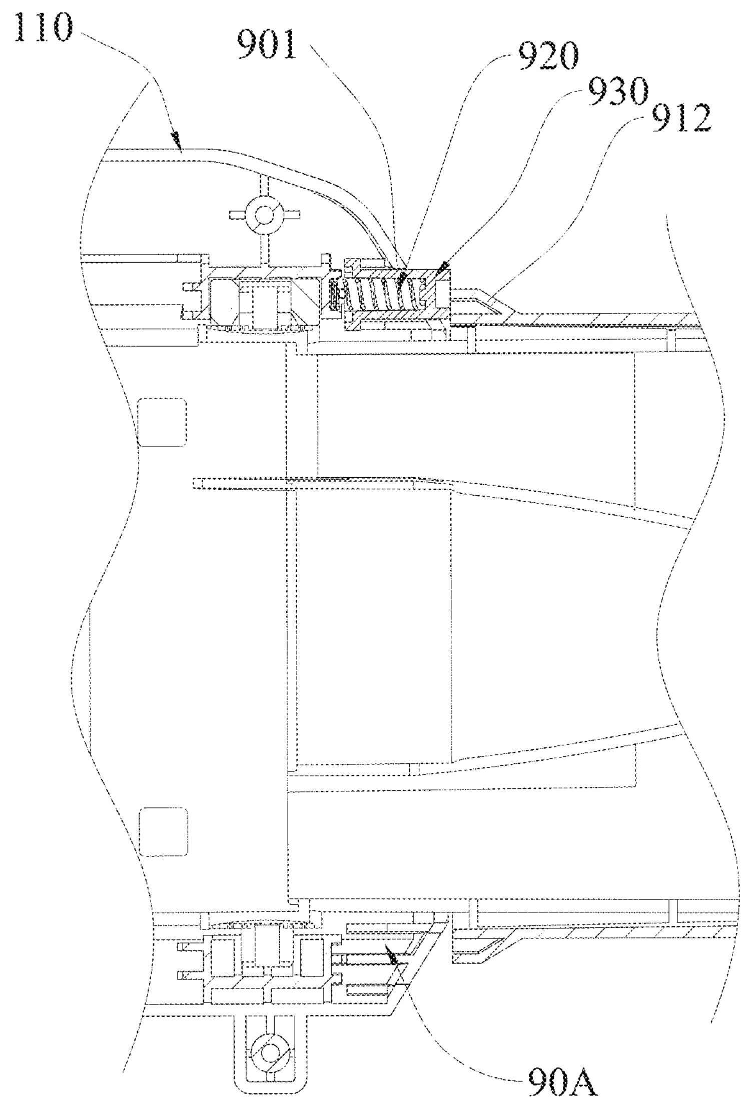
FIG. 53 is a partial sectional view of a blower in a state in which a wind tube is not disassembled.

In another example, the mounting portion 90A may be provided on the wind tube 910, the elastic member 920 is mounted in the mounting portion 90A, the first end of the elastic member 920 abuts against the body 11, the second end of the elastic member 920 abuts against the groove bottom of the mounting portion 90A, and when the wind tube 910 is released from the body 11, the elastic member 920 is separated from the body 11 along with the wind tube 910. In an example, as shown in FIGS. 52 to 54, two elastic members 920 are provided, thereby avoiding a complicated structure due to too many elastic members 920 and avoiding failure to generate the elastic restoring force for releasing the wind tube 910 from the body 11 due to too few elastic members 920. The two elastic members 920 are opposite to each other, that is, the two elastic members 920 are located on two sides of the body 11 along the circumferential direction of the body 11. For example, as shown in FIG. 52, the centerline of the body 11 is parallel to the horizontal direction, and the two elastic members 920 are located on the upper and lower sides of the body 11. The two elastic members 920 are spaced apart so that the wind tube 910 is subjected to uniform elastic forces, thereby improving the release effect and avoiding the following: only one side of the wind tube 910 is subjected to the elastic force, the wind tube 910 is deflected during the release process, and the effect is not good.

In an example, as shown in FIGS. 52 and 53, the elastic members 920 are springs or rubber rings as long as the elastic members 920 can provide elastic forces.

Figure 49:
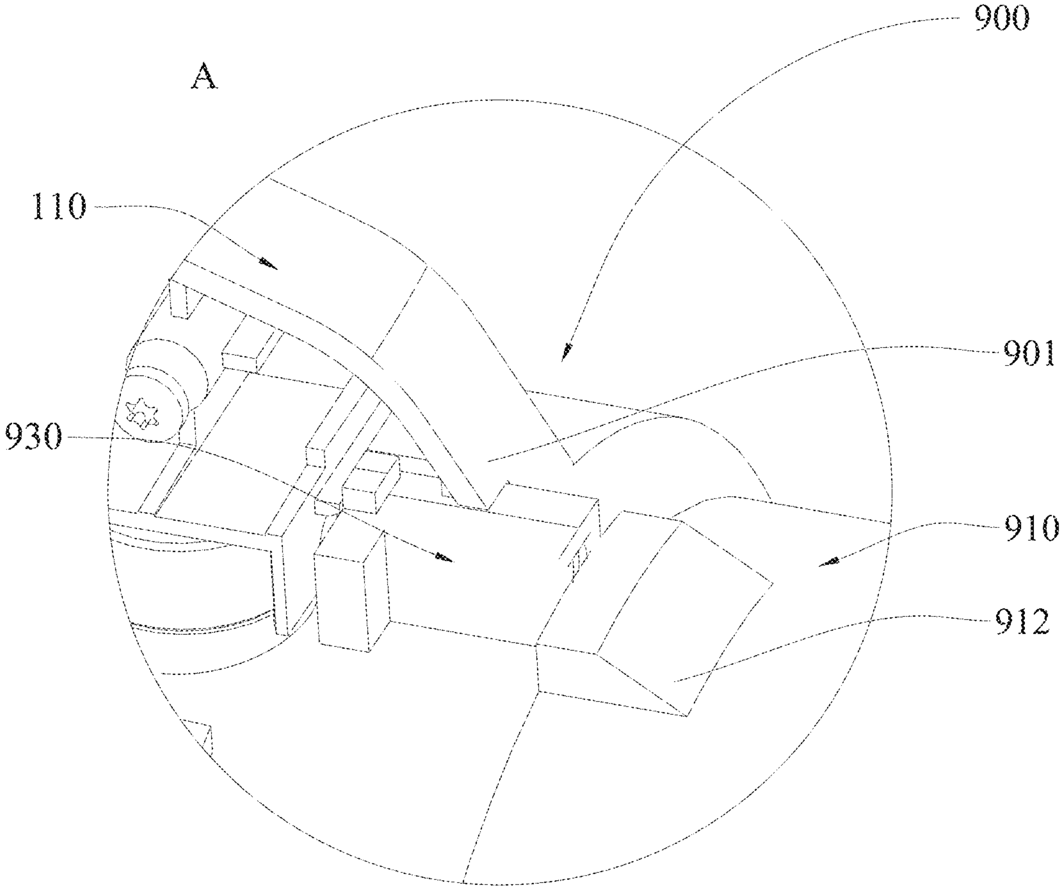
FIG. 49 is an enlarged view of part A in FIG. 48.

In an example, as shown in FIGS. 47, 49, and 54, the blower further includes mounting covers 930 slidably connected to the mounting portions 90A. The first end of the elastic member 920 abuts against the mounting cover 930, a side of the mounting cover 930 facing away from the elastic member 920 can abut against the wind tube 910, and the elastic member 920 and the wind tube 910 are connected through the mounting cover 930. When the wind tube 910 is mounted, the wind tube 910 compresses the elastic member 920 through the mounting cover 930. When the wind tube 910 is to be pulled out, the elastic member 920 is reset to push the mounting cover 930 to slide outward to abut against and push the wind tube 910 so that the wind tube 910 is ejected. In an example, the mounting cover 930 is provided with a mounting cavity, and the elastic member 920 is disposed in the mounting cavity, thereby ensuring that the elastic member 920 slides along the mounting portion 90A to improve accuracy; and the end of the mounting cover 930 is a plane through which the mounting cover 930 is in contact with the wind tube 910, thereby ensuring a close fit between the mounting cover 930 and the wind tube 910.

In an example, a first groove 932 is formed at an end of the mounting cover 930 facing the wind tube 910, thereby reducing the contact area between the end of the mounting cover 930 and the wind tube 910 and lowering the flatness processing requirements of the end surface of the mounting cover 930.

In another example, the first groove 932 is formed at an end of the mounting cover 930 facing the wind tube 910, and a protrusion is provided at the end of the wind tube 910 and can extend into a second groove 933, thereby achieving circumferential limitation between the wind tube 910 and the body 11.

In an example, as shown in FIG. 49 and FIGS. 52 to 54, the mounting cover 930 extends out of the mounting portion 90A, and the end surface of the wind tube 910 abuts against the mounting cover 930. In an example, blocking portions 912 are provided on the outer circumference of the wind tube 910, and the end surface of the wind tube includes the blocking portions 912. The mounting cover 930 extends out of the mounting portion 90A, and the blocking portion 912 abuts against the mounting cover 930. In this manner, the wind tube 910 and the blocking portion 912 can abut against each other easily. Therefore, the wind tube 910 can be prevented from extending into the mounting portion 90A, thereby facilitating the ejection of the wind tube 910. In an example, the wind tube 910 includes a first tube portion and a second tube portion arranged along the length direction, and the blocking portions 912 are disposed on the outer circumference of the first tube portion. In an example, the end of the blocking portion 912 is flush with the end of the first tube portion; in another example, the end of the blocking portion 912 and the end of the second tube portion may be arranged in a step shape, as long as it is ensured that the blocking portion 912 can abut against the mounting cover 930.

In an example, as shown in FIGS. 49 to 53, a limiting protrusion 931 protrudes along the circumferential direction of the mounting cover 930, a retaining edge 901 is provided at the notch of the mounting portion 90A, and the limiting protrusion 931 can be limited to the retaining edge 901.

When the wind tube 910 is mounted and the elastic member 920 is compressed, the limiting protrusion 931 is located in the mounting portion 90A, and a gap exists between the limiting protrusion 931 and the retaining edge 901. When the wind tube 910 is to be pulled out and the elastic member 920 is reset, the elastic member 920 abuts against and pushes the mounting cover 930 to move toward the wind tube 910 and abuts against and pushes the limiting protrusion 931 to be limited to the retaining edge 901, thereby preventing the mounting cover 930 from slipping off from the body 11.

Figure 50:
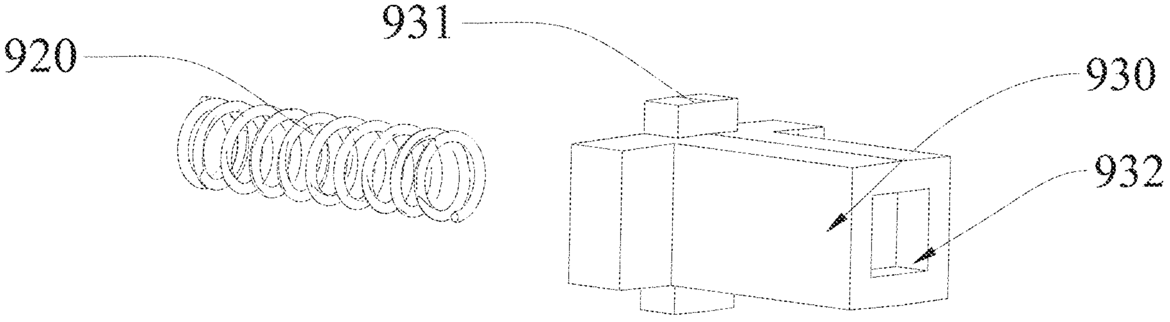
FIG. 50 is an exploded view of a mounting cover and an elastic member from one perspective.
Figure 51:
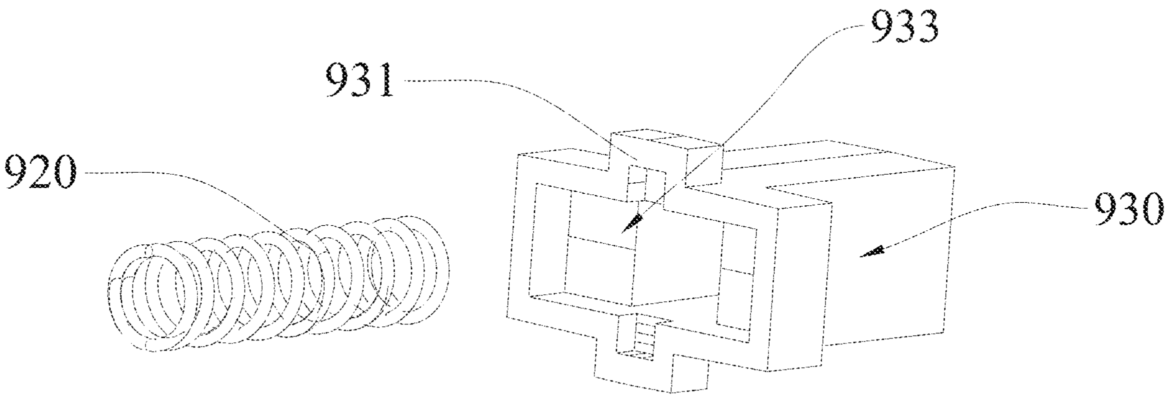
FIG. 51 is an exploded view of a mounting cover and an elastic member from another perspective.

In an example, as shown in FIG. 53, the first pipe 220 and the protective cover 210 together form the mounting portions 90A; for one mounting portion 90A, an end of the elastic member 920 is connected to the protective cover 210, the other end of the elastic member 920 is provided with the mounting cover 930, the mounting cover 930 is slidably connected to the housing 100, and the housing 100 is provided with a stop portion. The stop portion and the retaining edge 901 are limiting structures for two extreme positions of the mounting cover 930. When the wind tube 910 is mounted on the body 11 and the elastic member 920 is compressed, the limiting protrusion 931 can be stopped at the stop portion, thereby avoiding separation from the housing 100. As shown in FIG. 50, the first groove 932 is formed at an end of the mounting cover 930, thereby avoiding structural interference between the end of the mounting cover 930 and the protective cover 210.

In an example, the body 11 and the wind tube 910 are connected through plugging. The body 11 includes a first section and a second section arranged along the centerline direction. The wind tube 910 tightly mates with the first section of the body 11 and loosely mates with the second section of the body 11. In an example, as shown in FIG. 52, the blower further includes an unlocking member 940 fixed to the outer side of the wind tube 910. The surface of the unlocking member 940 is a non-slip surface. When the wind tube 910 is to be removed, the unlocking member 940 is pushed in a direction away from the body 11 to achieve the movement of the wind tube 910 away from the body 11. The wind tube 910 moves from the first section to the second section until the wind tube 910 is completely separated from the body 11, thereby achieving the removal of the wind tube from the body 11. In the process of pushing the unlocking member 940, the elastic member 920 is elastically reset to reduce the force for pushing the unlocking member 940, thereby facilitating the operation. Similarly, in the second example, the unlocking member 940 may be slidably connected to the outer side of the body 11, and an end of the unlocking member 940 can abut against and push the wind tube 910. When the wind tube 910 is to be removed, the unlocking member 940 is pushed in a direction facing the wind tube 910 so that the unlocking member 940 abuts against and pushes the wind tube 910, and the wind tube 910 moves away from the body 11. The wind tube 910 moves from the first section to the second section until the wind tube 910 is completely separated from the body 11, thereby achieving the removal of the wind tube 910 from the body 11. In the process of pushing the unlocking member 940, the elastic member 920 is elastically reset to reduce the force for pushing the unlocking member 940, thereby facilitating the operation. In the third example, the body 11 and the wind tube 910 are connected through plugging and loosely mate with each other. The first end of the unlocking member 940 is hinged to the body 11, and the second end of the unlocking member 940 is snap-fit with the wind tube 910. When the wind tube 910 is to be removed, the unlocking member 940 is lifted, and with the help of the elastic forces of the elastic members 920, the wind tube 910 pops out from the body 11, thereby facilitating disassembly. The preceding three manners are set according to requirements.

Figure 55:
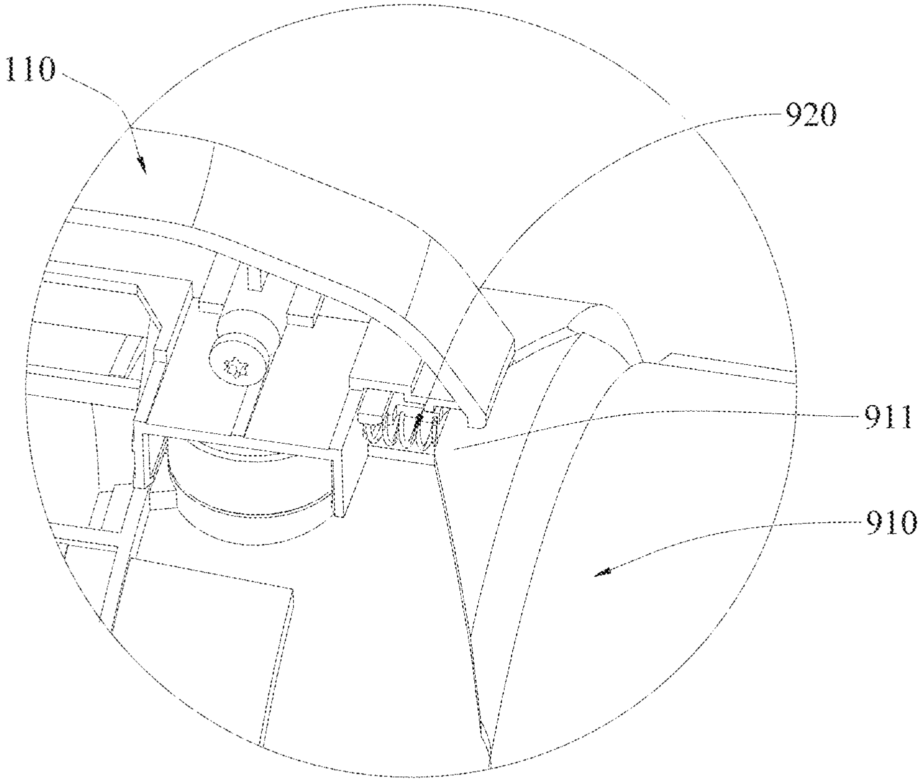
FIG. 55 is another schematic view illustrating the installation of an elastic member of a blower in a state in which a wind tube is not disassembled.
Figure 56:
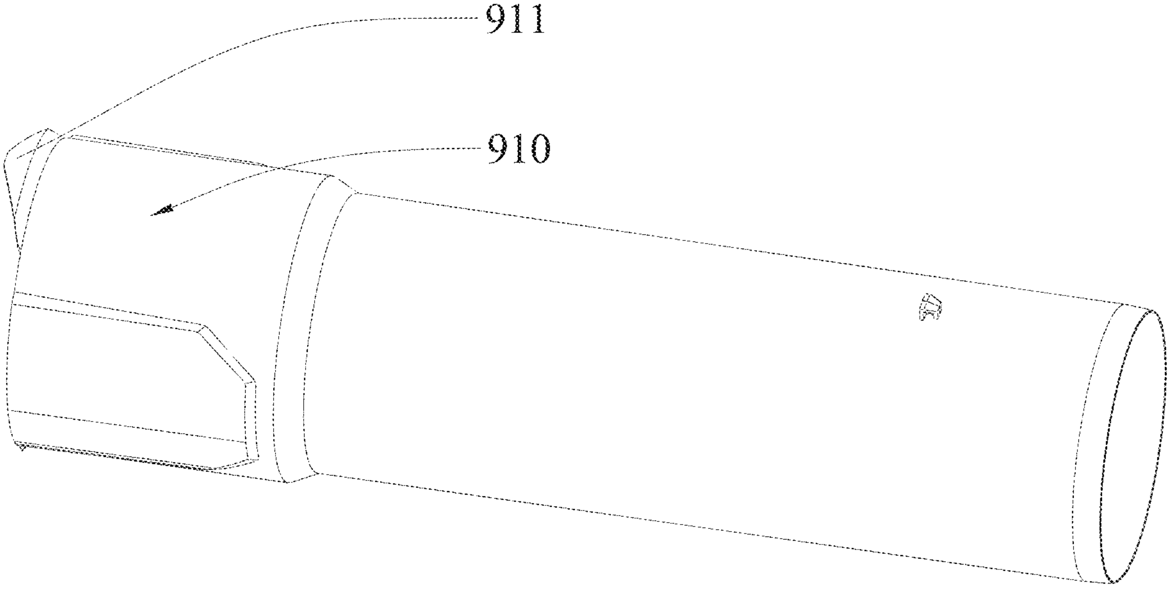
FIG. 56 is another schematic view of a wind tube.

This example further provides a blower with a structure basically the same as that in example one, and the similarities are not repeated here. The differences are described below. As shown in FIGS. 55 and 56, no mounting cover is provided in this example, a positioning portion 911 protrudes from the end of the wind tube 910, the positioning portion 911 can extend into the mounting portion 90A, and the first end of the elastic member 920 abuts against the positioning portion 911. When the wind tube 910 is inserted, the wind tube 910 directly compresses the elastic member 920. When the wind tube 910 is pulled out, the elastic member 920 can directly abut against and push the wind tube 910 to eject the wind tube 910, thereby releasing the wind tube 910. The structure is simple. In an example, a positioning groove is provided in the first pipe 220 of the body 11, and the positioning groove and the positioning portion 911 are used for limiting the body 11 along the circumferential direction to improve the connection accuracy. In an example, the positioning portion 911 is provided with chamfers or rounded corners so that the positioning portion 911 is substantially triangular, the positioning groove has a shape that is adapted to the shape of the positioning portion 911, and the positioning portion 911 and the positioning groove implement the guiding function through the chamfers or rounded corners, thereby facilitating installation.

Figure 57:
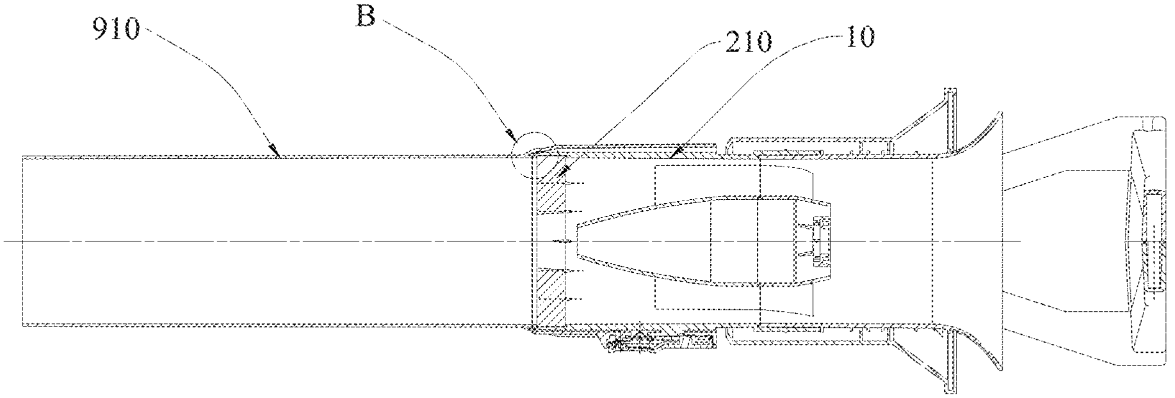
FIG. 57 is a sectional view of a blower.
Figure 58:
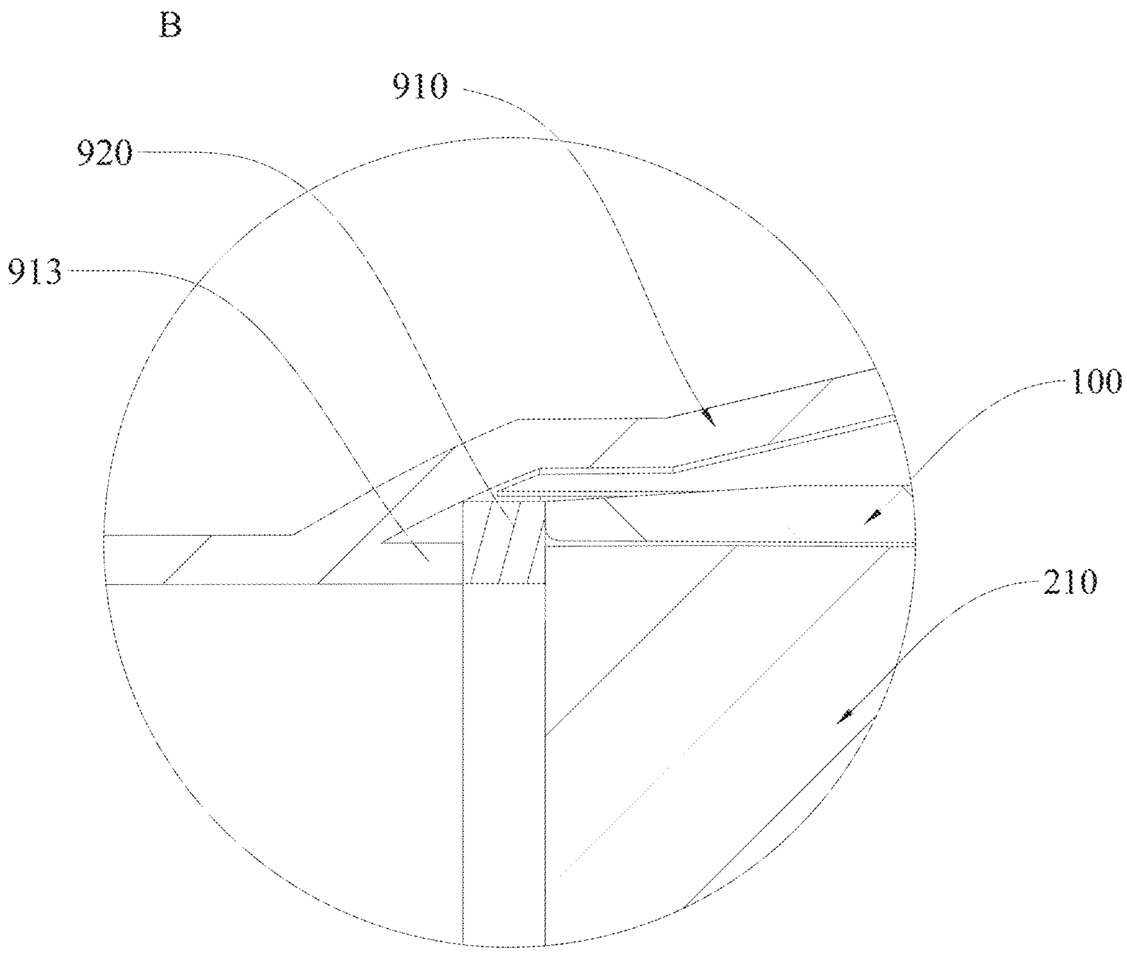
FIG. 58 is an enlarged view of part B in FIG. 57.

This example further provides a blower with a structure basically the same as that in example one, and the similarities are not repeated here. The differences are described below. As shown in FIGS. 57 and 58, in an example, the elastic member 920, the end of the wind tube 910, and the end of the body 11 (the housing 100) have substantially the same diameters, the elastic member 920 is located between the wind tube 910 and the body 11, and two ends of the elastic member 920 abut against the wind tube 910 and the body 11, respectively. When the wind tube 910 is to be removed, the wind tube 910 pops out from the body 11 with the help of the elastic forces of the elastic members 920 so that the wind tube 910 and the body 11 are subjected to uniform elastic forces, thereby ensuring a better pop-out effect. In an example, referring to FIG. 58, a retainer ring 913 is provided inside the wind tube 910, and the wind tube 910 covers at least part of the body 11. For example, the wind tube 910 covers at least part of the pipe assembly 260, and two ends of the elastic member 920 abut against the body 11 and the retainer ring 913, respectively. In another example, an inner ring is provided on the body 11, the body 11 covers at least part of the wind tube 910, and two ends of the elastic member 920 abut against the wind tube 910 and the inner ring, respectively. Alternatively, the body 11 covers at least part of the wind tube 910, and two ends of the elastic member 920 abut against the wind tube 910 and the protective cover 210, respectively.

In an example, the elastic member 920 is annular and is sleeved on the wind tube 910 or the body 11, and two ends of the elastic member 920 abut against the wind tube 910 and the body 11, respectively. In an example, the elastic member 920 is sleeved on the wind tube 910 or the body 11, and the wind tube 910 or the body 11 provides structural support for the elastic member 920 to prevent the elastic member 920 from falling off and being lost after the wind tube 910 is separated from the body 11, thereby facilitating management. When the wind tube 910 is provided with the retainer ring 913, the elastic member 920 is sleeved on the retainer ring 913. When the body 11 is provided with the inner ring, the elastic member 920 is sleeved on the inner ring.

It is to be understood that the ejection mechanism 900 may not only be configured to be a spring structure or a rubber ring structure to implement the function of ejecting the wind tube 910 through the elastic force but also be configured to implement the function of ejecting the wind tube 910 through other forms of transmission structures, such as a lever structure; or the ejection mechanism 900 may be configured to be a combination of an elastic member such as a spring and other mechanical mechanisms, for example, a spring and a tension spring mate with each other to form a movement path to achieve switching between locking and releasing the elastic force.

It is to be noted that all the technical solutions described in the present application may be applied to different airflow devices such as a handheld blower, a backpack blower, or a blow-suction machine with a blowing mode. The "airflow device" mentioned in the present application is not limited to a specific type of airflow device. Any device that does work through the airflow may be referred to as the "airflow device". The "blower" involved in the present application is not limited to the handheld blower, the backpack blower, or the blow-suction machine with a blowing mode, so the mentioned "blower" should be understood as a general term for various types of blowers unless a specific type of blower is specifically limited in the text.

When it comes to the specific difference between the "handheld blower" and the "backpack blower", we define it from the following perspective: the battery pack 130 of the handheld blower is connected to the housing 110, or in other words, the battery pack coupling portion 131 for mounting the battery pack 130 extends from the housing 110. As shown in FIGS. 1 and 2, the left housing 110 forms the first coupling portion 111, the right housing 120 forms the second coupling portion 121, and the first coupling portion 111 and the second coupling portion 121 together form the battery pack coupling portion 131 for mounting the battery pack 130. The battery pack 130 of the backpack blower is separated from the housing 110, the battery pack coupling portion 131 is separated from the housing 110, and when the backpack blower is in use, the battery pack 130 is carried on the back of the user.

The above shows and describes the basic principles, main features and advantages of the present application. Those skilled in the art should understand that the above embodiments do not limit the present application in any form, and any technical solution obtained by equivalent replacement or equivalent transformation falls within the protection scope of the present application.

What is claimed is:

1. An airflow device, comprising:

a grip for a user to hold;

a pipe assembly for air to pass through;

a fan assembly comprising fan blades rotatable about a fan axis of the fan assembly and a fan blade support portion to support the fan blades; and a motor configured to drive the fan assembly to rotate;

wherein the fan assembly is an axial flow fan, an inner diameter of the pipe assembly is greater than or equal to 90 mm, a flow rate of the airflow device is greater than or equal to 1000 CFM, and a maximum rotational speed of the motor is less than 35000 rpm.

2. The airflow device of claim 1, further comprising guide vanes configured to direct an airflow, wherein, along a direction of the fan axis, a first distance is formed between a guide vane root of one of the guide vanes and one of the fan blades, and the first distance is greater than or equal to 5 mm and less than or equal to 30 mm.

3. The airflow device of claim 1, further comprising guide vanes configured to direct an airflow, wherein, along a direction of the fan axis, a first distance is formed between a guide vane root of one of the guide vanes and one of the fan blades, and the first distance is greater than or equal to 5 mm and less than or equal to 20 mm.

4. The airflow device of claim 1, wherein the pipe assembly comprises a first pipe and a second pipe, and the first pipe is located on a front side of the second pipe.

5. The airflow device of claim 1, wherein an average wall thickness of the pipe assembly is greater than or equal to 3 mm.

6. The airflow device of claim 1, wherein a hub ratio is defined as a ratio of a maximum first diameter formed by the fan blade support portion to a second diameter formed by outermost edges of the fan blades, and the hub ratio is greater than or equal to 0.4 and less than or equal to 0.5.

7. The airflow device of claim 1, wherein a guide vane root of a guide vane intersects with a guide vane support portion, the fan assembly comprises a fan front end located on a front side and a fan rear end located on a rear side, the guide vane support portion comprises a first rear edge located on a rear side, a second distance L2 is defined as a distance between the fan front end of the fan assembly and the first rear edge of the guide vane support portion, and the second distance is greater than or equal to 3 mm and less than or equal to 6 mm.

8. The airflow device of claim 1, comprising a body, wherein the body comprises the fan assembly, the motor, and a housing that is formed with the grip; the airflow device further comprises a wind tube, detachably connected to the body, to allow the air to pass through; the airflow device is provided with an ejection mechanism, and the ejection mechanism applies an ejection force so that the wind tube tends to be separated from the body.

9. The airflow device of claim 1, comprising a battery pack coupling portion configured to mount a battery pack for supplying power to the airflow device.

10. The airflow device of claim 1, wherein the airflow device is a blower or a blow-suction machine.

11. The airflow device of claim 1, further comprising a handle for the user to hold located on a front side of the grip.

12. The airflow device of claim 1, further comprising guide vanes configured to direct an airflow, wherein one of the guide vanes comprises a plurality of through holes penetrating at least part of the guide vane.

13. The airflow device of claim 12, wherein the guide vane expands outward from a guide vane axis, in a radial direction of the guide vane axis, an opening rate of the guide vane is defined as a ratio of a total opening area of the guide vane to a total radial area of the guide vane, and the opening rate is greater than or equal to 10% and less than or equal to 75%.

14. The airflow device of claim 1, wherein a ratio T/D of an average wall thickness T of the pipe assembly to an inner diameter D of the pipe assembly is greater than or equal to 1:50 and less than or equal to 1:15.

15. The airflow device of claim 1, wherein the airflow device is capable of being connected to a belt for use, a blower is provided with a belt coupling portion, the belt is provided with a belt mounting portion, and the belt coupling portion and the belt mounting portion are assembled so that the belt is mounted to the blower.

16. The airflow device of claim 1, further comprising a display, wherein the display comprises an electronic display screen.

17. The airflow device of claim 16, wherein an effective area S of the display is defined as a displayable area of the electronic display screen, and the effective area S is greater than or equal to 4 square centimeter.

* * * * *